United States Patent [19]

Williamson, Jr. et al.

[11] 4,303,973

[45] Dec. 1, 1981

[54] INDUSTRIAL PROCESS CONTROL SYSTEM

[75] Inventors: Robert A. Williamson, Jr., Medfield; Roger W. Ford, Walpole, both of Mass.

[73] Assignee: The Foxboro Company, Foxboro, Mass.

[21] Appl. No.: 51,225

[22] Filed: Jun. 22, 1979

Related U.S. Application Data

[63] Continuation of Ser. No. 737,195, Oct. 29, 1976, abandoned.

[51] Int. Cl.³ ............... G06F 15/46; G05B 19/02; G06F 3/14
[52] U.S. Cl. ................... 364/103; 340/712; 340/722; 364/120
[58] Field of Search .......... 340/515, 521, 525, 711, 340/715, 722, 286 R, 150, 712, 722, 753; 364/103, 107, 120, 518, 514, 200 MS File, 900 MS File

[56] References Cited

U.S. PATENT DOCUMENTS

| | | | |
|---|---|---|---|
| 3,430,209 | 2/1969 | Goshorn et al. | 364/200 |
| 3,474,438 | 10/1969 | Lauher | 340/453 |
| 3,668,653 | 6/1972 | Fair et al. | 364/200 |
| 3,882,446 | 5/1975 | Brittian et al. | 364/200 |
| 3,925,762 | 12/1975 | Heitlinger et al. | 340/150 |
| 3,959,636 | 5/1976 | Johnson et al. | 364/200 |
| 3,971,000 | 7/1976 | Cromwell | 364/200 |
| 4,001,807 | 1/1977 | Dallimonti | 340/715 X |

FOREIGN PATENT DOCUMENTS 1097094 12/1967 United Kingdom ............. 340/753

OTHER PUBLICATIONS

Lauher et al.–"CRT Control Center for a Multiloop Processor", Instrumentation Technology, Sep. 1970, pp. 33–38.
Crowder–"CRT Interface for a Continuous Plant"–Instrumentation Technology – Jan. 1971 –pp. 58–62.
Dallimonti–"Future Operator Consoles for Improved Decision Making & Safety"–Instrumentation Technology – Aug. 1972 – pp. 23–28.
Dallimonti–"New Designs for Process Control Consoles"–Instrumentation Technology – Nov. 1973 –pp. 48–53.
Dallimonti–"Human Factors in Control Center Design"–Instrumentation Technology – May 1976 –pp. 39–44.
Stewart, "Operator Interface in Distributed Microprocessor Control System", Advances in Instrumentation, Proceedings of ISA's Conference & Exhibit, Houston, vol. 31, Part I, Oct. 10–14, 1976; Pittsburgh, pp. 1–8.
McMorris et al., "ARE Process Control Rooms Obsolete", Control Engineering, vol. 18, No. 7, Jul. 1971, pp. 42–47.
Bear, "The Plant Computer as an Operating Tool", Advances in Instrumentation, Proceedings of ISA's Industry Oriented. Conference Exhibit, Milwaukee, vol. 30, Part I, Oct. 6–9, 1975, pp. 1–6.

*Primary Examiner*—Joseph F. Ruggiero
*Attorney, Agent, or Firm*—Parmelee, Johnson, Bollinger & Bramblett

[57] ABSTRACT

An industrial process control system for use with complex processes having many variables to be controlled.

The system includes a CRT screen on which any of a series of predetermined displays can be presented to the process operator.

The displays are arranged in hierarchical fashion, from plant summary information down to detailed data for individual process loops.

The operator's console includes a variable function keyboard the keys of which perform functions determined by the particular displays being presented on the CRT.

The CRT display includes symbols positionally correlated with the keys and which identify the key functions for the corresponding display.

The operator is enabled to control the display and the process through use of the keyboard controller with the display presentations.

52 Claims, 48 Drawing Figures

PROCESS OPERATOR KEYBOARD FUNCTION ARRANGEMENT

SYMBOL MEANINGS

| Symbol | Meaning |
|---|---|
| ⬭ | = FIXED FUNCTION KEY |
| ⬢ | = VARIABLE FUNCTION KEY |
| ▨ | = VARIABLE FUNCTION KEY (INVERTED VIDEO) |
| ▭ | = CRT DISPLAY |
| A/A | = UPPER AREA / LOWER AREA |
| G/G | = UPPER GROUP / LOWER GROUP |
| L/L | = UPPER LOOP / LOWER LOOP |
| AAS | = AREA ALARM SUMMARY |
| AFF | = AREA FULL-VALUE FACEPLATE |
| O | = ACTION TAKEN |
| U/L | = UPPER / LOWER |
| <, > | = PAGE LEFT, RIGHT |

FIG. 5

FIG. 6 PROCESS OPERATIONS DISPLAYS ACCESS STRUCTURE

AREA FULL VALUE FACEPLATE
SELECTION/OPERATIONS FLOW

GROUP FULL VALUE FACEPLATE
SELECTION/OPERATIONS FLOW

OPERATOR SET FACEPLATE—OSL
FULL VALUE FACEPLATE PAGES—EXAMPLE DISPLAY

FIG. 12 OSL ALARM LIMITS SELECTION OPERATIONS FLOW

OSL OUTPUT MEMORY POINTERS
SELECTION/OPERATIONS FLOW

VARIABLE FUNCTION KEYBOARD KEYS

| KEYBOARD | 1 | 2* | 3 | 4* | 5 | 6 | 7* | 8 | 9* | 10 | 11 | ** PAGE | MODE OR CONDITIONS |
|---|---|---|---|---|---|---|---|---|---|---|---|---|---|
| L1.1 | ∨ | | | | | | | | | | L/L | P | OFF/FLK/OOS/LOC (LOCAL OPERATOR CONTROL) |
| L1.2 | ∨ | | | MAN | | | +S− | | +F− | | L/L | P | AUTO/SETPOINT RAMP |
| L1.3 | ∨ | | DIS | AUT | | | +S− | ASN | +F− | | L/L | P | MANUAL/SETPOINT SELECTED |
| L1.4 | ∨ | | ENA | AUT | | CLS | +S− | ASN | +F− | OPN | L/L | P | MANUAL/OUTPUT SELECTED |
| L1.5 | ∨ | OFF | DIS | | | | +S− | ASN | +F− | | L/L | A | ON SCAN/ALARMS ENABLED |
| L1.6 | ∨ | OFF | ENA | | | | +S− | ASN | +F− | | L/L | A | ON SCAN/ALARMS DISABLED |
| L1.7 | ∨ | ON | DIS | | | | +S− | ASN | +F− | | L/L | A | OFF SCAN/ALARMS ENABLED |
| L1.8 | ∨ | ON | ENA | | | | +S− | ASN | +F− | | L/L | A | OFF SCAN/ALARMS DISABLED |
| L1.9 | ∨ | | | | | | +S− | ASN | +F− | | L/L | M | MEMORY POINTERS |

NOTES: *KEYS 2,4,7 & 9 ARE DUAL
**DIGITAL PAGE
P = PRIMARY   S = SECONDARY
A = ALARM    M = MEM. POINTERS

OPERATOR SET FACEPLATE — OSL
VFKB SUMMARY

FIG. 14

PLANT ALARM SUMMARY (PAS)
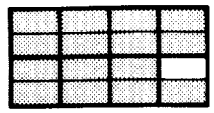
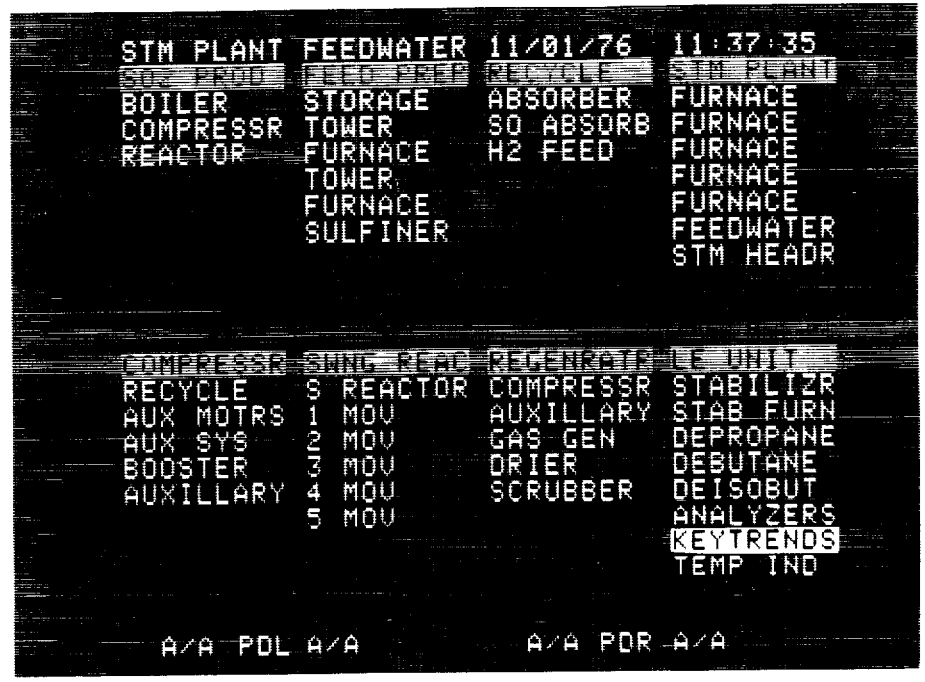
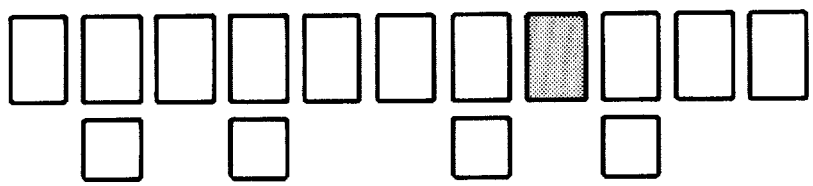
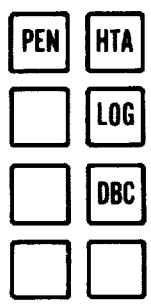 
DISPLAY
- Group directory
- Alarm overview (any alarm in group causes group name to flash)
KEYBOARD
- (A/A) address upper/lower Area
- (PDL) display Plant Deviation — Left
- (PDR) display Plant Deviation — Right
FIG. 15

PLANT DEVIATION — RIGHT (PDR)
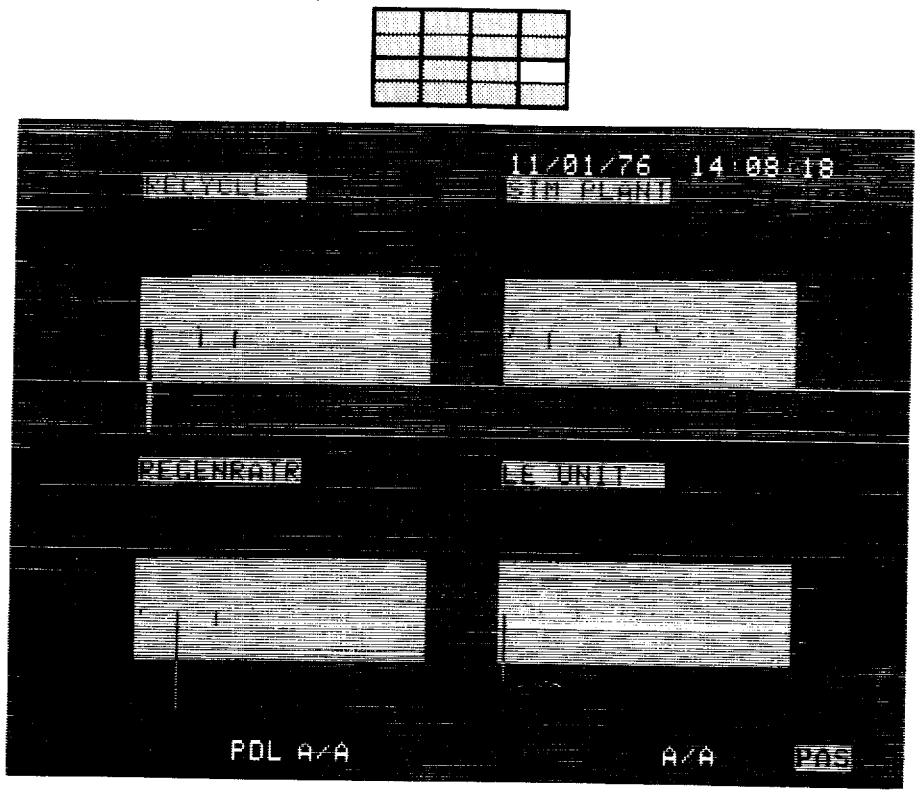
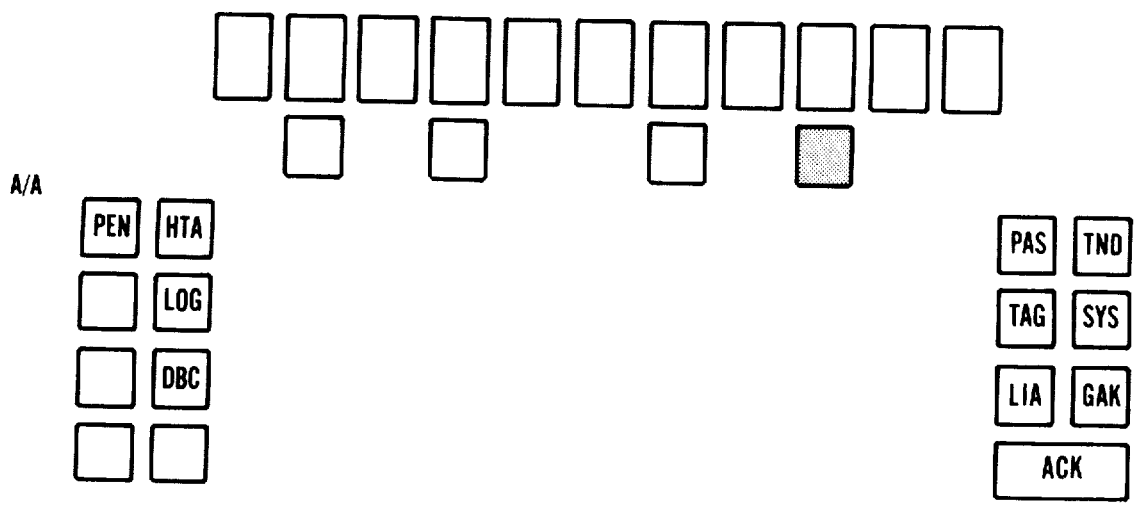
DISPLAY
- Deviation overview (right half of PAS; PDL similar for left half)
- Up to 64 normalized indications per Area
KEYBOARD
- (PDL) display PDL
- (A/A) address upper/lower Area
- (PAS) reset to PAS
FIG. 16

AREA ALARM SUMMARY (AAS)
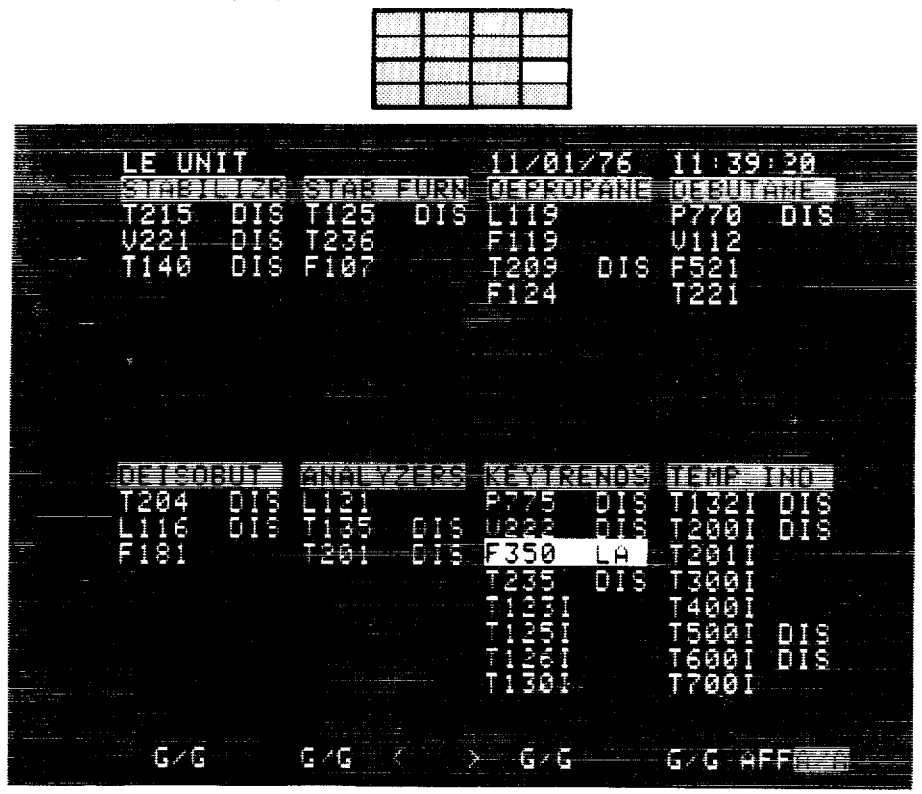
PAS
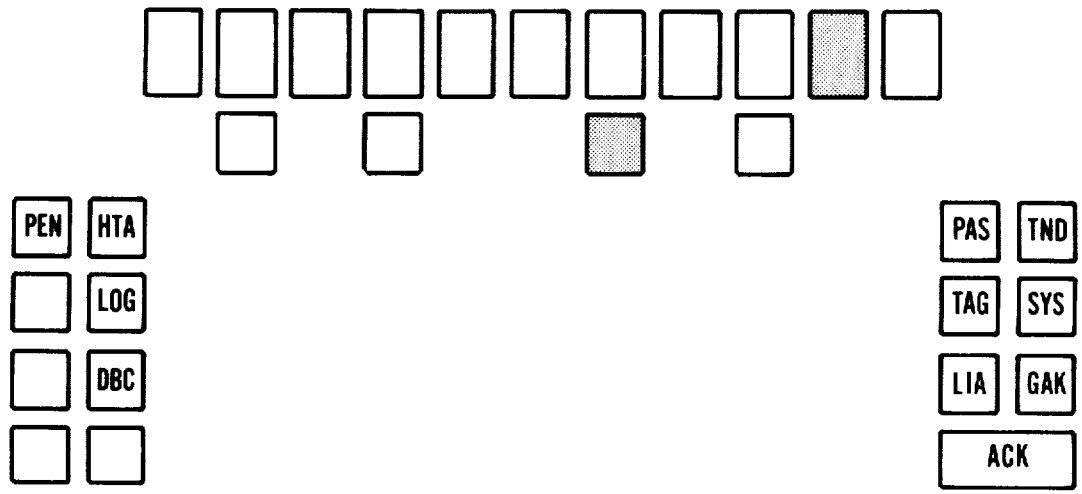
| PEN | HTA | | PAS | TND |
| --- | --- | --- | --- | --- |
| | LOG | | TAG | SYS |
| | DBC | | LIA | GAK |
| | | | | ACK |
DISPLAY
- Area loop directory
- Loop alarm annunciator
KEYBOARD
- (G/G) address upper/lower Group
- (<,>) display AAS for other Areas
- (AFF) display AFF for LE Unit
- (A/A) reset to PAS for Area address
FIG. 17

AAS
AREA FULL-VALUE FACEPLATES (AFF)
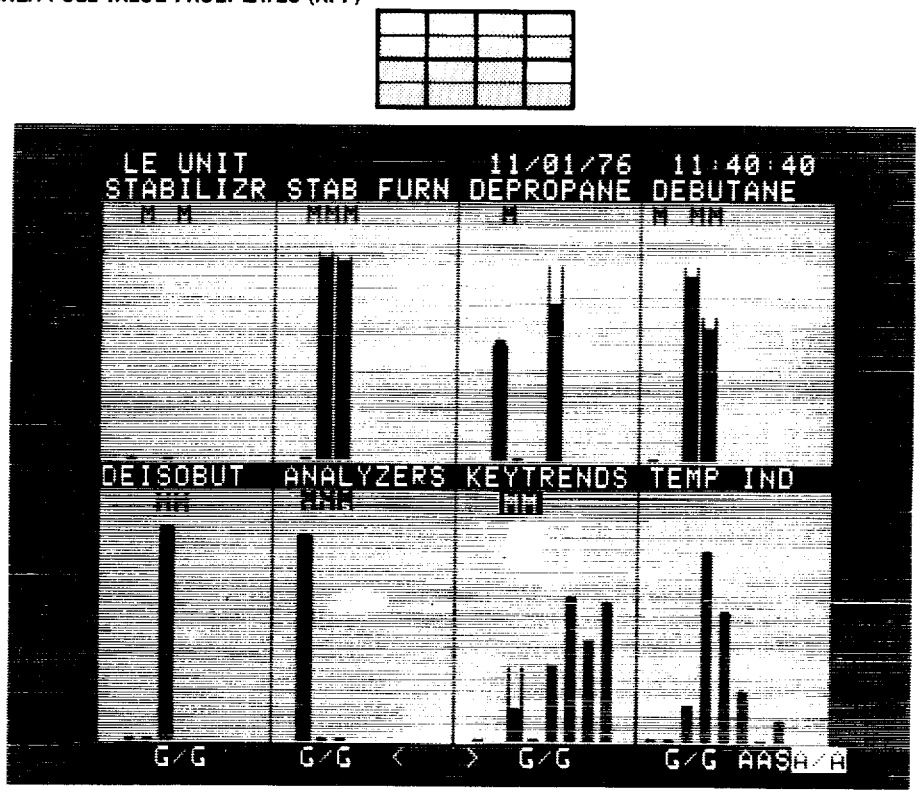
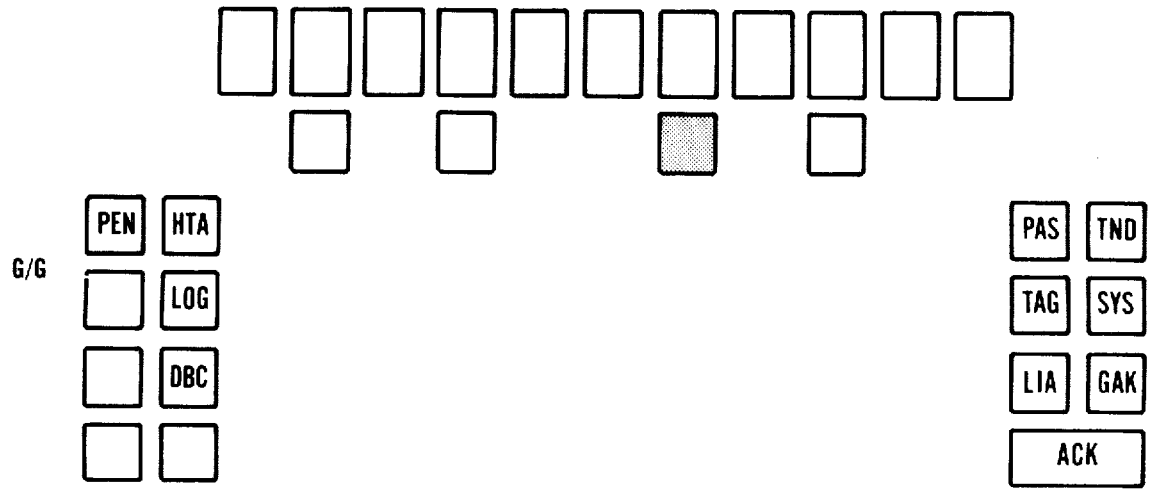
G/G
| PEN | HTA |
| LOG |
| DBC |
| PAS | TND |
| TAG | SYS |
| LIA | GAK |
| ACK |
DISPLAY
- Set-point and measurement overview (0-100% position in range)
- Loop alarm/auto-manual status
KEYBOARD
- Same as AAS (previous page)
FIG. 18

GROUP FULL-VALUE FACEPLATES (GFF)
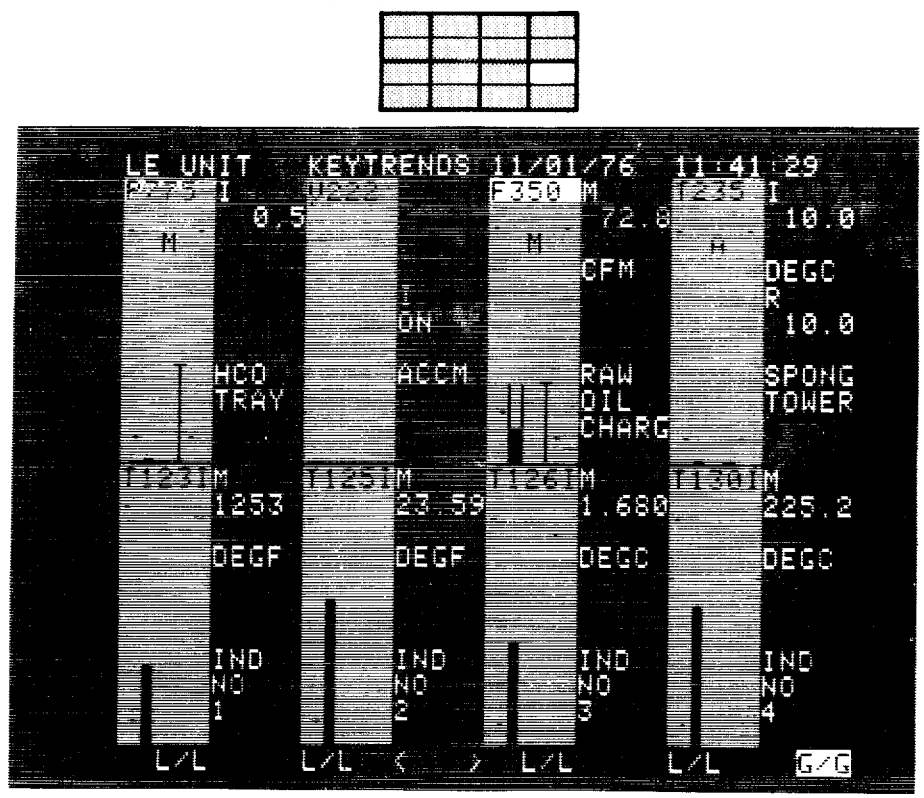
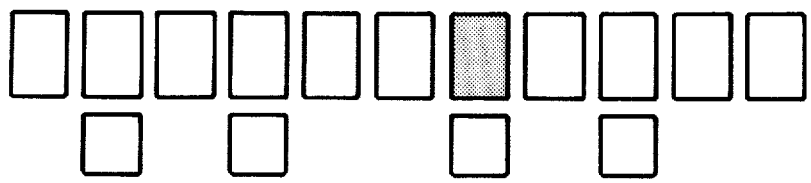
DISPLAY
- Alphanumeric display of Loop Identification (LID) parameters (measurement (M) value, engineering units, loop name)
KEYBOARD
- (L/L) address upper/lower Loop
- (<,>) display GFF for other Groups in LE Unit
- ([G/G]) reset to AAS for Group address
FIG. 19

F350 ADDRESSED — PRIMARY PARAMETERS

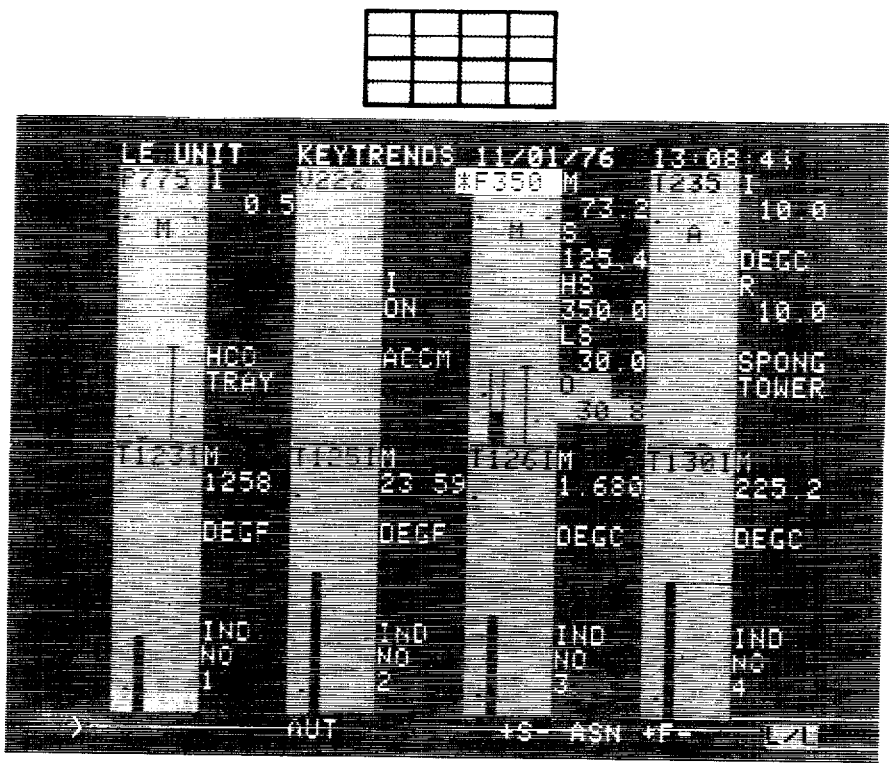

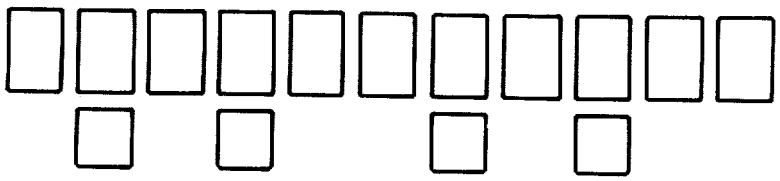

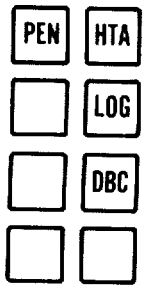

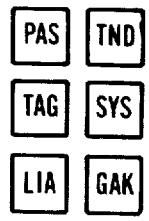

DISPLAY
- F350 addressed to manipulate primary parameters (set point, output), currently in manual (M) status
- Alphanumeric display of measurement (M), set point (S), high span (HS), low span (LS), and output (O)
- Keyboard dedicated to F350

KEYBOARD
- (>) display next digital display
- (AUT) switch output to Automatic status
- (+S−) slow adjustment (+ is increase, − is decrease)
- (ASN) assignment of adjustment cursor (white reverse video block, currently on Output)
- (+F−) fast adjustment
- (L/L) reset to GFF to address another loop (L/L, L/L)

FIG. 20

LOOP F350 ADDRESSED — ALARM PARAMETERS
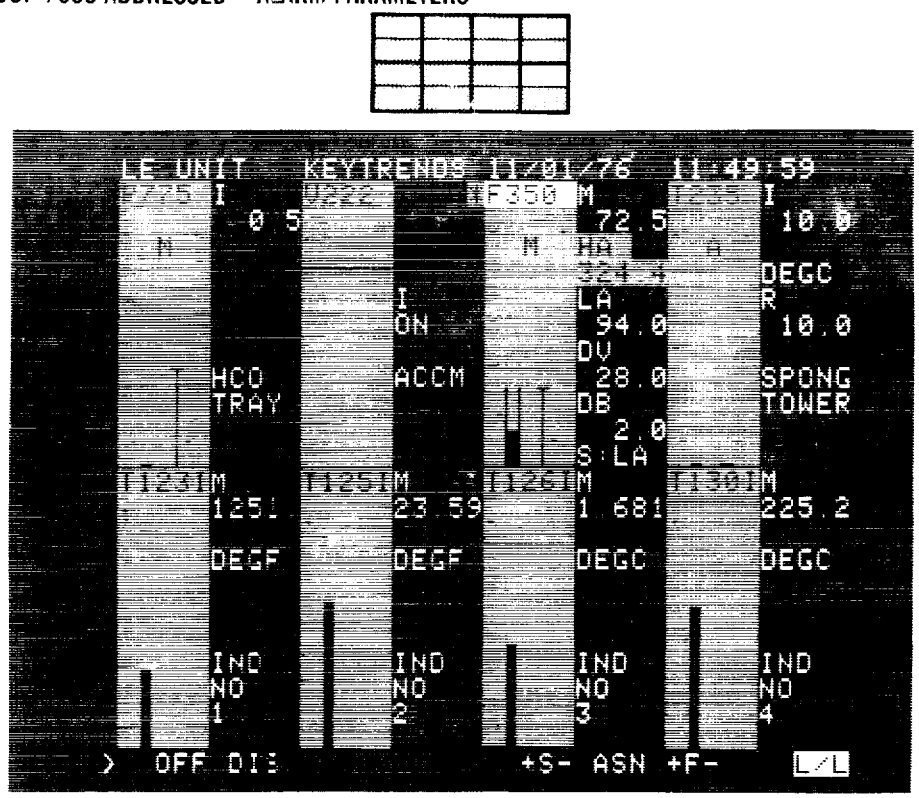
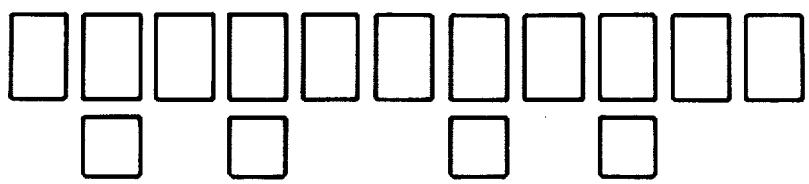
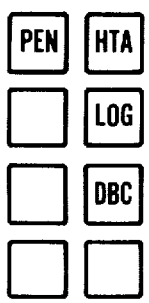
LIA
DISPLAY
- Alphanumeric display of F350 alarm parameters
- Limits — high absolute (HA), low absolute (LA), deviation (DV), dead band (DB)
- Status (S:) — blank (no alarm), HA or LA (alarm), DIS (alarm disabled), OFF (off scan)
KEYBOARD
- (>) display next alphanumeric page
- (OFF) take loop off scan
- (DIS) disable alarms
- (+S−, ASN, +F−, L/L) identical to Tab L/L, prior page
FIG. 21

LOOP T1251 ADDRESSED — PRIMARY PARAMETERS
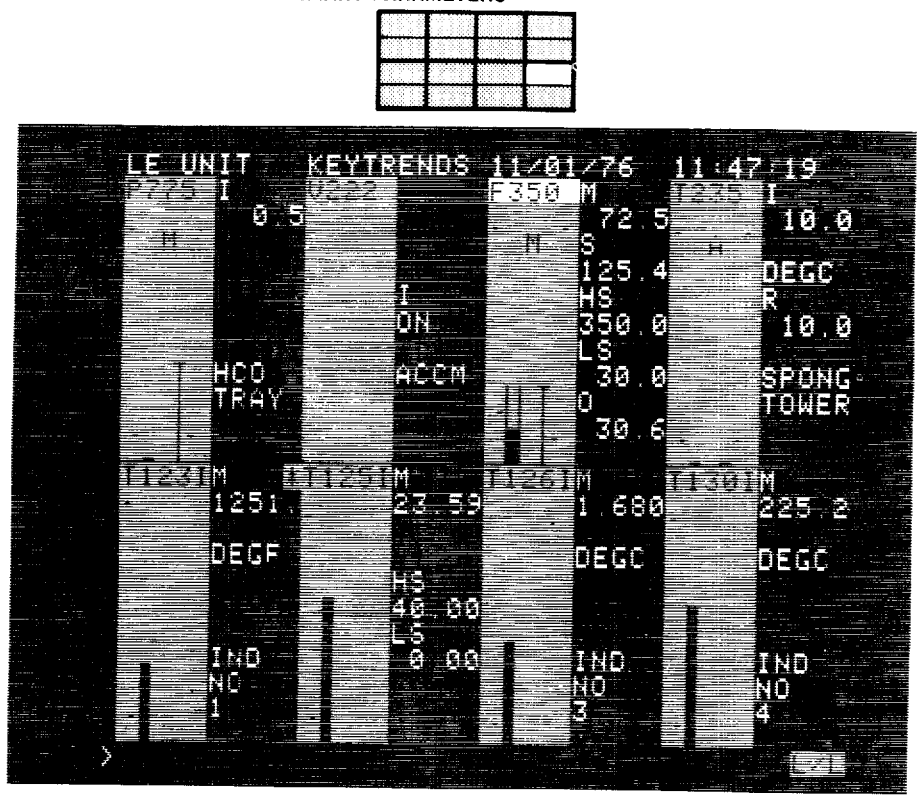
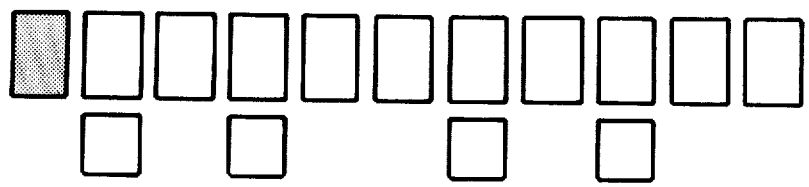
DISPLAY
- Primary parameters for more than one loop (useful for interactive loops)
- Keyboard dedicated to T1251
KEYBOARD
- Identical to Tab L/L, prior page
FIG. 22

LOOP IN ALARM (LIA)
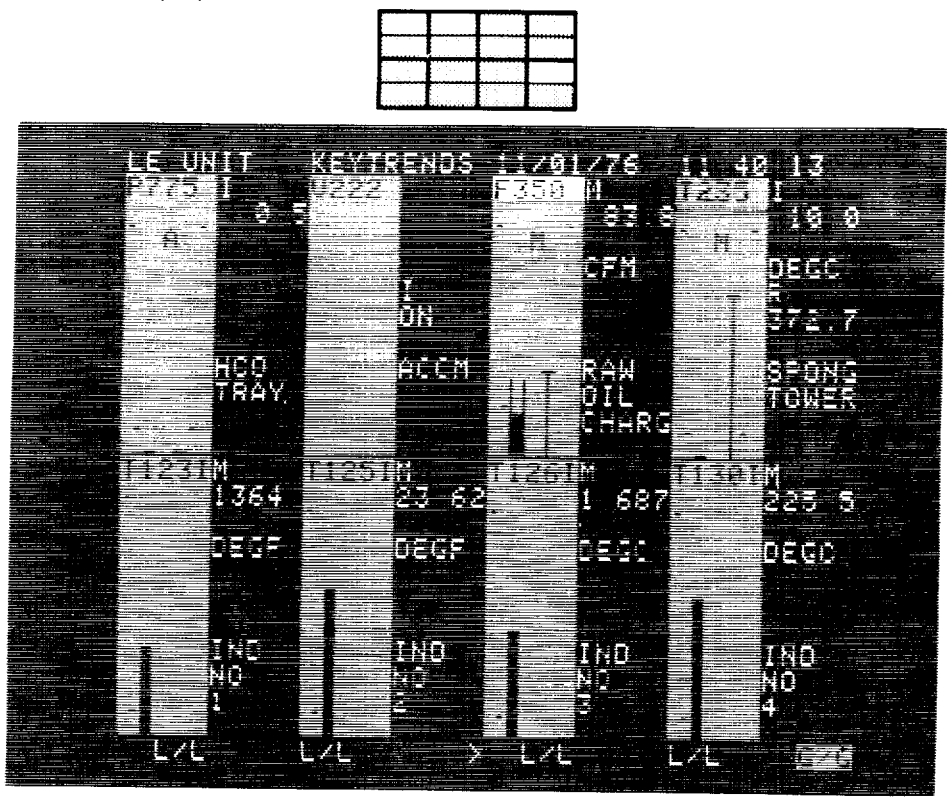
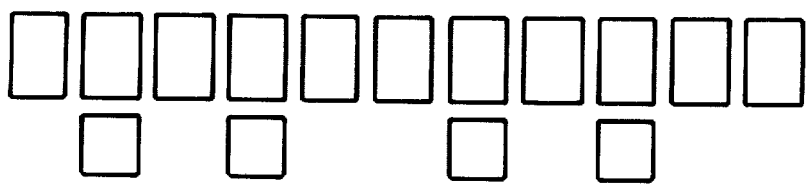
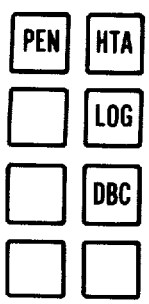
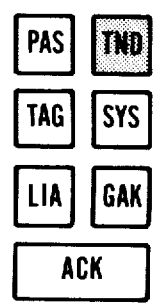
TND
DISPLAY
- LIA key displays GFF for groups having unacknowledged alarms
- GAK key (Group Acknowledge) acknowledges all alarms in group (causes loop tag to stop flashing)
- ACK key (Acknowledge) silences audible alarm
KEYBOARD
- Identical to Tab GFF, prior page
FIG. 23

QUARTER-SCREEN TREND (QST)
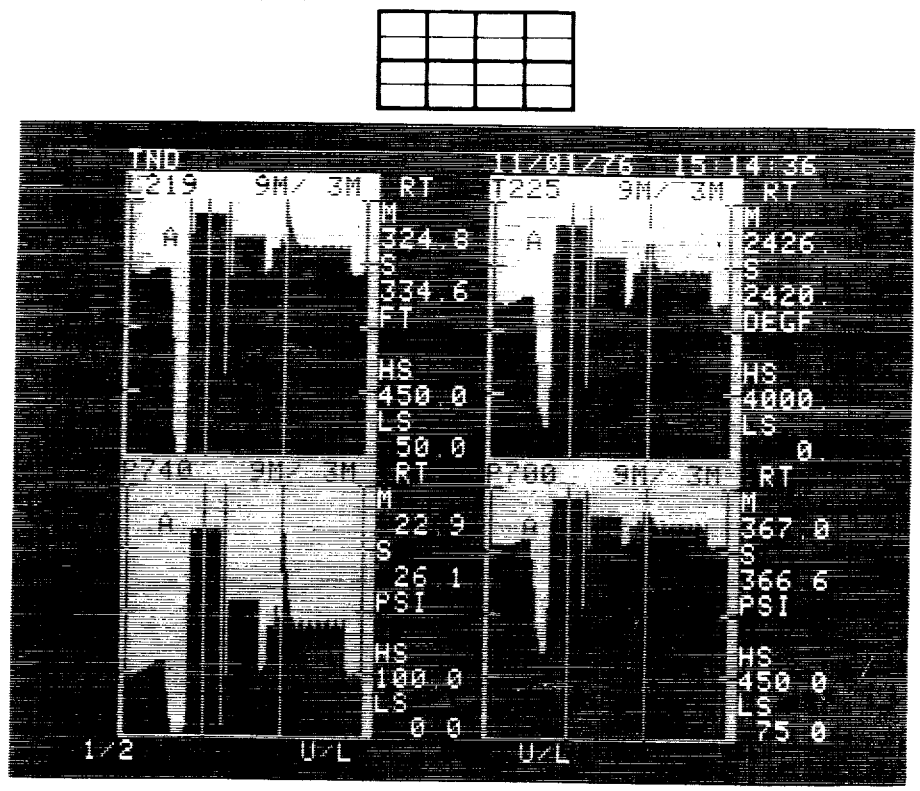
LIA
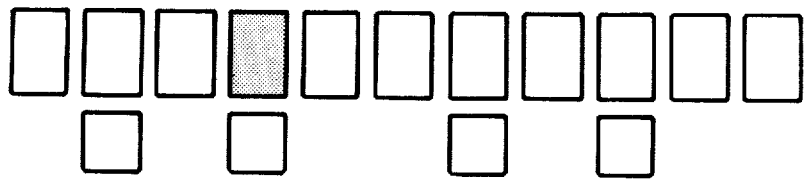
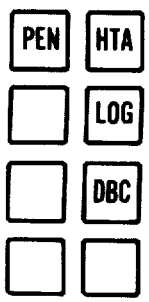
U/L
DISPLAY
- Real-time (RT) or historical (HT) trending of up to 4 process measurements (any mix, all RT shown)
- 90 display points (newest at right), optional elapsed times
KEYBOARD
- (½) display Half-Screen Trend
- (U/L) address upper/lower curve to change loop or type of trending
FIG.24

LOOP L219 ERASED
TND
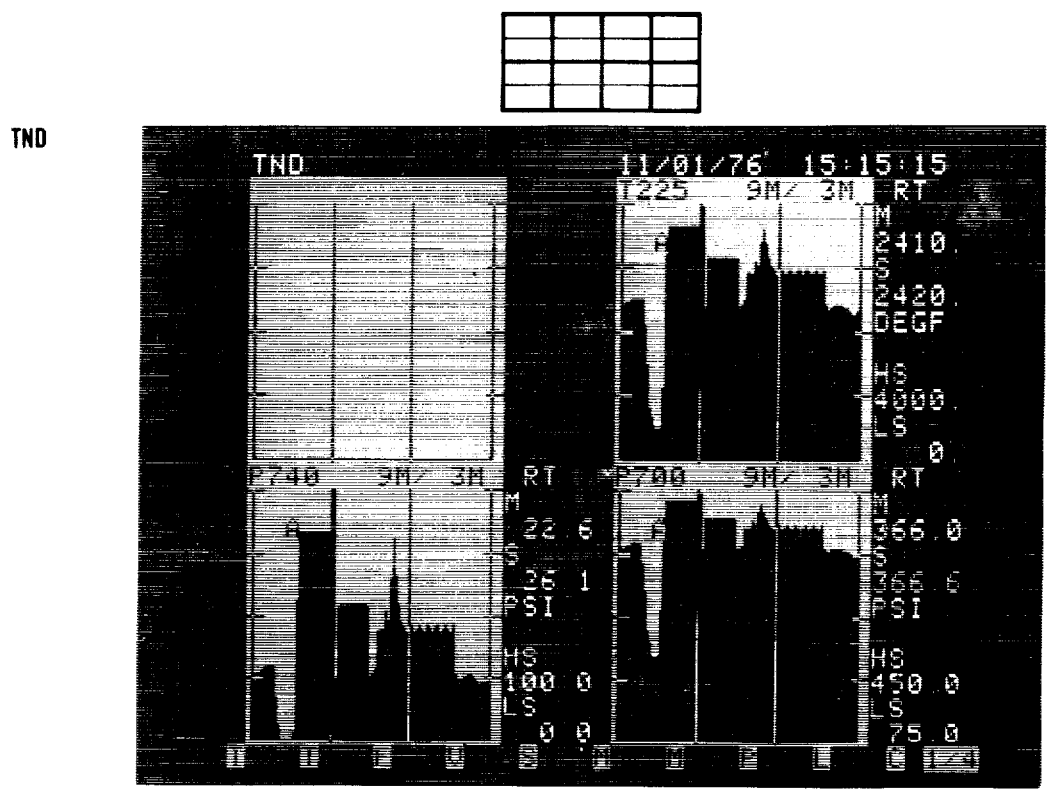
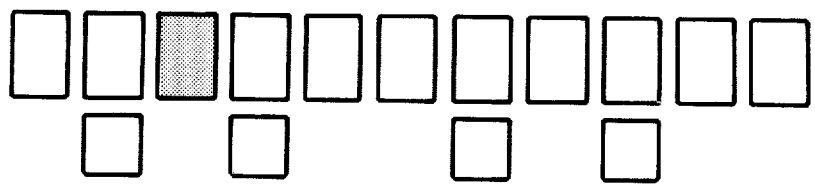
| PEN | HTA |
| LOG |
| DBC |
| PAS | TND |
| TAG | SYS |
| LIA | GAK |
| ACK |
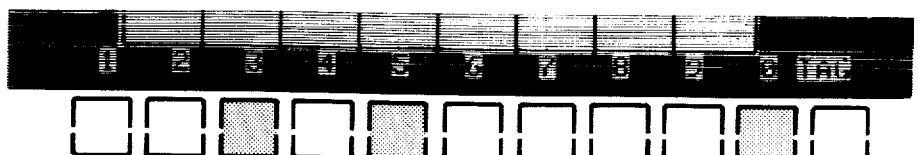
DISPLAY
- Replace L219 trend with F350 trend (specify tag and type of trend data)
KEYBOARD
- ([T] through [C]) tag prefix
- ([¼]) reset to QST
- ([1] through [0]) tag numerics
- ([TAG]) reset to reenter tag
F350
FIG. 25

NEW LOOP TAG
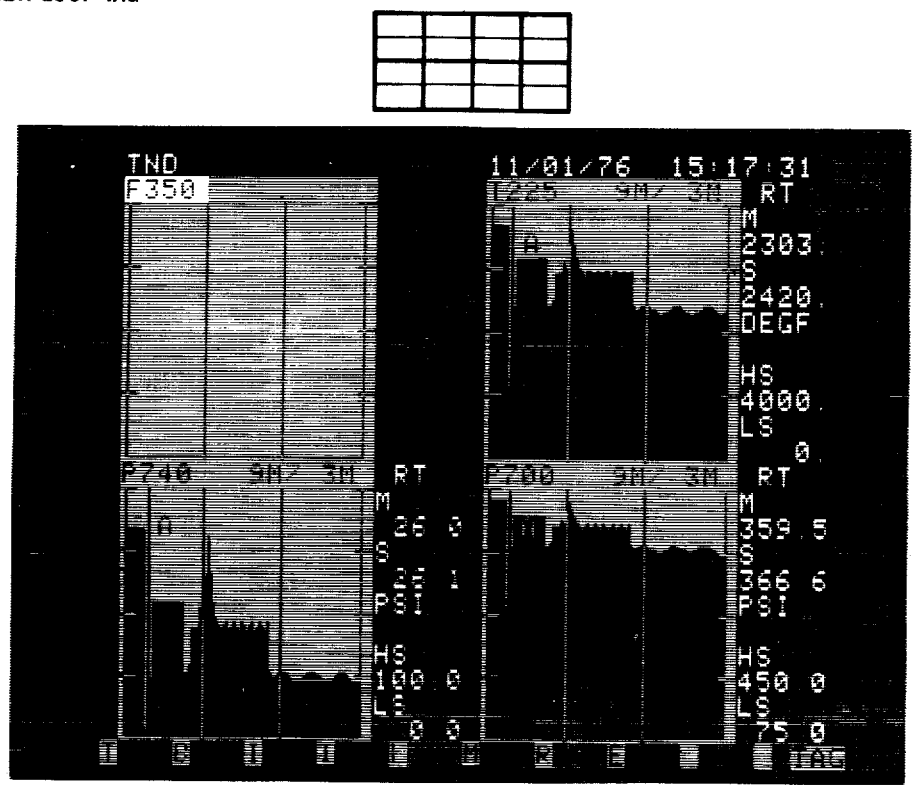
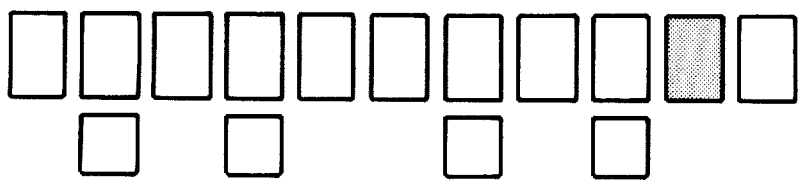
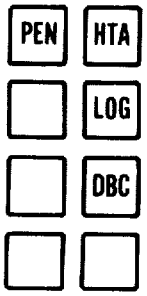
DISPLAY
- F350 tag (less suffix)
KEYBOARD
- (T through ■) tag suffix
- (TAG) reset to reenter tag
FIG. 26

SELECT TYPE TREND DATA
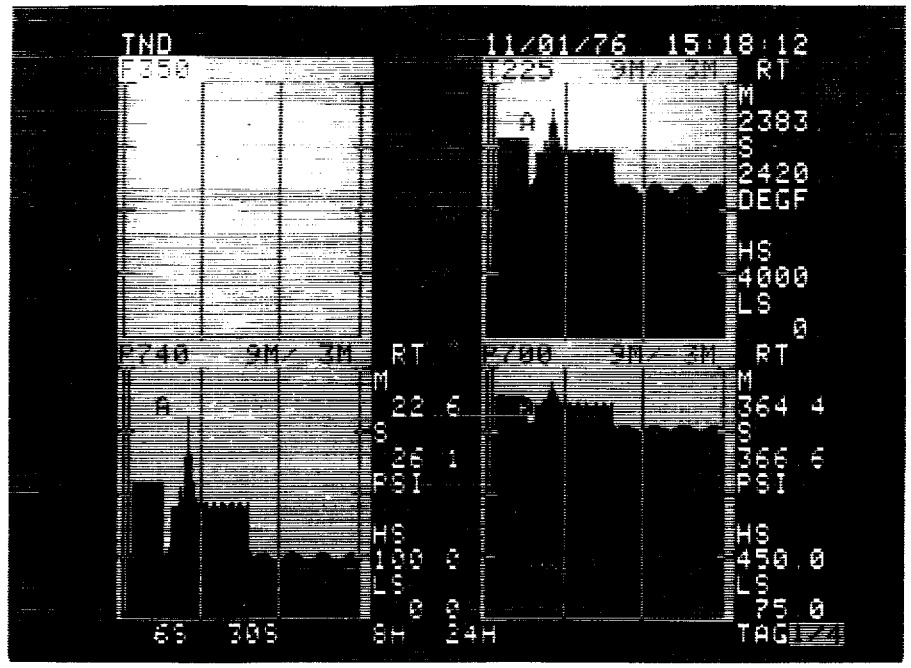
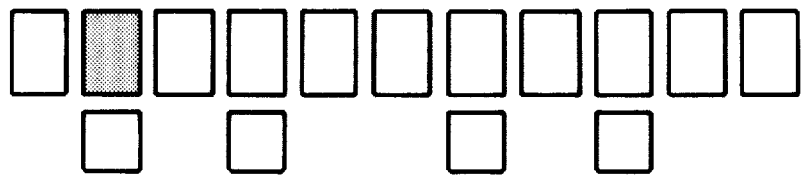
6S
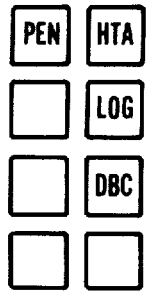
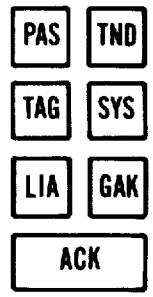
DISPLAY
- Select RT (display point frequency) or HT (total data collection time)
KEYBOARD
- (6S) 6 seconds (fast RT)
- (30S) 30 seconds (slow RT)
- (8H) 8 hours (short HT)
- (24H) 24 hours (long HT)
- (TAG) reset to reenter tag
- (¼) reset to original QST
FIG. 27

F350 TRENDING
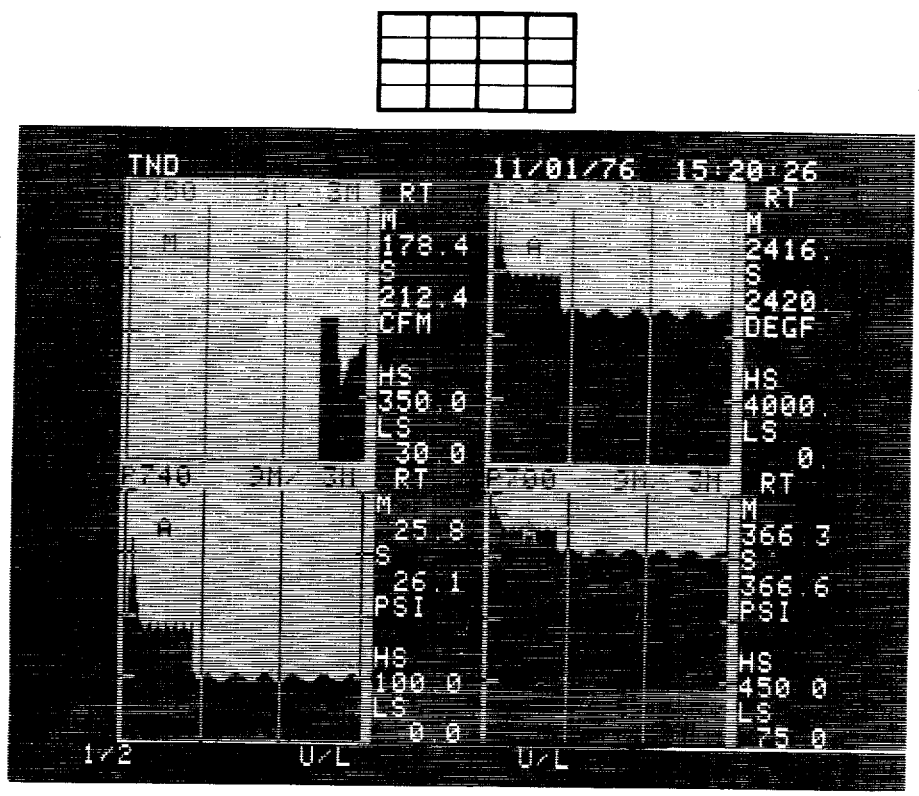
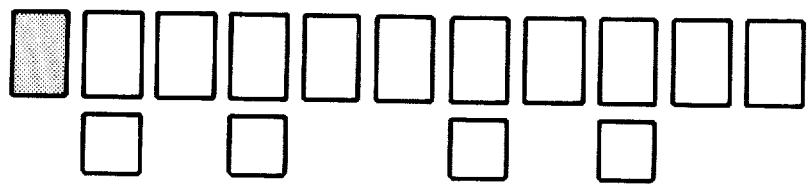
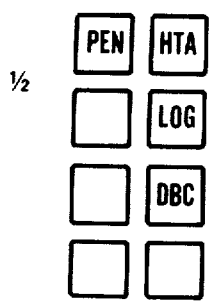
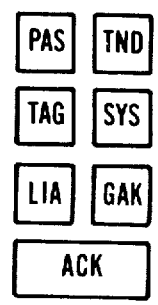
DISPLAY
• F350 has replaced L219
KEYBOARD
• Identical to original QST
  (Tab TND, prior page)
FIG. 28

HALF-SCREEN TREND (HST)
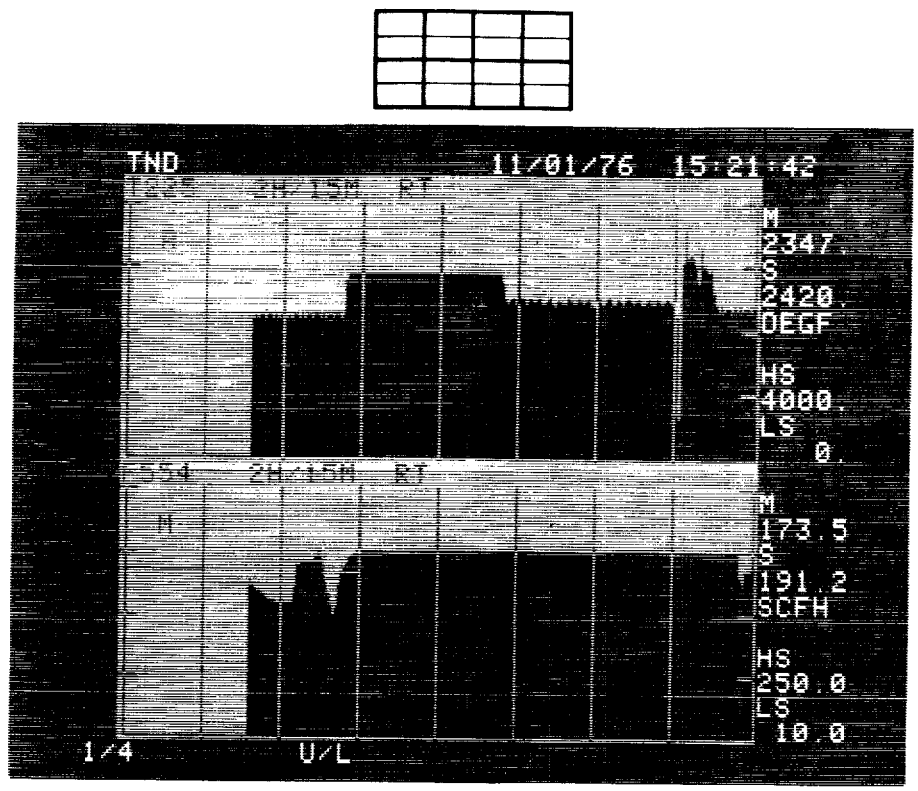
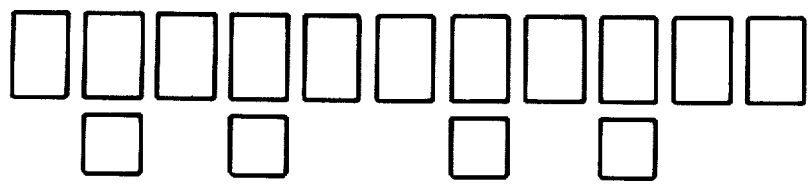
HTA
DISPLAY
- RT or HT of up to 2 process measurements (any mix, all RT shown)
- 240 display points (newest values at right)
KEYBOARD
- (¼) display QST
- (U/L) address upper/lower curve to change loop or type of trending
FIG. 29

HISTORICAL TREND ASSIGNMENTS (HTA)

DISPLAY
- Table of loops for which HT data is being collected (≤ 200 loops, 20 per page)
- Cursor (shown at F350) selects table location to change loop or trending time

KEYBOARD
- (<,>) display other HTA pages
- (TAG) enter new loop tag at position
- (<⭡) move cursor left
- (⭡/⭣) move cursor up/down
- (⭡>) move cursor right

RECORDER PEN ASSIGNMENTS (PEN)

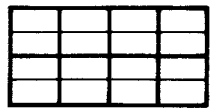

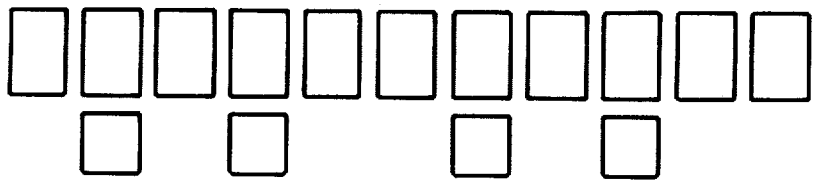

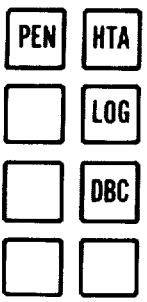

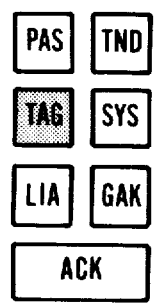

TAG

DISPLAY
- Table of loops on pens for RT or HT (F350 now recording on green pen of recorder #1)
- Cursor (shown at F350) selects pen to change loop or type of trending

KEYBOARD
- (ART) All Real Time — selects all RT pens for common action (GO, STOP, CANCEL)
- (AHT) similar for HT
- (SEL) select pen to change type of trending
- (TAG) assign new loop to pen
- (< ↑, ↑/↓, ↓ >) cursor controls

FIG. 31

ADDRESS LOOP BY TAG (TAG)
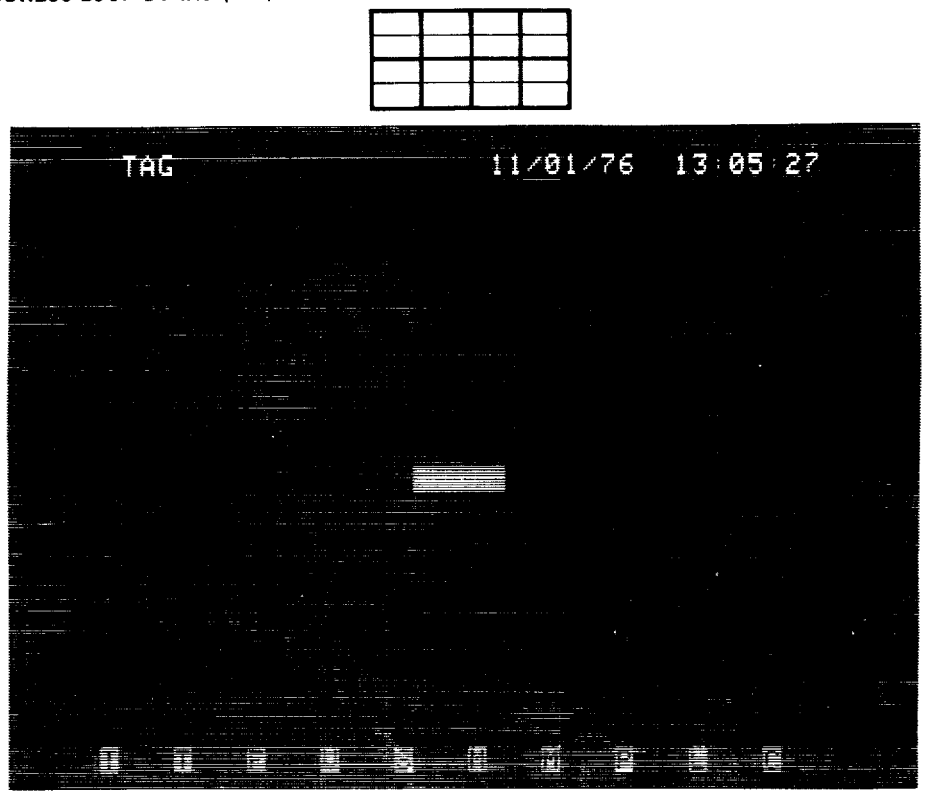
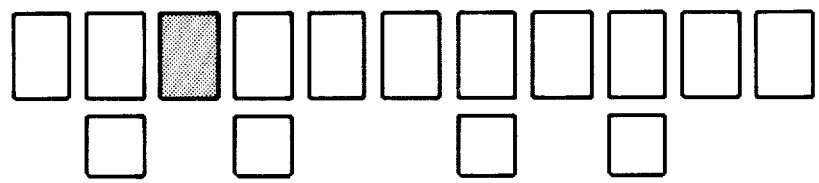
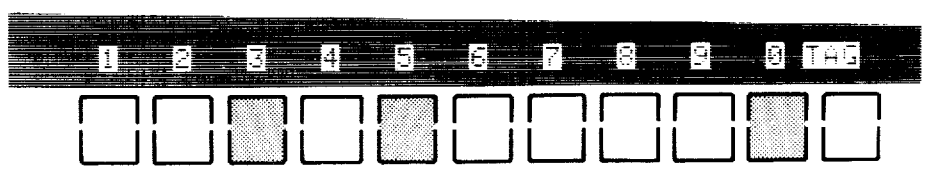
F350
DISPLAY
- Address loop by tag (alternative to addressing loop through display hierarchy)
- Provides direct access to any individual loop and its group (same result as A/A, G/G, L/L sequence)
KEYBOARD
- (T through C) tag prefix
- (1 through 0) tag numerics
- (TAG) reset to reenter tag
FIG. 32

LOOP TAG LESS SUFFIX
TAG
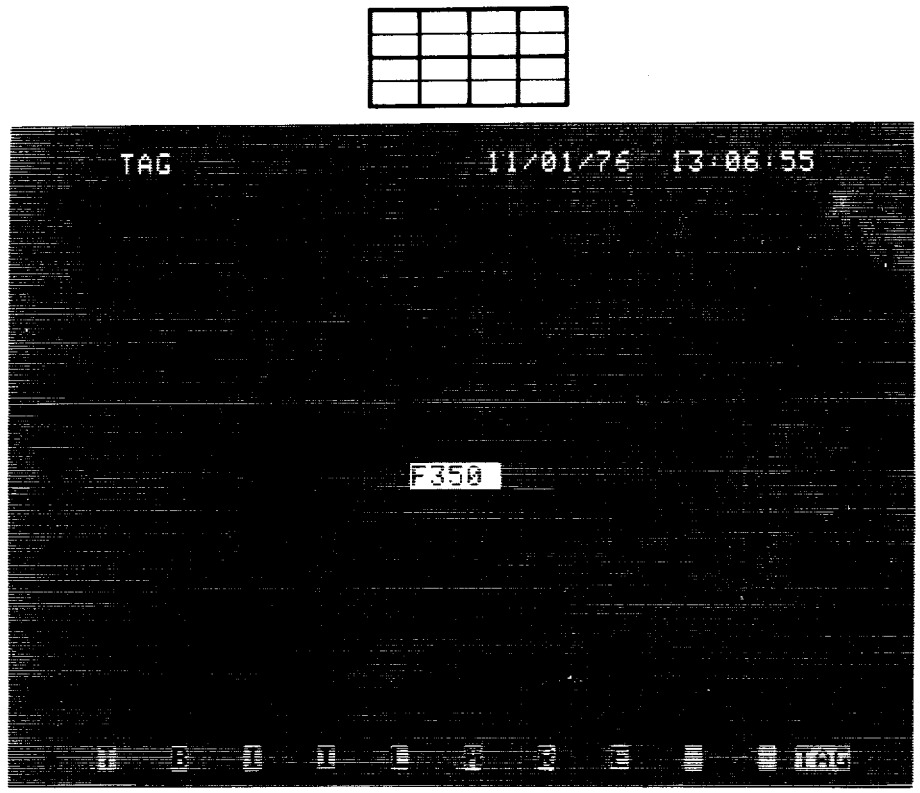
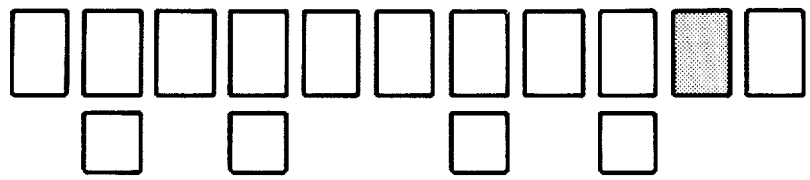
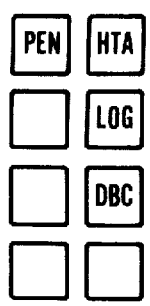
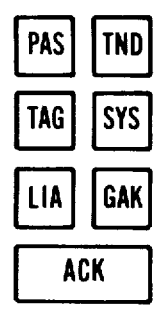
DISPLAY
- Loop tag less suffix
KEYBOARD
- ([T] through ■ ) tag suffix
- ([TAG]) reset to reenter tag
FIG. 33

LOOP F350 ADDRESSED — PRIMARY PARAMETERS
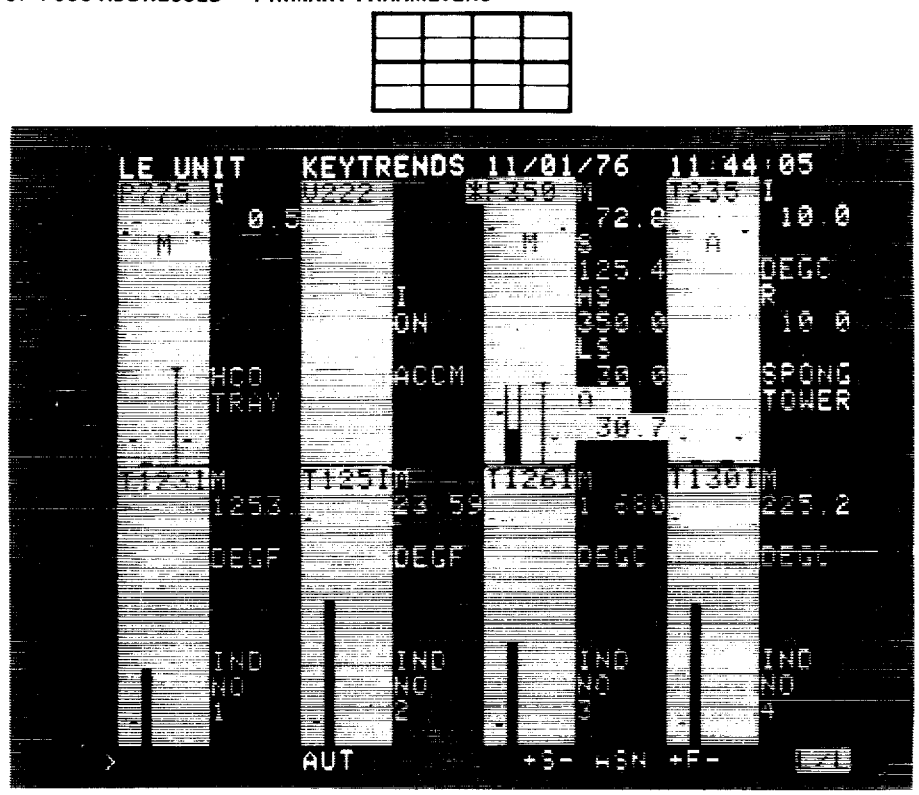
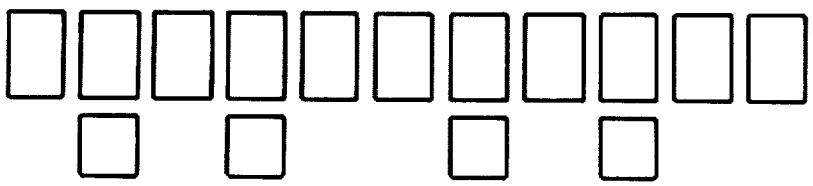
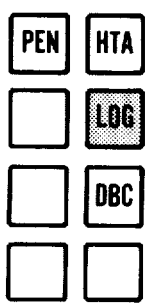
DISPLAY
- Loop F350 addressed at Primary Parameters (same result as L/L from GFF)
KEYBOARD
- Identical to Tab L/L, prior page
FIG. 34

PRINTER LOGS (LOG)
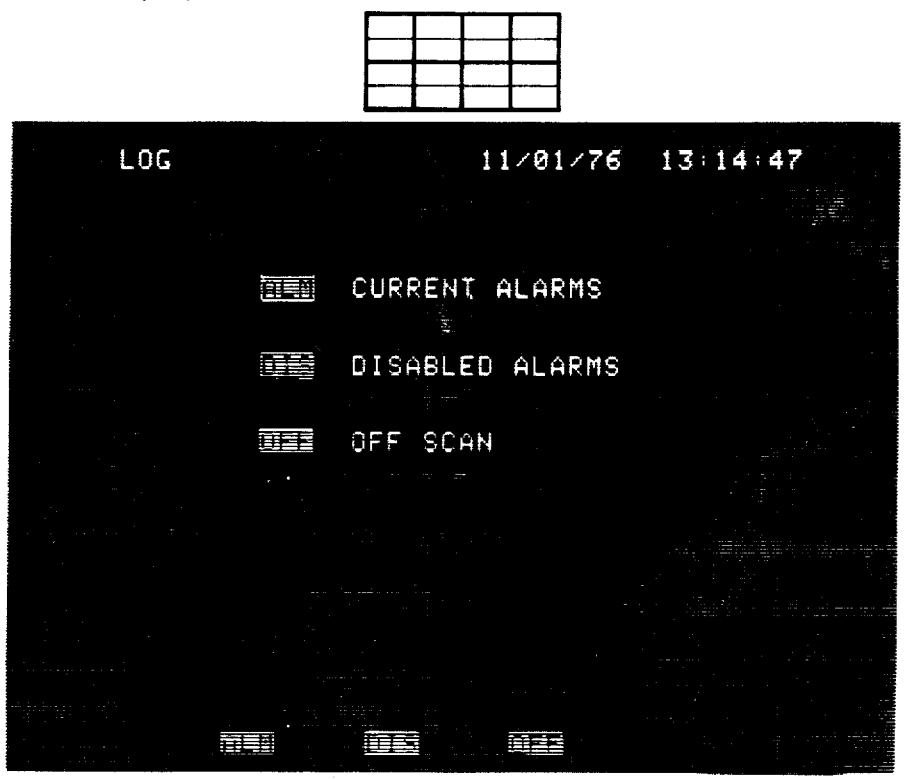
RE
LOAD
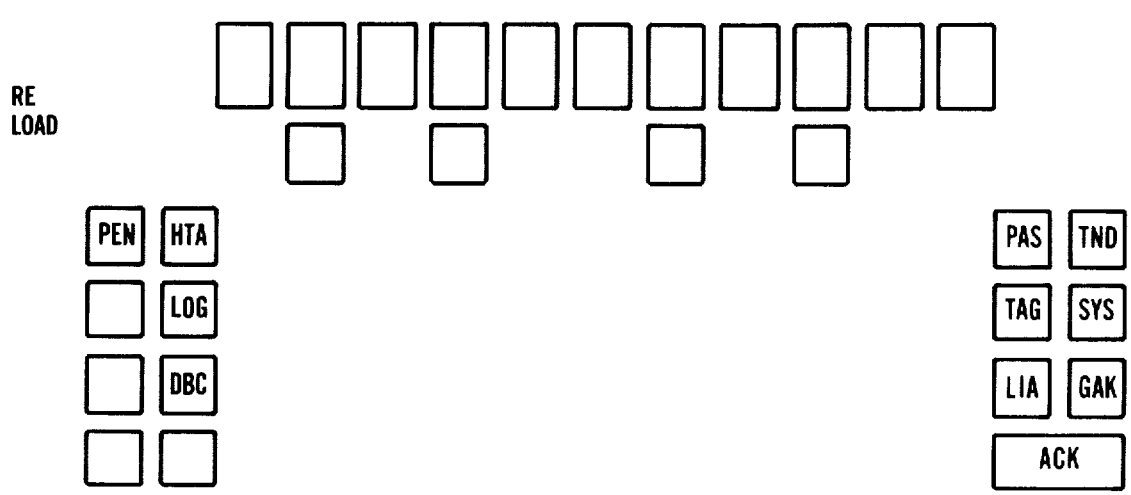
DISPLAY
• Initiate logs on printer
KEYBOARD
• ([ALM]) current alarms
• ([DIS]) disabled alarms
• ([OFF]) loops off scan
covered panel located above operator's screen        Reload button
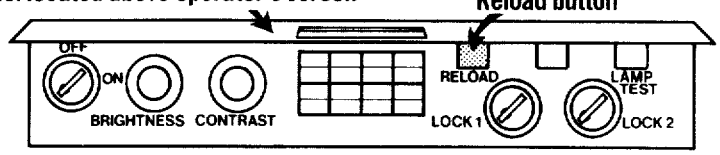
FIG. 35

SYSTEM STARTUP (RELOAD)
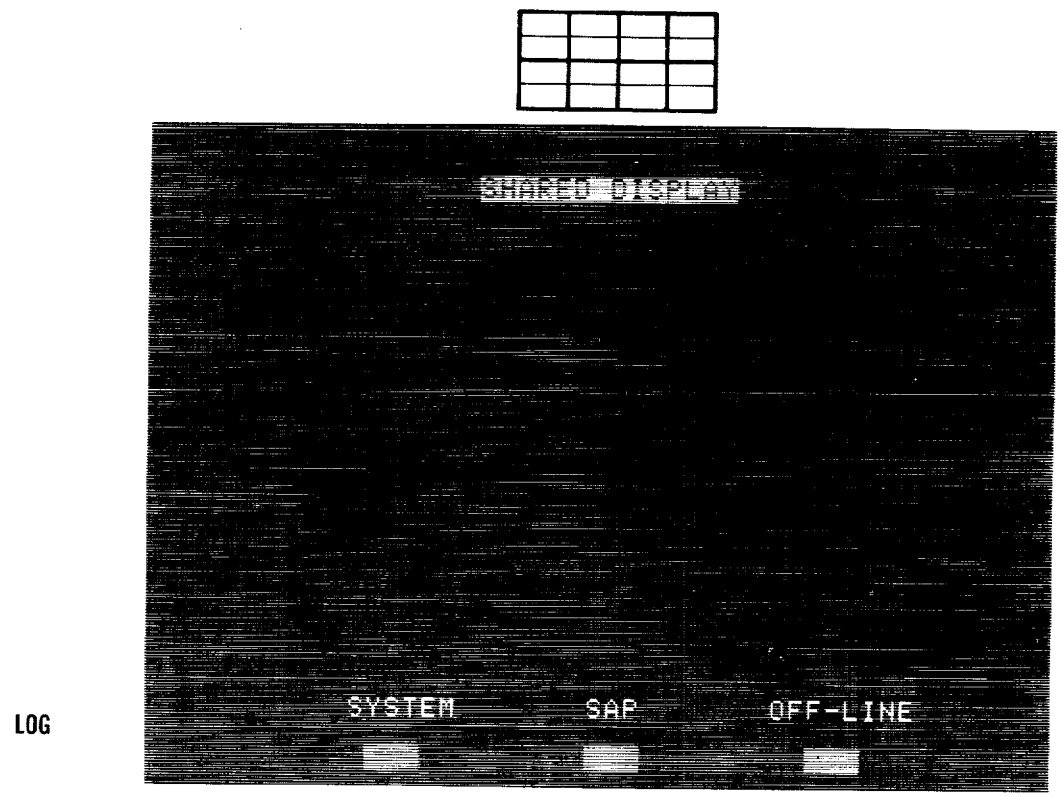
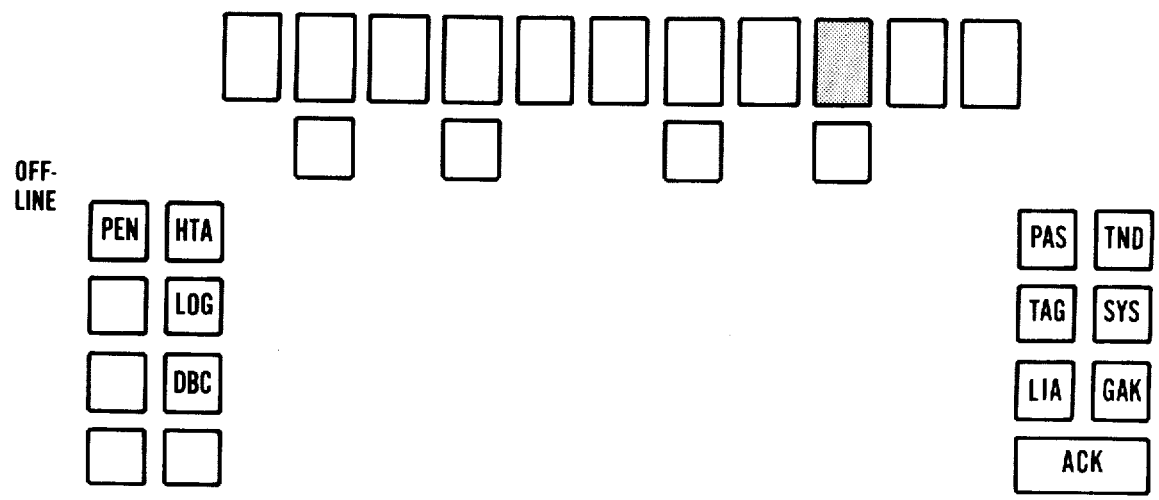
DISPLAY
- SYSTEM — on-line restart (resets to PAS display)
- OFF-LINE — access to off-line software utility programs
KEYBOARD
- (■) select SYSTEM or OFF-LINE mode
FIG.36

ON-LINE SYSTEM STATUS (SYS)
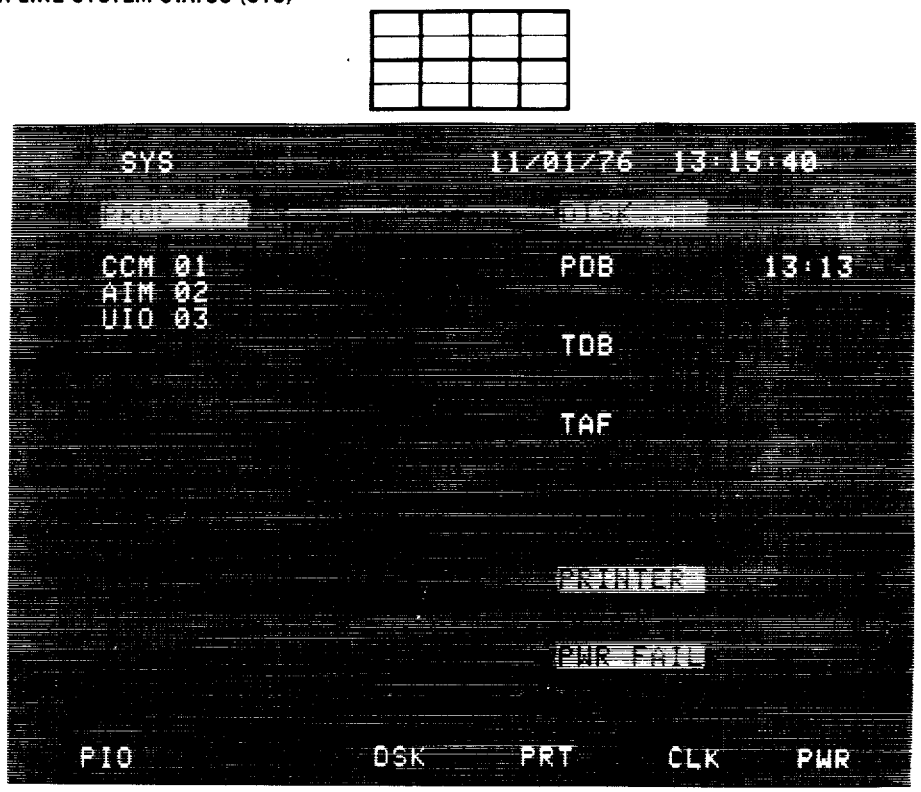
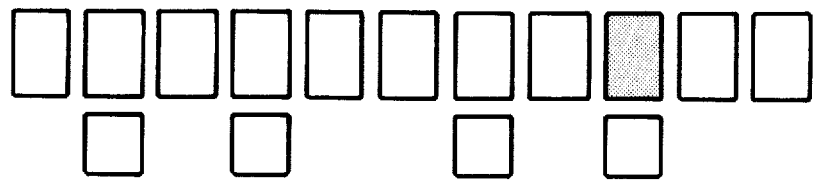
DISPLAY
- Messages describe current status of system elements (example: process data base (PDB) last updated at 13:54)
KEYBOARD
Address items on display for change
- (PIO) process input/output
- (DSK) disk
- (PRT) printer
- (CLK) system clock (change date and time of day)
- (PWR) power failure
FIG. 37

CONFIGURE FUNCTIONS
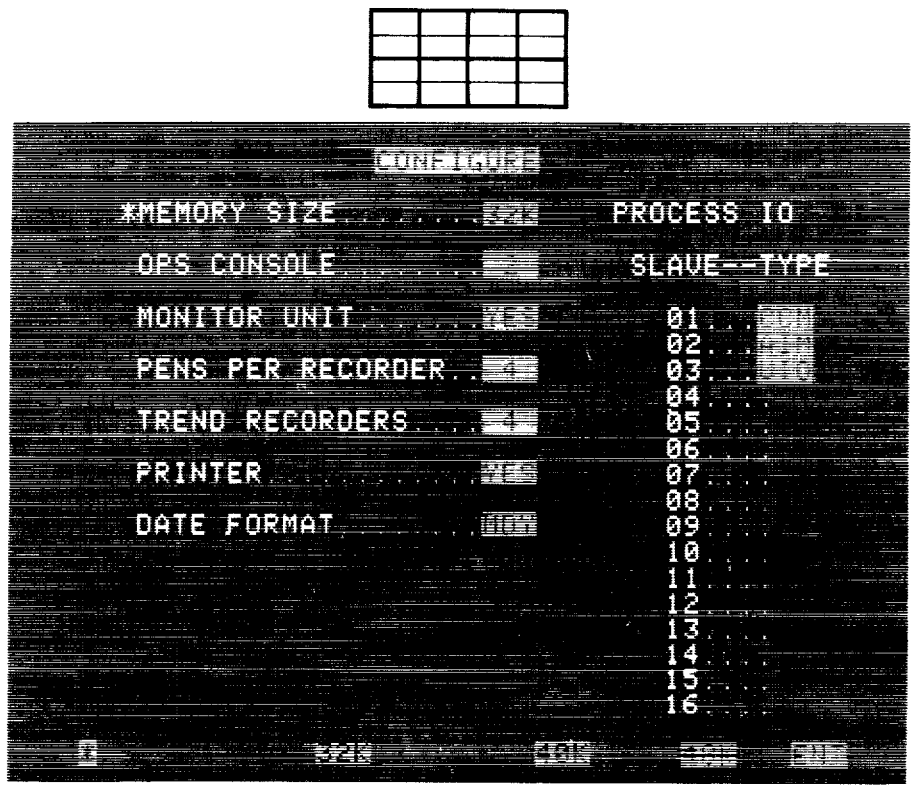
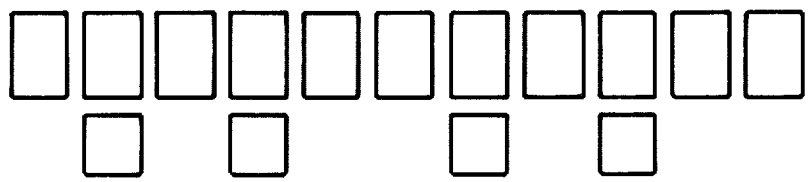
DISPLAY
- Change system hardware configuration
- Cursor selects item for change
KEYBOARD
- ([↕]) move cursor
- ([32K], [40K], [48K]) select memory size
- ([ENT]) enter new memory size (hardware must be in place)
FIG. 38

OFF-LINE UTILITIES
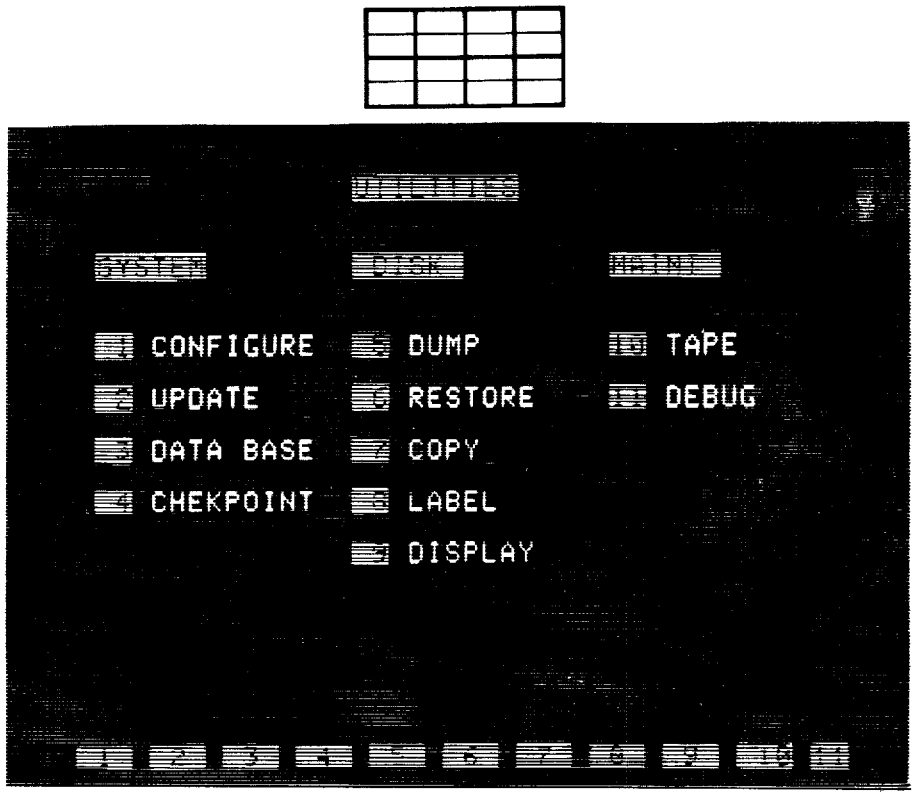
RE
LOAD
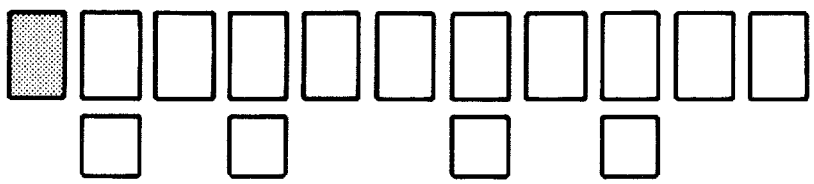
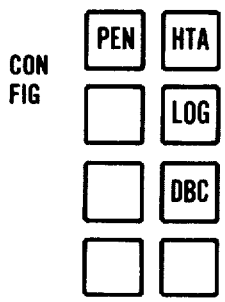
CON
FIG
DISPLAY
• Index of software utility programs
KEYBOARD
• ([1] through [11]) select numbered utility
FIG. 39

INDUSTRIAL PROCESS CONTROL SYSTEM

This is a continuation of application Ser. No. 737,195 filed Oct. 29, 1976, now abandoned.

BACKGROUND OF THE INVENTION

1. Field of the Invention

This invention relates to industrial process control systems of the type employed with complex processes involving a large number of controlled process conditions such as temperature, flow-rate, and the like. More particularly, this invention relates to such systems having visual display means for presenting to the process operator or process engineer intelligible information to aid in exercising control over the process.

2. Description of the Prior Art

Industrial process control apparatus has evolved over the years from relatively simple individual controllers for respective process conditions to very large integrated systems including digital processing equipment. As the processes became more complex, there was greater need for acquiring process information in a more effective manner for better use by the process operators. Traditionally, complex control systems have included large control panels, thirty feet or so in length, with the process information and operator control devices located at various places along the panel.

It has been recognized that such a dispersed arrangement has serious drawbacks, and a number of proposals have been made for systems in which the information and controls are more effectively consolidated. One such prior system arrangement is disclosed in U.S. Pat. No. 3,971,000, issued on July 20, 1976, to N. O. Cromwell, and assigned to the assignee of this application. Although such systems have represented an important advance in the art, and have provided significant advantages, nonetheless it has been found that still further improvements are required to more fully meet the needs of the process industry, particularly the need for more effective man/process interface arrangements.

BRIEF DESCRIPTION OF THE PREFERRED EMBODIMENT

A preferred system in accordance with this invention comprises at least one operator's console having a CRT display device (or the like) driven by a stored-program digital processor under the control of an operator's keyboard. The processor is connected by a transmission line to interface equipment which transfers data between the processor and conventional process control equipment including analog controllers, condition sensors, process valves, and the like. Signals representing the states of the process control equipment, and the process condition valves, etc., are regularly relayed to the digital processor which thus contains in its memory a comprehensive summary of the pertinent data respecting the process. The operator at the console can, through the keyboard, bring to the CRT screen any of a large group of special displays to provide a summary of information respecting the process, or more detailed information at various levels, respecting different portions of the process. The operator also can, in conjunction with certain special CRT displays, manipulate process parameters through operation of the keyboard.

These functions moreover are carried out, in accordance with important aspects of the invention, by uniquely-controlled man/process interactions involving special relationships between the CRT displays and the functioning of the keyboard. The console keyboard includes a group of so-called variable-function keys which are unlabelled and perform functions determined by the particular display being presented on the CRT. The function to be performed by any such key is identified by symbols appearing at the lower edge of the CRT screen, with such symbols being physically correlated with the positions of the corresponding keys. The keyboard also includes fixed-function keys which perform dedicated functions not altered by the nature of the current CRT display. The keyboard provides quick access to a whole array of command, display, monitoring, trending, alarm acknowledge, and related functions.

The assignment of a variable-function key, as indicated by the CRT display, identifies an action available to the operator. Unassigned keys are automatically deactivated, by operation of the processor, so that "illegal" operator actions are prohibited. This is very important in preventing operator mistakes which can cause serious damage.

The available keyboard functions identified on the CRT screen also serve as sign-posts for the operator, giving him a quick understanding of the available options he has in (1) seeking additional or more detailed information, or (2) taking proper control actions such as by adjusting appropriate process parameters. The operator does not have to memorize the locations of a large number of "dedicated" keys; the display itself leads him along in a preplanned manner. Not only does this save critical time in dealing with plant emergencies, but in addition it encourages self-training for the operators in minimum time.

A specialized and comprehensive set of CRT displays has been incorporated in the processor memory, each available to be called up by the operator as needed. These displays are developed in a hierachical fashion, with the highest level being overall plant information, the next level providing more specific information about separate areas of the plant, a third level presenting still more detailed information respecting respective groups of individual process control loops, and a fourth level providing specialized data about individual loops in any selected group.

Operator interaction with the process is accomplished by adjustment of process control loop parameters. These parameters (control variables) may be considered, somewhat arbitrarily, as falling into one of three categories: (1) primary control parameters which indirectly affect the output to the process from the controllers (e.g. setpoint, ratio, bias), (2) direct control of the outputs to process actuators (valves) which bypass the controller (e.g. manual output, contacts), and (3) reference values used by the operator to indicate level of control performance or normalcy (alarm limits, output pointers).

The establishment or adjustment of process parameters is achieved by operation of the variable-function keyboard in combination with the CRT "loop" displays. Although data for a number of loops may be displayed simultaneously on the CRT, the keyboard at one time can only be associated with one loop for making parameter adjustments thereto. All values, both continuous and discrete, changed from this keyboard, are displayed on the CRT as actual readings derived from the respective controllers, not values sent to the controllers. A ramping technique is used to change all values incrementally, thereby avoiding large erroneous changes from operator entry errors or noise in the system.

As will be apparent, apparatus in accordance with this invention provides a highly flexible display devoted solely to the efficient handling of process information. Using remarkably simple keyboard procedures, an operator is given the right information at the right time, and is assisted in assimilating that information and acting on it quickly.

Functionally, the disclosed apparatus does all of the same things, and more, as the panel display portion of a standard control system. It consolidates information from the process, displays everything the operator needs to see, and provides the means to manipulate process variables. Instead of using familiar panel-mounted faceplate instruments, the disclosed apparatus uses a video screen and a simple keyboard to allow the operator to communicate with the process. Thus he can control the operation efficiently without having to move from one panel location to another.

In many ways, the CRT display of the disclosed apparatus is an operator's "window" into the process, letting him keep track of what is happening and helping him take corrective action. The process itself, meanwhile, is being controlled by standard rack-mounted electronics. These units perform the system's input/output, control, and computing functions. Communications back and forth between the analog equipment and the CRT display are handled by a six-wire data highway, which permits the two to be located up to 5000 feet apart.

System functional capabilities include: display of measurements, set points, alarm limits, and related process parameters; performance of process monitoring and short-term historical recording; performance of alarming and alarm status logging; and access to full process control capabilities such as set-point adjustments and switching, manual output control, and other conventional operator functions. The system also replaces such conventional operator-interactive devices as alarm lights, faceplates, special displays, pushbuttons, switches, thumbwheels, and other panel accessories.

In some of the pre-planned CRT displays, individual process loops are displayed in the form of faceplate-like graphic representations of conventional controllers to provide the operator a convenient reference to familiar values and symbols-Faceplate graphics, in turn, are supplemented by enriched information which includes engineering units, loop tags, set points, alarm points, and auto/manual loop status. In addition to promoting quick response, this supplementary information saves the operator time in filling out logs and shift reports.

Most plants are logically separated into general-to-specific levels of operation in pyramidal fashion. The apparatus of the present invention is organized in a similar fashion, with a display hierachy designed to lead the operator quickly from general alarm notification directly to the specific loop causing the alarm.

At the top of the display hierachy are plant level displays which summarize the total plants' operations or major section of a plant under control of a single operator. Typically, plant level displays are divided into eight sectors to help operators focus quickly on alarm conditions or access information on any one of the sixty-four possible groups listed on the plant display.

Area level displays provide the next level of operating details. These include both an area alarm summary (AAS) and a so-called area full value faceplate (AFF) display. There is one of each type for each of the eight sectors listed in the plant display. Alarm summaries intensify and flash the loop tag number for any of the eight loops listed within a group needing operator attention. Area full value faceplate displays offer graphic measurement and set-point presentations that correspond to loops listed on the area alarm summary.

The third level provides group displays which combine graphic and alphanumeric information, emulating an instrument faceplate, for each of up to eight loops. Digital data provides precise values for variables which appear in graphic form while graphic movements illustrate relative changes of variables being observed.

At the most detailed level, loop displays provide full value faceplate displays for all loops listed in any of the group level displays. As an operator changes operating parameters using variable function keys on the keyboard, the digital portion of that loop's display (called a "page") is intensified for the value being affected. The meaning affixed to the variable function key is displayed at the bottom of the screen, enabling only those loop operations which may be performed by the operator. While making adjustments to one loop, the operator can monitor the effects of those changes on other loops within the same group.

Groups of control loops can be logically grouped to match process requirements, and critical loops common to multiple process units can be included in as may different displays as desired. Thus there is no need for the operator to switch from one display to another to find out how a critical loop is being affected by adjustments being made to another loop. The supplementary digital data included on each loop display is inherently more accurate, allowing operators to read and set parameters to much closer tolerances. Also, fewer mechanical and electronic components in the loop measurement display mean better accuracy and reliability, less drift.

With an effective alarm management system as disclosed, operators can be given early warning of impending troublespots, assuring quick response and prevention of unnecessary shutdowns. The apparatus to be described has a built-in alarm management system designed to provide early recognition of process upsets, minimum operator time response and correct operator reaction. This permits advance planning of how operators will react to emergency situations.

Located above the operator's CRT screen is an alarm light panel which provides immediate indication of alarm conditions in any area of the plant. Once the operator directs his attention to the area in which the alarm exists, flashing intensified video indications lead him quickly to the specific loop in alarm. Automatic alarm acknowledgement occurs as soon as he accesses the loop. Once accessed, appropriate keyboard actions can be taken to remedy the alarm condition. Critical plant alarms are given additional emphasis by way of an audible alert, assuring prompt operator response.

All plant alarms can be automatically logged on an optional alarm logging typer. This saves the operator time during emergency situations, allows change-of-shift summary reports to be generated, and provides a convenient listing of alarm data for future use. In addition, an optional direct-connected alarm light panel provides continuous alarm indication in the event of system shutdown.

A valid response to an alarm results in a change of displays on the display unit, a change in the status of alarm lights and silencing the horn. However, the system retains and indicates the alarm notification after acknowledgement until such time as the process condition has been corrected. At that time, the alarm system clears the notification of alarm and the alarm printer records (in black) clearance of the alarm. Each new alarm goes through this alarm procedure as it occurs.

Two types of trending are available: (1) real-time, and (2) historical. Trends are displayed either on the screen or on pen recorders. Real-time measurement data can be displayed in either quarter-screen or half-screen formats, with each variable displayed in 0–100 percent range. Trends are updated as often as every 6 seconds. Data can also be simultaneously recorded on optional pen type trend recorders which are easily accessed through fixed function keys. For historical trending and recording, the apparatus has a memory system which provides short-term (up to 24 hours) retention of up to 200 process measurements. Data is stored on a disk and can be recalled at any time. Readout can be in quarter-screen or half-screen format, or historical data can also be used to drive pen recorders.

For continuous plant monitoring functions, "Plant Overview Deviation Display" provides normalized bar graph indication of measurement deviation from set point in areas throughout the plant. This display gives the operator a readily available overview of plant status as well as early warning of impending alarm conditions.

It is possible to configure displays to achieve optimum process/operator interaction, and to reconfigure them at any time. Display structures and parameters can be modified in both form and emphasis, with no need to cut steel, perform rewiring, or insert new instruments. During startup, for example, when measurements and outputs are more important than alarm indications, display emphasis can be placed on those variables. Then, when the plant is on-stream and in smooth operation, emphasis can be redirected to alarm notification, quickly and easily. Also, additional process loops can be added at the desired locations simply and inexpensively.

Panel manufacturing and installation may be completely eliminated, along with the extensive wiring inherent in the conventional control panel approach. Wiring errors are eliminated, and hookup is easier. The disclosed apparatus takes up only a fraction of the space required for conventional control panels, so control room structures can be made smaller. Also, panel and instrument servicing requirements are eliminated.

A separate engineer's keyboard ties in directly with the operator's console. Using the ASCII data format, this keyboard is used primarily on-site for configuration and manipulating the process data base. A process system data base is generated using the engineer's keyboard in conjunction with operation keyboards. The data base is unique to each plant process and contains information that establishes set points, ratios, bias values and other monitored scan points. Once set up, the data base can be modified as required during normal plant operation.

Accordingly, it is a principal object of this invention to provide a process instrumentation system having significantly superior facilities for enabling an operator to effect rapid and precise control over a complex industrial process. A more specific object of the invention is to provide the process operator with improved process information displays and interactive means to enable the operator to exercise control in coordination with such displays. Other objects, aspects and advantages of the invention will in part be pointed out in, and in part be apparent from, the following description considered together with the accompanying drawings.

BRIEF DESCRIPTION OF THE DRAWINGS

FIG. 5 is a symbol key for use with the flow diagrams of a number of following drawing figures;

FIG. 14 is a table presenting the variable function keyboard symbols for the different conditions of operation with an "Operator Set Loop";

FIGS. 15–39 illustrate a series of typical operational procedures, showing the CRT display and the corresponding keyboard status at each stage of the sequence.

DETAILED DESCRIPTION OF THE PREFERRED EMBODIMENT

Figure 1:
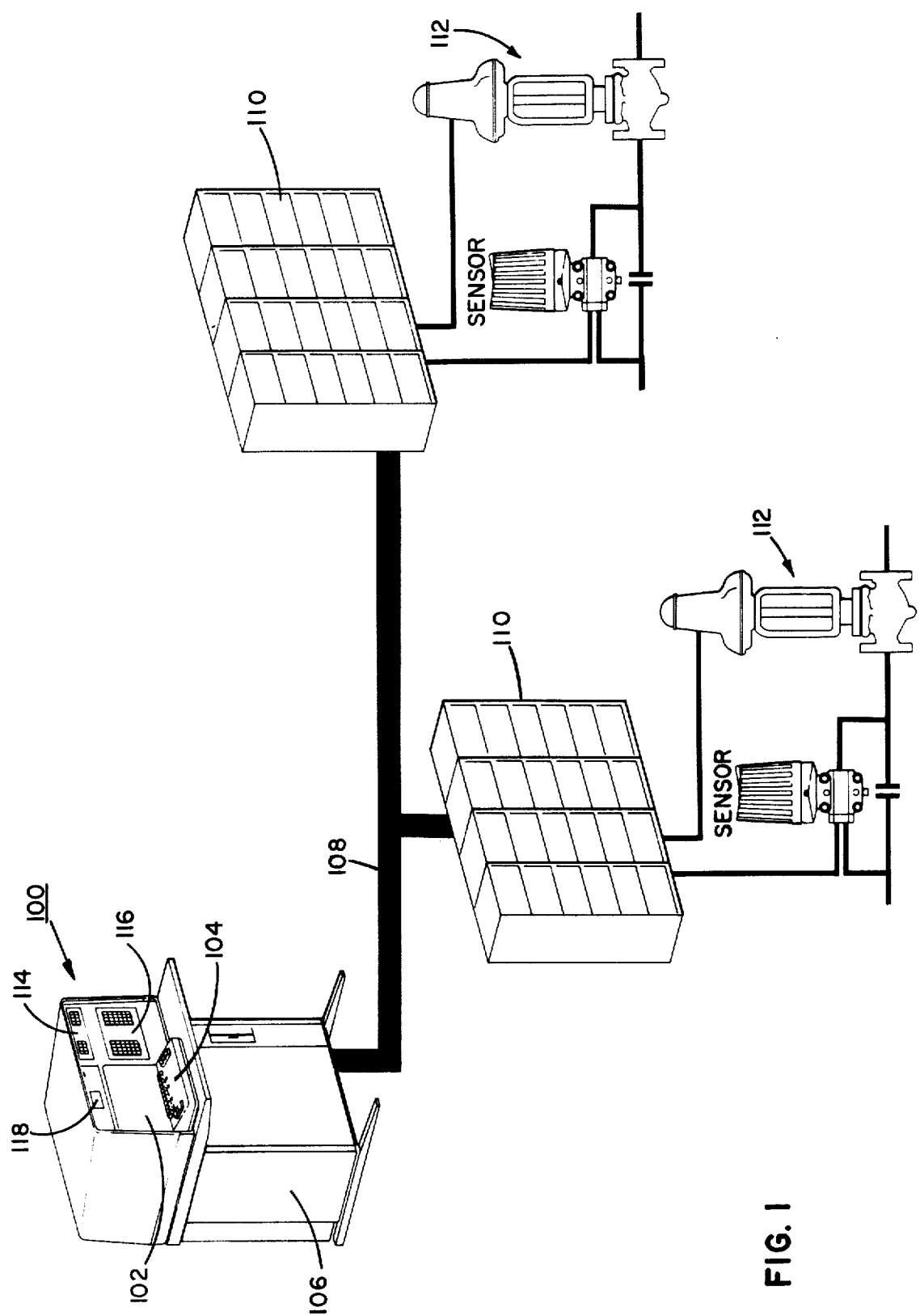
FIG. 1 is a pictorial view of a process control system in accordance with the invention.

Referring now to FIG. 1, the system comprises an operator's console generally indicated at 100 including a CRT display device 102 and an associated operator's keyboard 104. Beneath the console is a data processing unit 106 which includes means operable in conjunction with the keyboard 104 to control the images displayed by the CRT screen, as will be explained. The console 100 is connected to remotely-located electronic control equipment 108 by a six-wire transmission "highway" 110 which transmits digital data in the form of serial pulses, in both directions.

The control equipment 108 and line 110 can be of known design, for example as shown in U.S. Pat. No. 3,760,374 (S. A. Nabi). This equipment includes analog controllers for developing appropriate control signals for corresponding process valves 112, and interface equipment for translating between the analog signals for the process valves and the digital signals transmitted through the transmission line 110. Each interface equipment serves in effect as a slave unit for a group of controllers, providing thereto set-point signals, and receiving status signals such as condition measurements, etc. The interface unit sends back update signals for set-point, controller output, and automatic/manual status. The process under control can be any of many different types having a large number of different process conditions, such as fluid flow, temperature and so on, to be maintained at predetermined values.

The console 100 also may include, at the right of the CRT 102, an alarm console having a set of system security alarms 114 and a more extensive set of process alarms 116. A set of area alarms 118 also is located above the CRT. There are eight alarm indicators in this set, corresponding to eight (maximum) plant areas. These alarm indicators signal an alarm condition (deviation, absolute, or bad input) in one or more loops in the corresponding plant area.

Figure 2:
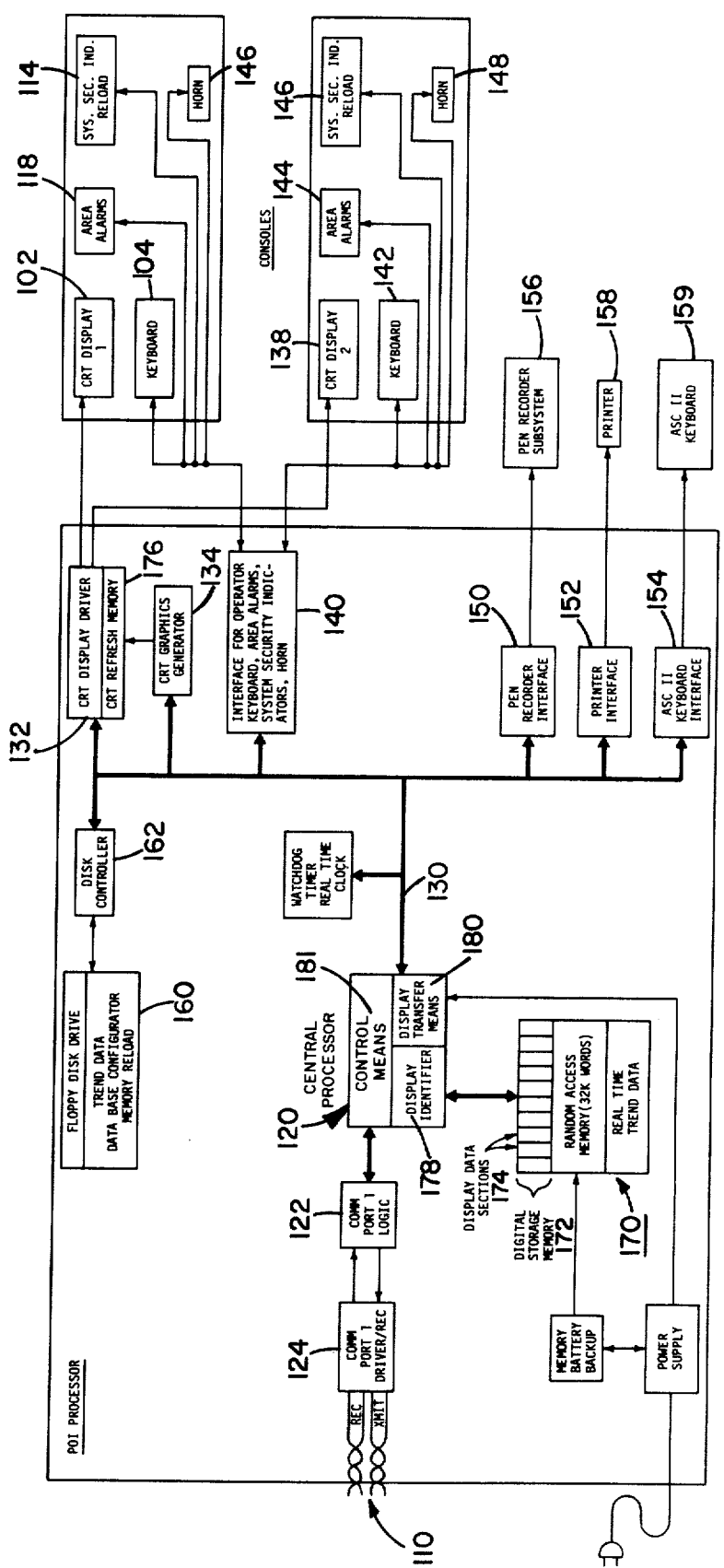
FIG. 2 is a schematic diagram, in block format, showing details of the operator's console for the system of FIG. 1.

Referring now to FIG. 2, the data proccessor unit 106 is shown to comprise a central processor 120 which at its left is connected to the transmission line 110 by a conventional communication port logic unit 122 and a driver/receiver 124. The processor 120 directs interrogating signals periodically to this line, and receives back signals representing the status of a very large number of different categories of equipment and measurements, such as the magnitudes of process conditions, the current values of control set-points, the status of on-off type control elements, and so forth. The processor also transmits control signals through the line 110, such as signals for altering the values of selected set-points, or altering the output signals from analog controllers when in "manual" state. For more information on such devices as are described above, and referred to hereinafter, reference may be made to the abovementioned U.S. Pat. No. 3,760,374 to Nabi, as well as to U.S. Pat. No. 3,895,380 to Peterson, and U.S. Pat. No. 3,582,621 to Lawler, all of which disclose exemplary prior art devices.

The central processor 120 also is coupled to a multi-bit data bus 130 which provides communication, under processor control, to a number of other parts of the system and the operator's console. Thus the data bus leads to a CRT driver 132, and an associated CRT graphics generator 134, which supply CRT drive signals to two CRT displays 102, 138. (The second CRT 138 is not shown in FIG. 1, since it is not a necessary part of the system, but is shown in FIG. 2 to illustrate the adaptability of the system to different application requirements; the system can readily be further augmented by additional displays.) The data bus 130 also leads to a console interface 140 which in turn communicates with: (1) the operator keyboards 104, 142, at the respective display units, (2) area alarms 118, 144 at those units, (3) system security indicators 114, 146 at those units, and (4) warning horns 146, 148 at the display units.

The data bus 130 also connects to three further interface units 150, 152, 154 for: (1) a pen recorder 156, (2) a printer 158, and (3) an ASCII engineer's keyboard. A floppy disk unit 160 and associated disk controller 162 also are tied to the data bus 130 to provide for several ancillary functions including memory reload, data base configuration, and storage and playback of historical trend data.

A principal function of the central processor 120 is to control the CRT displays at the operator's consoles. Associated with the processor is a random access memory 170 comprising a digital storage memory 172 dedicated to storage of data for the CRT displays. This memory is divided into separate sections 174 each containing a set of digital display data defining a corresponding complete display for the CRTs. The data in these sections is adapted to be selectively transferred to the CRT display driver 132 for controlling the CRTs. The display data is stored in a CRT refresh memory 176 in the CRT display driver, and controls the display image presented on the CRT.

One section 174 of the digital storage memory 172 contains display data serving to present in separate display regions of the CRT summary information concerning the control status of respective process areas, e.g. the display identified as Plant Alarm Summary Display in subsequent descriptive material herein. Other sections contain further sets of digital display data each representing detailed information concerning a corresponding area summarized in a respective region of the CRT display produced by the data from the one section containing summary information, e.g. displays referred to hereinafter as Area Alarm Summary Displays. The sets of display data in the various memory sections also include display data for presenting along the lower edge of the screen, to identify the functions of certain variable-function keys on the keyboard 104, a variety of different symbols as will be explained hereinbelow.

When any set of display data from a selected memory section has been transferred to the refresh memory 176, the identity of that particular section is recorded in the central processor 120, e.g. in the portion thereof referred to as the display section identifier 178. This portion forms part of a display transfer means 180 which is jointly controlled by (1) certain display transfer keys of the variable-function keys of the keyboard 104, and (2) the data stored in the section identifier 178. Thus, when any such key is pressed by the operator, the display data from another section 174 will be transferred to the refresh memory 176, with the particular section transferred being determined by (1) which key is pressed, and (2) which set of display data is identified by the section identifier 178. Control means 181 also associated with identifier 178 serves the comparable function of carrying out certain operator-initiated adjustment functions again in accordance with the identified display, and the variable function key which is pressed. The display transfer means and the control means can be hard-wired logic, or software controlled.

Figure 3A:
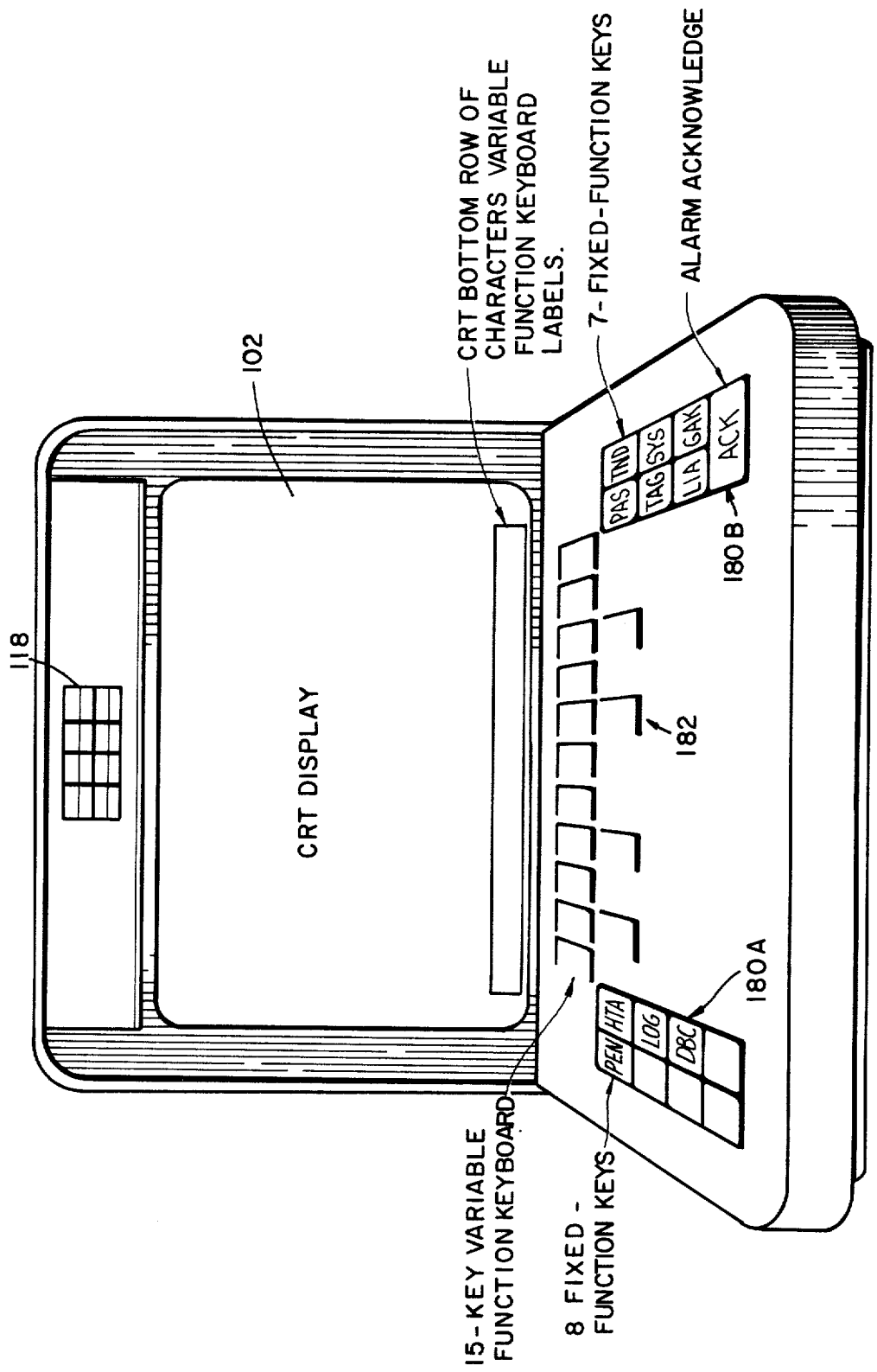
FIGS. 3A, 3B, and 3C present the operator's keyboard in detail, and showing typical variable function keyboard labels.
Figure 3B:
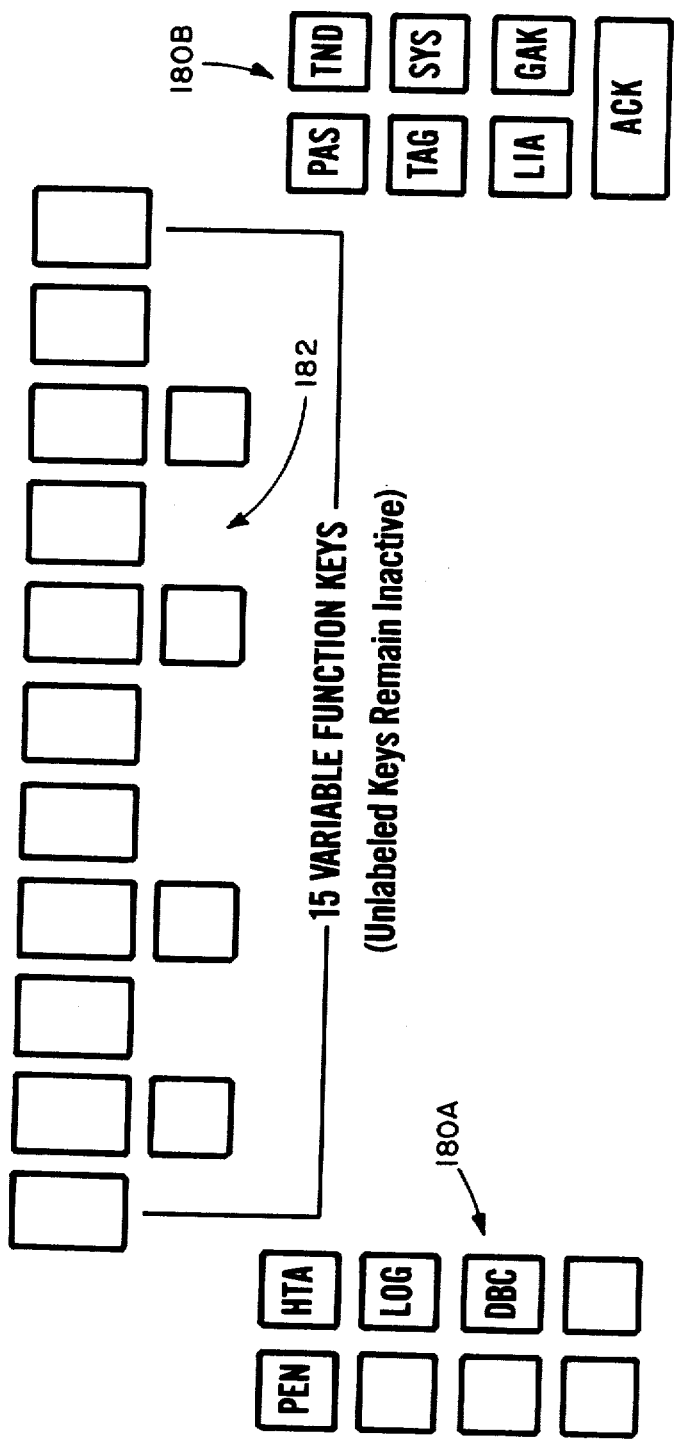
Figure 3C:
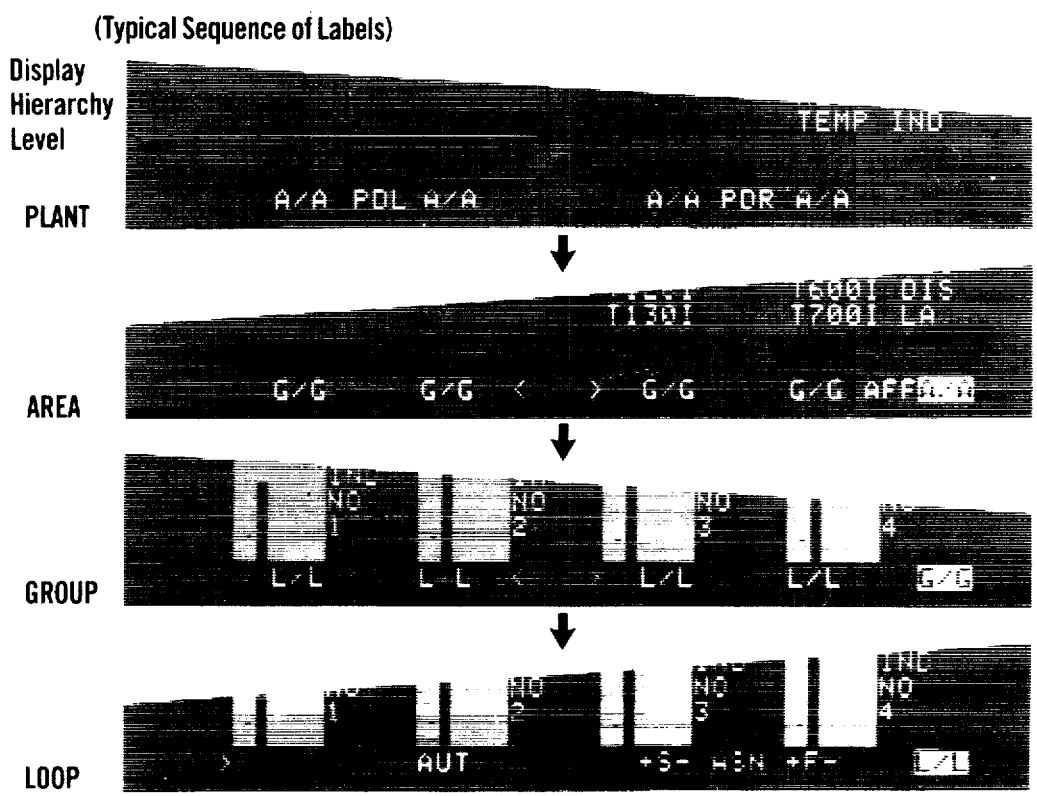

The keyboard 104, shown in enlarged form in FIGS. 3A, 3B, is divided into two functional groups: a two-part section 180A, 180B with keys which have fixed or dedicated functions for major categories of console control, and a second group of keys 182 which as described above are variable in function depending upon previous actions taken by the operator. Variable function keys 182 are physically unlabelled (blank) since the function of each key varies at different stages of operation. Labels are displayed in the bottom line of the CRT and represent actions which are pertinent to the current process display. The operating procedure takes the form of a "programmed textbook", leading the operator through a specific sequence. A typical sequence of key labels is shown in FIG. 3C. At any stage in the procedure only the relevant actions are available. This reduces the "hunt" time for a particular key, and increases the likelihood of hitting the correct key. So-called "illegal actions" also are screened out. A detailed listing and description of label sets for the variable function keyboard is provided on a function by function basis in later portions of this description.

The fixed function keys 180A, 180B have a single function throughout the system, and an appropriate label is affixed to them. They provide major "initializing" functions. These constitute entries to major categories of operations which are then expanded using the variable function keys.

Those keys 180B on the right side of the keyboard are assigned to frequently used functions, while those 180A on the left side are assigned to occasional or seldom used functions. Examples of specific key assignments are as follows:

PAS—calls up the Plant Alarm Summary Display, which presents an overview of the alarm status of the entire plant, and from which the user may run through the entire hierarchical set of process-oriented displays for the system.

TND—calls up the QuarterScreen TreND Display, with which the user can display real-time trends or playback historical trends, and from which the user can page to a Half Screen Trend Display.

TAG—calls up the Loop TAG Entry program, which allows a user, by keying in a 5 character Loop Tag, to randomly select a Loop Full Value Faceplate Display of any Loop in the system, without having to go through the hierarchical area-group-loop selection process.

SYS—calls up the SYStem Status Display, which allows a user to acknowledge system security alarms on the device level and provides the facility to connect/disconnect devices to/from the system.

LIA—Loop In Alarm

GAK—Group non-critical Alarm AcKnowledge allows the user to acknowledge all non-critical alarms on a page at the Group Display Level simultaneously.

ACK—allows a user to silence horns in response to ACKnowledging process and/or system security alarms.

PEN—calls up Trend PEN Assignment Display, which allows the user to assign process variables to trend pens and to control the use of the pens from one of the consoles.

HTA—calls up Historical Trend Assignments Display, which allows the user to assign process variables to historical collection on disk.

LOG—calls up the LOGger program which provides the user with the option of printing one of the following summaries on the line printer:
1. Alarm Summary - a summary of important information about each loop currently in alarm;
2. Off-Alarm Summary - a summary of important information about each loop whose alarming is currently disabled; and
3. Off-Scan Summary - a summary of important information about each loop currently not being scanned.

DBC—calls up a Data Base Configurator program which allows a user the capability of configuring or modifying the configuration of the process data base for the system.

The layout of the variable function keys is such that four dual-key positions are formed (second, fourth, seventh, and ninth key positions from the left). The dual-key sets provide a convenient means of selecting "sectors" of a CRT display. Most displays appearing on the CRT screen are divided into eight sectors; the top half of the display comprises sectors one through four, and the bottom half comprises sectors five through eight. The four dual-key sets are used to select the corresponding sectors. For example, the left-most dual-key set is used to select sectors one and five, the next dual-key set selects two and six, and so on.

At the Loop Display Level (as will be explained more fully hereinafter), the dual-key sets are used for ramping selected values up or down. When a dual-key set is used for ramping, pressing the upper key increases the value, and pressing the lower key decreases it. Appropriate labels appear on the CRT display when variable function keys are used for ramping.

DISPLAY HIERARCHY

Figure 4:
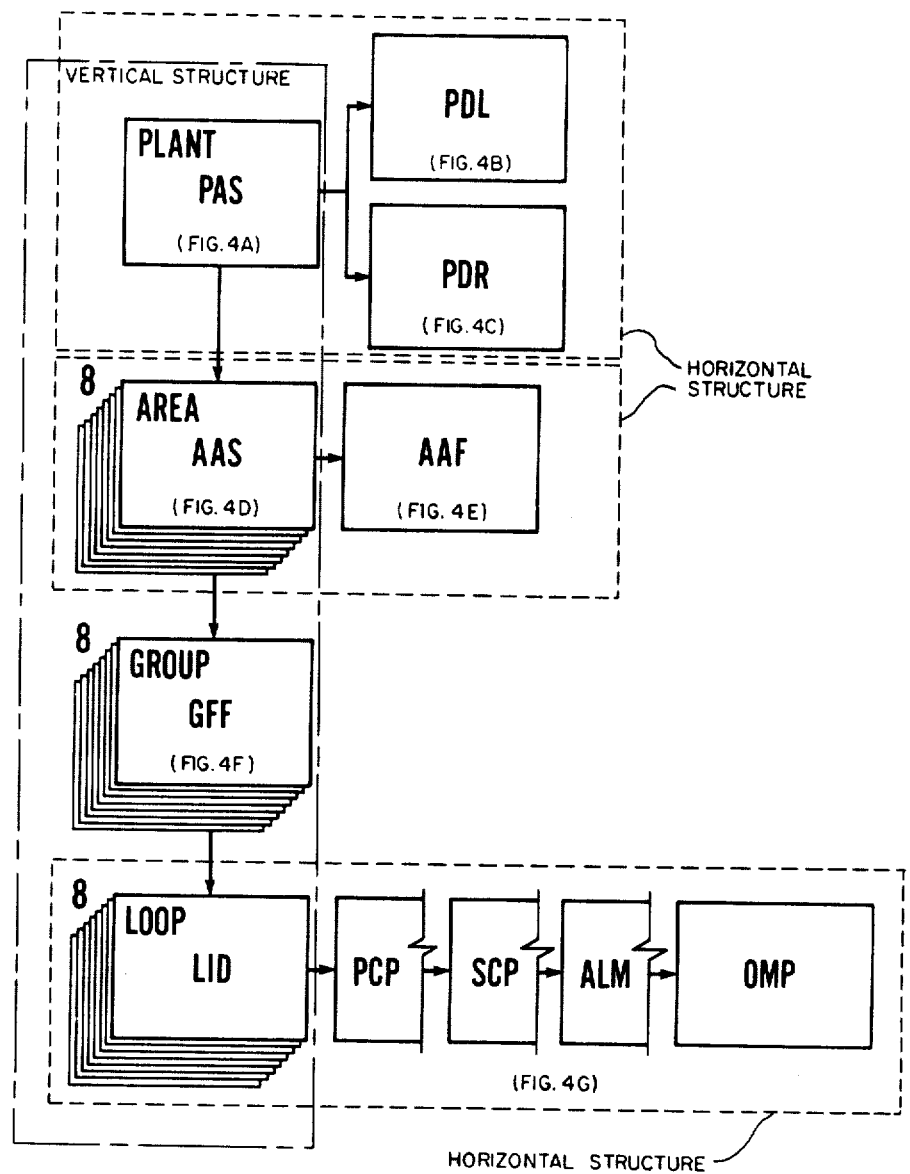
FIGS. 4, 4A, 4B, 4C, 4D, 4E, 4F and 4G, illustrate the display hierarchy of Plant, Area and Group level displays.

The operator's console presents several levels of information to the operator. At the highest level displays are provided which present overview or summary information on a broad basis; whereas at the lowest level detailed information is provided on a much more limited section of the total operation. FIG. 4 and subsequent figures related thereto illustrate examples of these displays in the categories of:
1. Plant Level Display
2. Area Level Displays
3. Group Level Displays
4. Loop Level Displays Using these four display levels, the operator may monitor major portions of the plant or, by simple keyboard manipulation, focus on a detailed function for review and/or adjustment. Adjustment of loop parameters takes place only at the Loop Level.

The four-level display hierarchy thus provides an orderly arrangement of information regarding the process under control of the operator. The following describes the overall features and general uses of the four levels of display.

PLANT LEVEL DISPLAY

One display is available at the Plant Level: the Plant Alarm Summary. This display provides summary information on the total "plant" or largest section of a plant under control of a single operator. The display is divided into eight sectors on the CRT screen. (It may be noted that all of the process operations displays are organized in this manner.) Each of the eight sectors represents one of eight plant "Areas", which is the next level of detail. Within an Area there may be up to eight "Groups" of control loops, listed by Group name. It is the purpose of the Plant Alarm Summary display to indicate the alarm status of each of these Groups within the Areas. A maximum of sixty-four groups may be listed (eight Areas, eight Groups per Area). The alarm status of each group is indicated by intensification and flashing of the Group name. The flashing indicates an unacknowledged alarm; after acknowledgement, intensification signifies that an actual alarm condition still exists.

AREA LEVEL DISPLAYS

Two displays are available at the Area Level to form the next level of operating detail: the Area Alarm Summary and the Area Full Value Faceplate. One of each of these displays is available for each of the Areas shown on the Plant Alarm Summary. The Area Alarm Summary displays up to eight Groups, one in each of the eight sectors on the CRT screen. Each Group may contain up to eight loops, which are identified by loop tag numbers. On this display alarms are related to loop level conditions by intensification and flashing of the loop tag number. In addition, the type of alarm is also listed alongside the loop tag in the form of a two-or-three-letter mnemonic code.

The second Area display, the Area Full Value Faceplate, offers a graphic presentation of measurement and setpoint (or measurement only) for those loops for which this information is relevant. The organization of the Area Full Value Faceplate display is consistent with the arrangement of the associated Area Alarm Summary display (i.e., correspondence between Groups and their location on the screen). The loops listed top to bottom on the Area Alarm Summary are displayed left to right on the Area Full Value Faceplate display. For loops that are purely digital in nature, the analog bar is omitted.

GROUP LEVEL DISPLAY

One type of display is available at the Group Level: The Group Level Value Faceplate. This display combines both graphic and alphanumeric information to create a "faceplate" presentation for each of up to eight loops. The faceplate concept relates directly to the idea of emulating a controller faceplate on the CRT screen, but supplemented with digital data which provides precise values for the variables which appear in graphic form. Movement (change) and relativity of variables are observed on the graphics, while quantity and absoluteness are offered by the complementary digital presentation. Each of up to eight sectors on the display is occupied by one loop display. The loop display is divided, left and right, into two portions which are simultaneously visible. In general, the analog (graphic) information plus the loop tag are presented in the left (analog) portion, and digital information is presented in the right (digital) portion.

The vertical bar in the analog portion of the loop display graphically portrays measurement and setpoint information. The outer edges of the bar represent the setpoint value, and the inner portion or "fill-in" represents the measurement value. The relative difference between the measurement and setpoint can thus be readily observed. The absolute values of the measurement and setpoint are portrayed in a relative manner by comparing inner and outer bar heights with the height of the display itself. A precise measurement value is provided by the digital portion of the loop display. The same general display format is maintained for all types of loops, whether analog or digital in nature, to maintain consistency of presentation.

LOOP LEVEL DISPLAYS

Display at the Loop Level is attained when one of eight possible loops on the Group Full Value Faceplate display is selected. Once a particular loop has been selected, the digital portion (or "page") of that loop display may be replaced by a different digital page to obtain additional digital information about the loop. This replacement of the digital page is effected by the operator, using the variable function keys. The layout of each of these displays is similar to that of the Group Full Value Faceplate display (all eight loops are displayed simultaneously), allowing the operator to observe all loops in the Group while making adjustment to the selected loop.

The fact that a particular loop has been selected by the operator is indicated in three ways:
1. The digital page of the selected loop display is changed from the original Identification Page (this is the name applied to the digital page as it appeared on the Group Full Value Faceplate display) to one of the following pages:
   a. Primary Parameter Page;
   b. Secondary Parameter Page (not applicable to certain types of loops);
   c. Alarm Limits Page; and
   d. Output Memory Pointer Page.
2. Part of the digital page of the selected loop appears in reverse video format (black characters on white background), serving as a flag to the operator. The primary purpose of this reverse video is to indicate to the operator which loop variable is currently under direct keyboard control.
3. The variable function keyboard labeling (bottom row on CRT screen) has been changed from loop selection indicators (L/L) to labels pertaining to individual loop operations which may be performed by the operator.

The shared-display of this invention supports many types of loops. While loop information and format may vary with loop type, information of a similar type is presented in a consistent manner for all loops.

Figure 6:
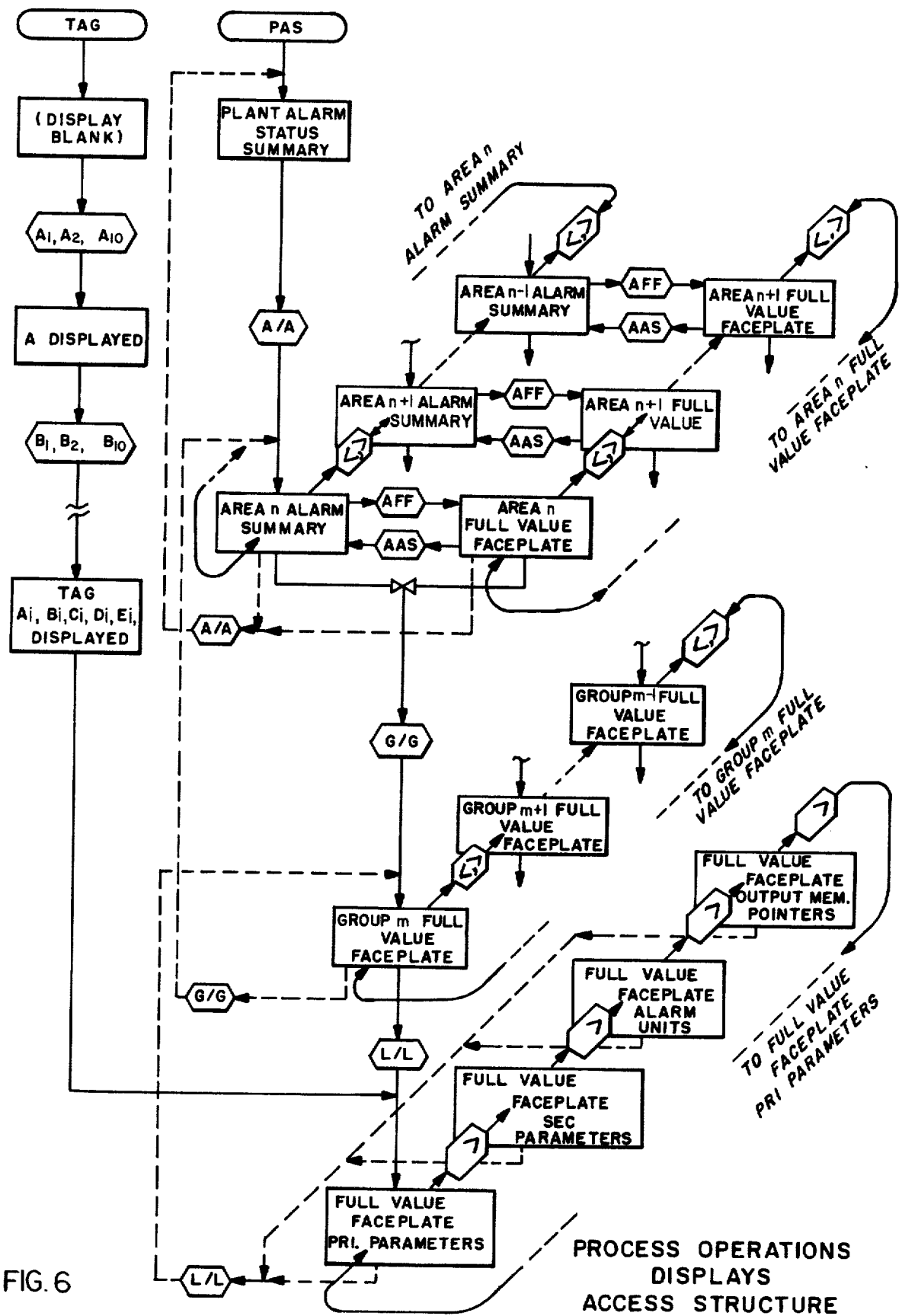
FIG. 6 is a three-dimensional diagrammatic presentation of the display access structure.
Figure 7:
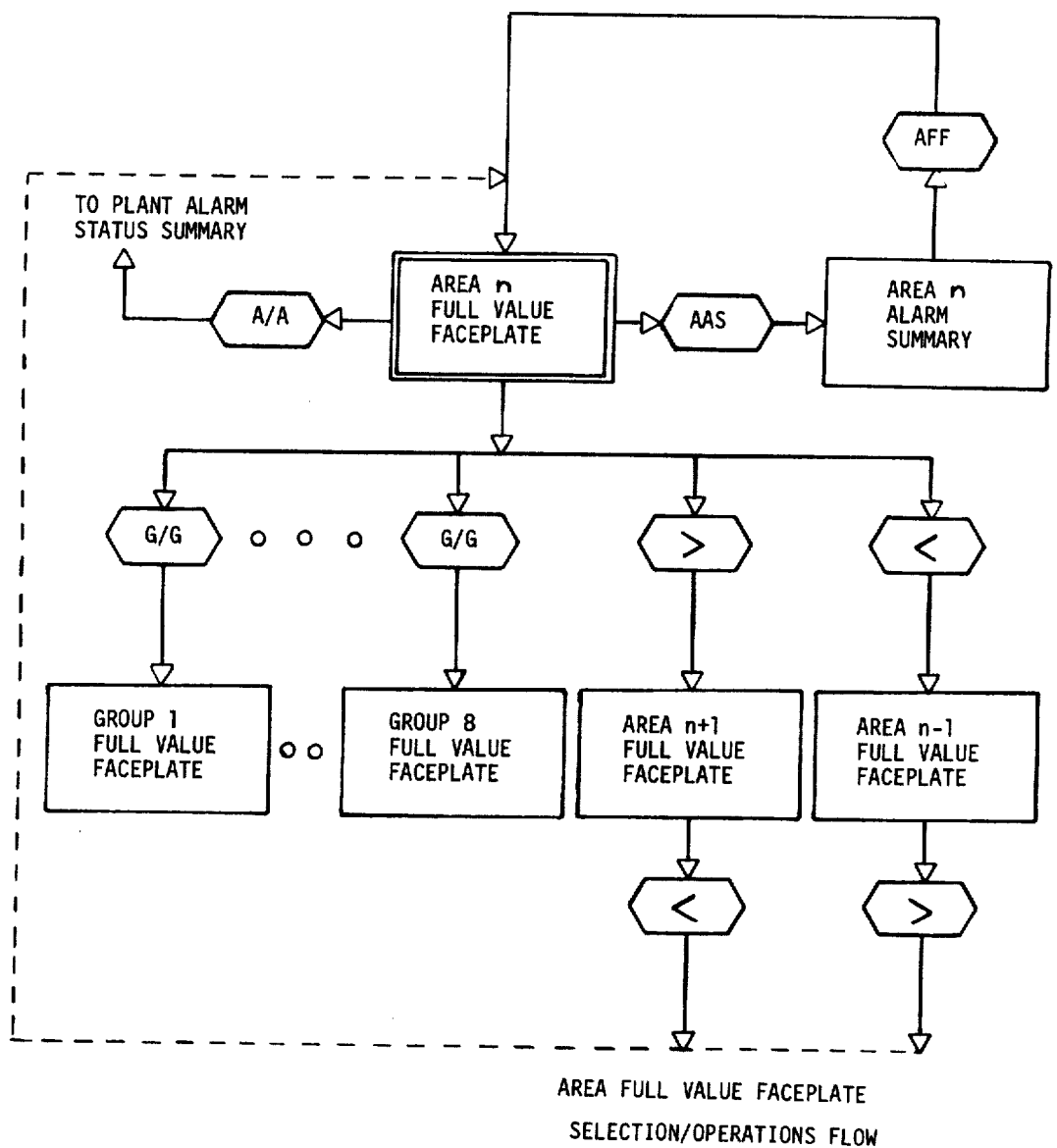
FIG. 7 is a flow diagram for the Area Full Value Faceplate selection and operation.
Figure 8:
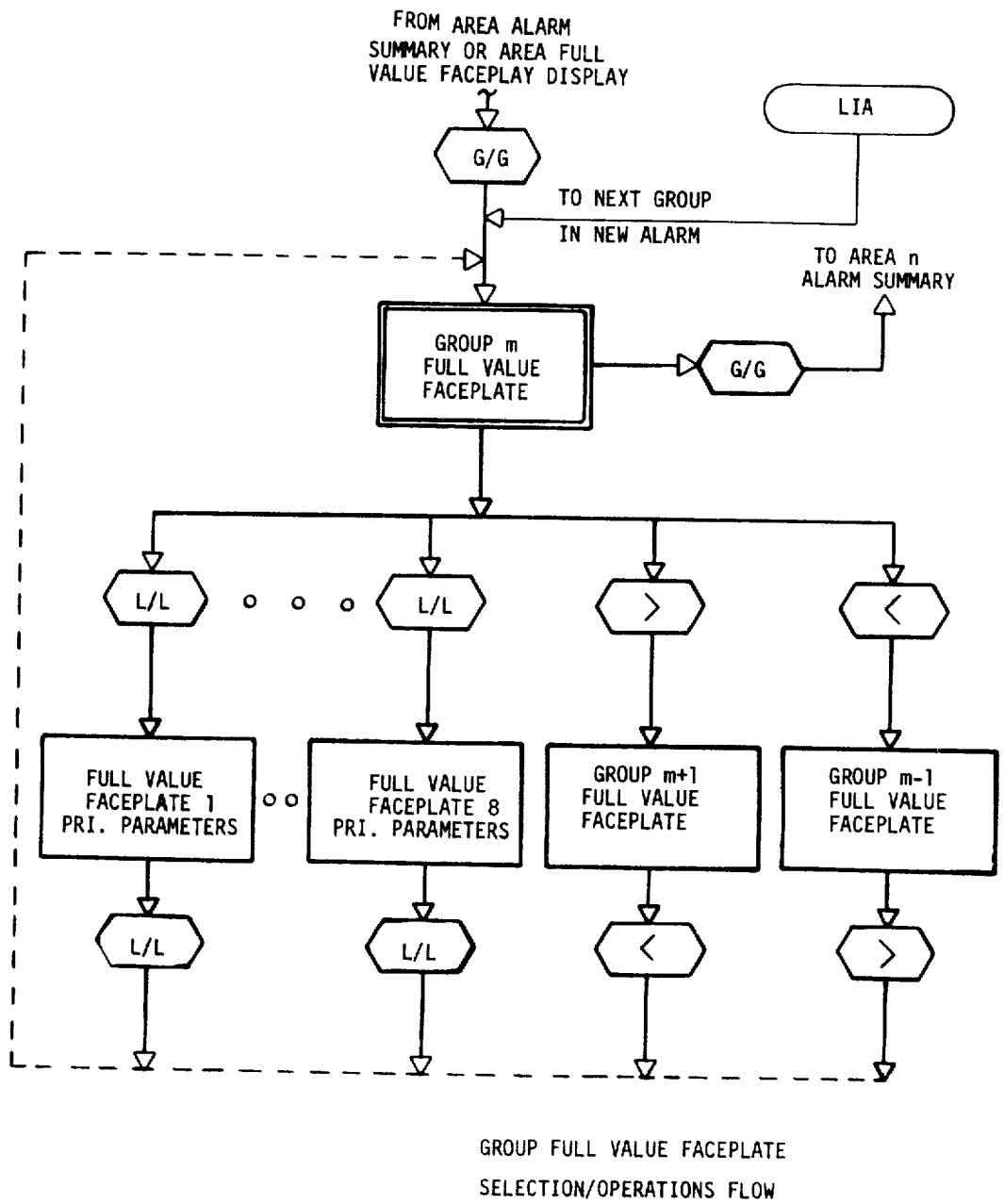
FIG. 8 is a flow diagram for the Group Full Value Faceplate selection and operation.

Three different techniques or methods are used to access the various displays. This is a function of the display presently on the screen. The three can be categorized as (1) Vertical Selection, (2) Direct Access, and (3) Display Paging. The flow chart in FIG. 6 shows the display access structure for the Process Operations Displays.

VERTICAL SELECTION

This technique relates directly to the Area-Group-Loop structure of the displays and the physical orientation on the display. Variable Function Keys are provided which relate directly to these regions. The dual keys serve this purpose. By pressing one of these keys the corresponding region is selected and the Area, Group or Loop currently displayed is thereby selected for the next level of detail. This technique relies, then, on the physical orientation of information rather than some identifier such as loop tag. As each display is selected following a key depression, a new "keyboard" appears to provide the proper labeling for the next possible selection. At each level a key is provided to return to the previous level to avoid going all the way back to initializing the display from a Fixed Function Key. These keys (the eight select and one return keys) allow for the continuous sequencing up or down through the display structure in a "vertical" manner. Each selection in a downward direction provides more detail on a chosen part of the process, whereas, in the upward direction the inverse is true—less information of a detailed nature but more of the process is made visible to the operator.

DIRECT ACCESS

An operator has the option of selecting a Loop directly by specifying a loop tag. Again, this procedure involves initialization from a Fixed Function Key (called "TAG") to provide the proper Variable Function Key labels. A five character tag (alpha or numeric for each character) is entered and the Group Full Value Faceplate containing that Loop is immediately accessed. Once at that level all functions available with the Vertical Selection technique are provided.

DISPLAY PAGING

At the Area, Group and Loop levels a form of "horizontal" selection is used to sequence through displays of the same type at each level. This feature is termed "paging" and involves the use of one or two Variable Function Keys to select consecutive displays—one display for each operation of a key. In all cases the displays are sequenced in a "wrap-around" fashion to provide continuous selection without the need to begin at any particular display.

Two paging schemes are employed at the Area level displays. One allows sequencing through all Area Alarm Summary Displays or Area Full Value Faceplate displays using the "<" or ">" key once either display type has been selected. At any point in the sequence the display type (Area Alarm Summary to Area Full Value Faceplate or vice versa) may be changed by operating the "AFF" or "ASS" keys. This second operation can be considered as a type of paging which accounts for the second scheme. Paging at the Area level is bi-directional for either scheme.

Paging at the Group level allows for sequencing through all Groups within the selected Area. Again, the "<" or ">" key is used to page in a forward or reverse sequence, respectively.

Once a Loop has been selected from a Group Full Value Faceplate display, paging is used to select one of up to four digital pages. Since each loop type has different amounts of data and parameters, the number of pages will very from one to four. For example, the Secondary Parameter page applies to only the External Set Loop. Therefore, all others require three or less pages. Paging at the Loop level is uni-directional using the ">" key which is always the left most key on the Variable Function keyboard.

Figure 4A:
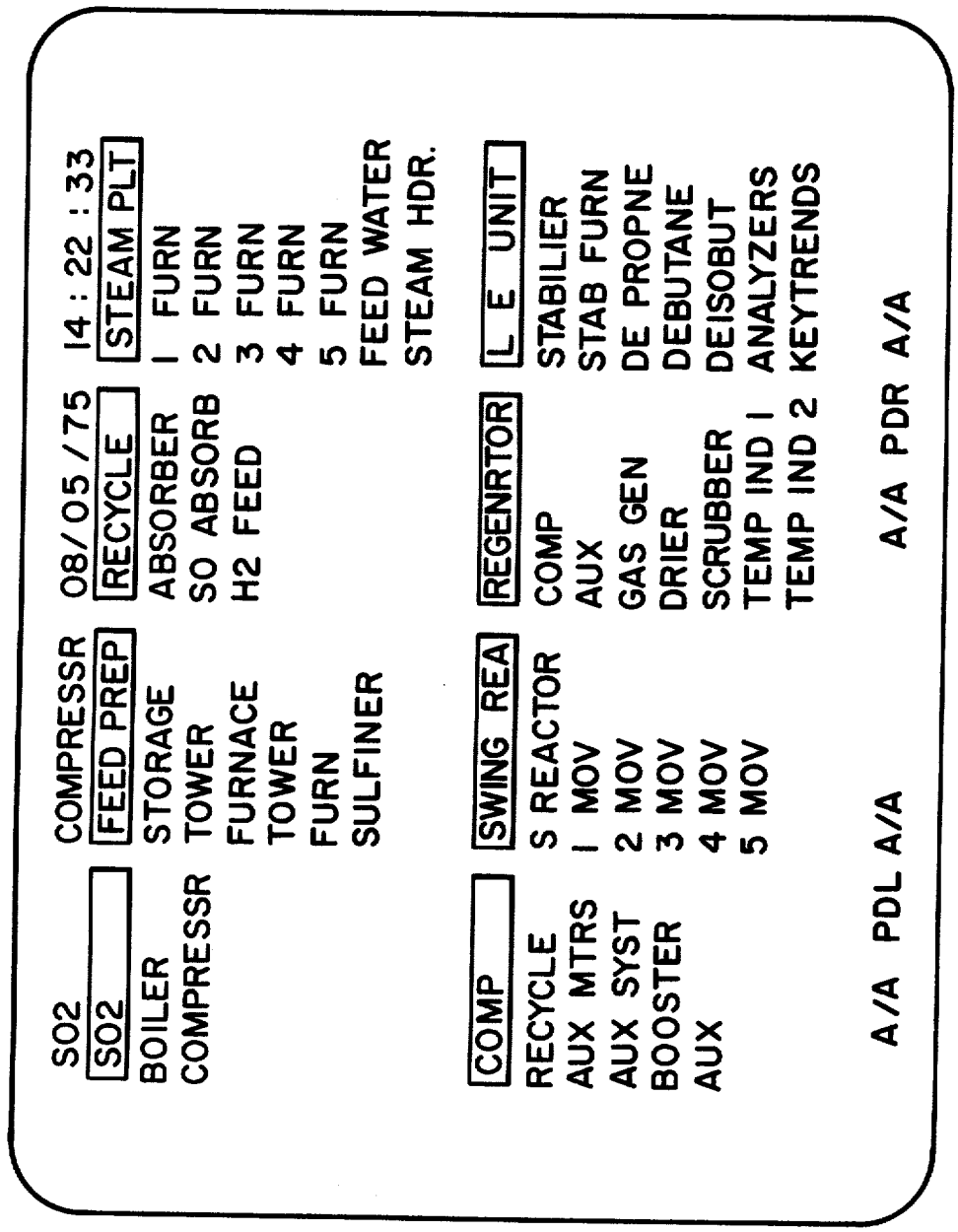

FIG. 4 outlines the sequence of displays in the display heirarchy. FIGS. 4A, etc., present exemplary displays relating to an alarm condition in one loop, T225.

The Plant Alarm Summary of FIGS. 4A serves as an index to all Areas and Groups in the plant. The sole purpose of this display is to direct the operator to the Group in alarm. It does this by intensifying and flashing the appropriate Group name. This display also provides the following ancillary information:

1. Previous Area and Group Selected as indicated in the upper-left portion of the display. This serves as a memory device to the operator, allowing him to return to a previous Group or Area display to resume an operation which for instance he may have interrupted in order to examine an alarm condition.
2. Date: current month, day, year.
3. Time-of-day: In addition to being a convenient time indicator, this feature provides a visible Display Processor "heartbeat" indication. That is, if the Processor should stall or become "hung-up" for any reason, the seconds indication immediately ceases to increment, indicating to the operator that a Processor malfunction has occurred. Time is displayed in 24-hour format.

Figure 4B:
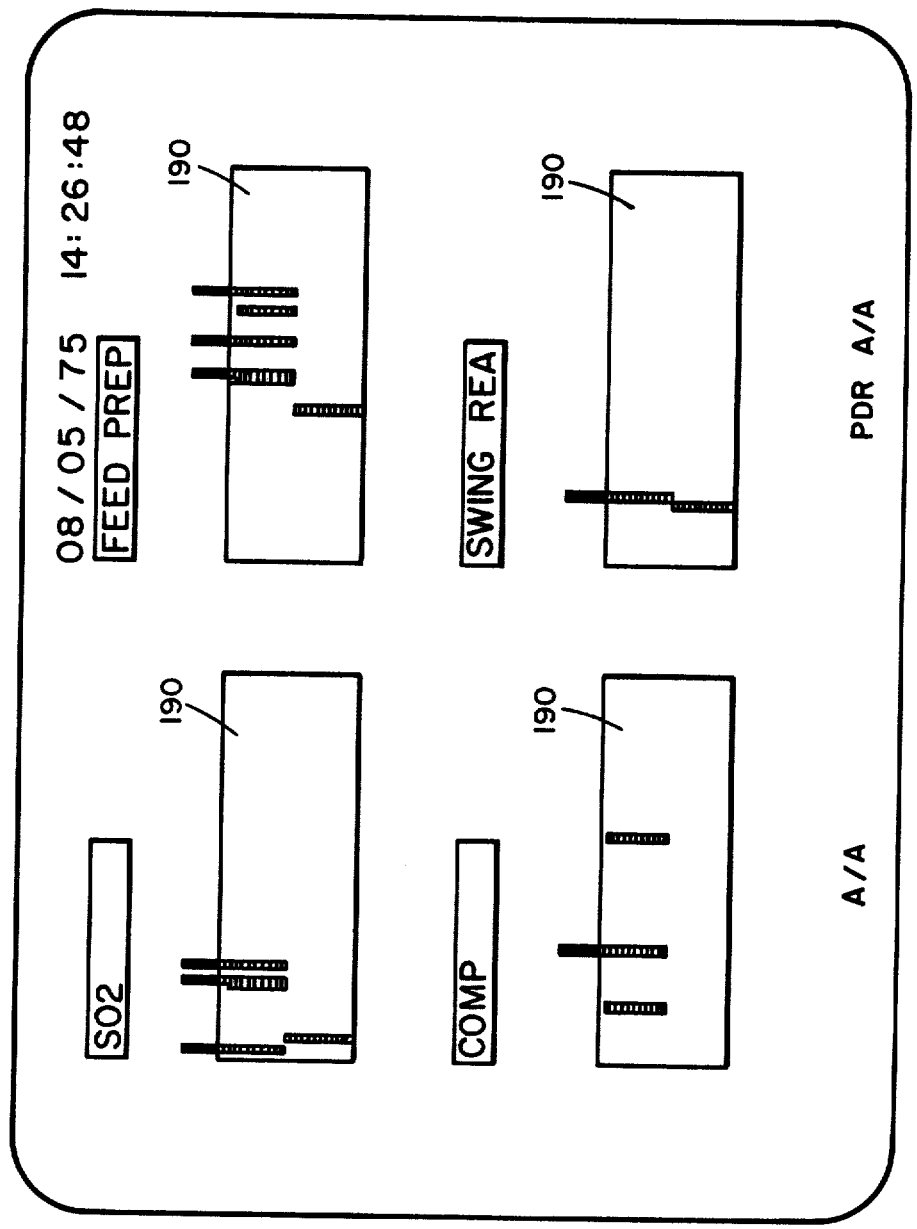
Figure 4C:
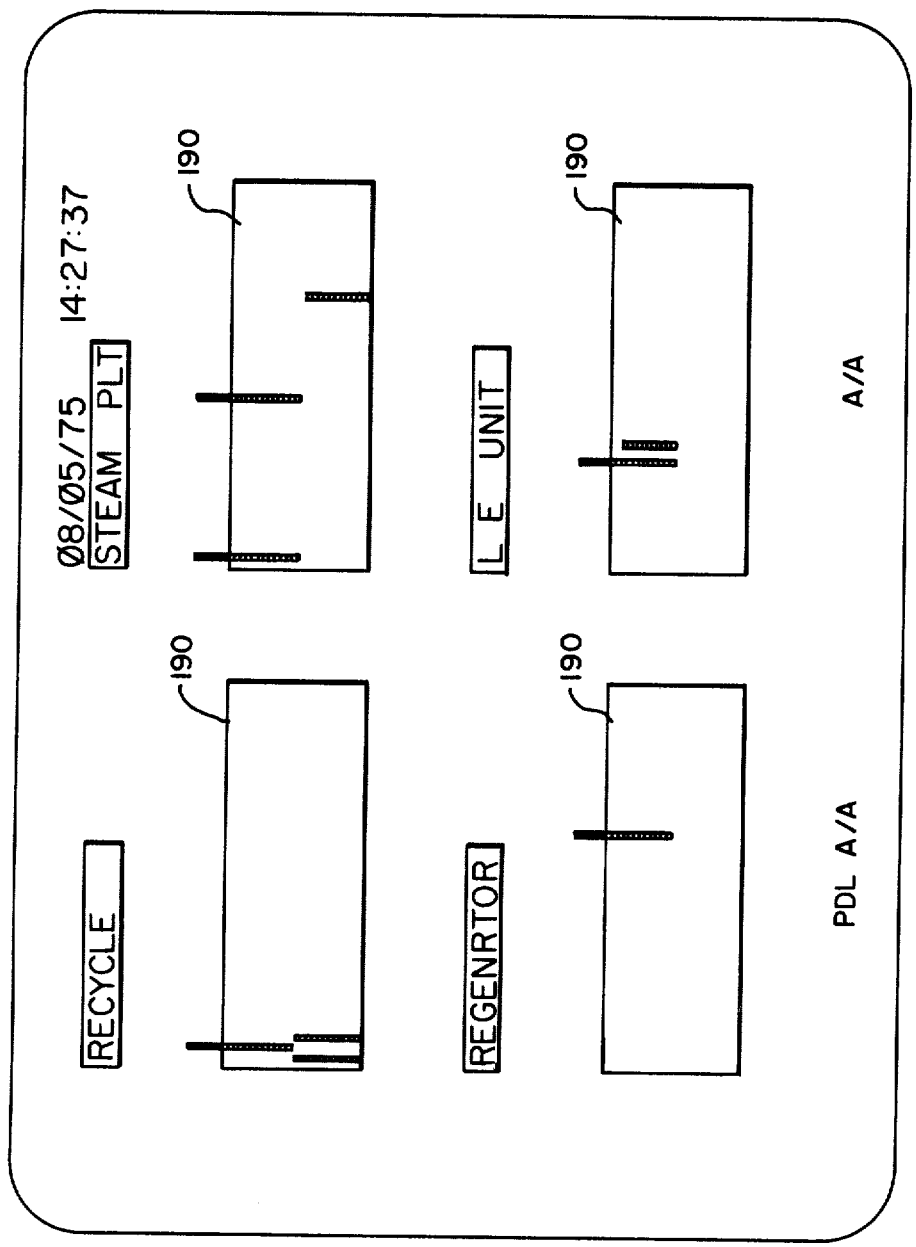

As shown in FIGS. 4B and 4C, Process Overview Deviation Displays consist of two separate displays each presenting information about one-half of the process. The display presents the deviation between measurement and setpoint for all control loops. Each display contains four areas of eight groups. The deviation value for each control loop is normalized to the respective loop deviation limits. The deviation limits are represented by the upper and lower bounds of an inverted video block 190.

The condition of no deviation is represented by a dot in the center of the inverted video block. A positive deviation is represented by a vertical bar rising upward from the center of the block; a negative deviation by a vertical bar descending downward from the center. As the deviation limit is exceeded, the vertical bar is inverted to white on black.

Figure 4D:
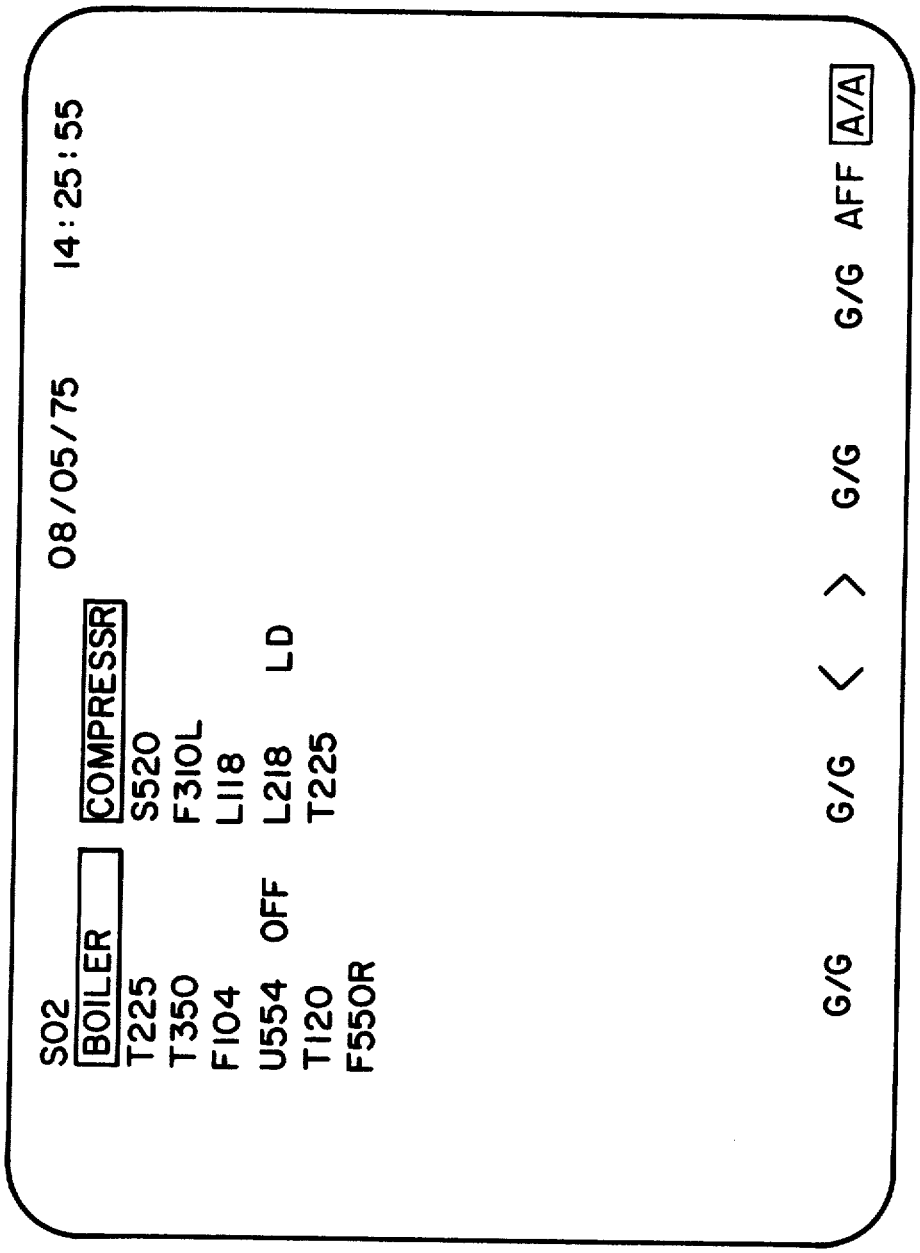

The loop in alarm, T225, is in the BOILER Group. The Plant Alarm Summary alerts the operator to the existence of an alarm condition in the BOILER Group of the S02 Area by flashing the word BOILER on and off repeatedly. To obtain closer scrutiny of the alarm condition the operator selects, for display, the S02 Area. This is done by means of the variable function keys, which are labeled by the bottom row of characters on the screen. The A/A labels, positioned above the dual key positions of the variable function keyboard, indicate which keys are used to select the Areas. In this case, the S02 Area is selected by pressing the upper leftmost dual position key, which physically corresponds to the S02 Area on the screen. This action replaces the Plant Alarm Summary on the screen with the S02 Area Alarm Summary, FIG. 4D.

The Area Alarm Summary Display lists all of the loops in each Group of the S02 Area. In the example given, only two Groups comprise the S02 Area, BOILER and COMPRESSOR. To the right of each loop tag number there appears an indication of any abnormal status associated with that loop. The following indicators may appear:

1. OFF—Off Scan, no values being scanned
2. NAL—Values scanned, not being alarmed (alarminhibited)
3. IO—Hardware Device Error
4. LD—Low Deviation Alarm
5. HD—High Deviation Alarm On Scan,
6. LA—Low Absolute Alarm being alarmed
7. HA—High Absolute Alarm
8. BLANKS—No Alarm
9. OOR—Out of Range In FIG. 4D, if the S02 Area has an unacknowledged alarm condition, this is indicated by a flashing loop T225 tag number. Note that this tag number appears in the COMPRESSOR Group as well as the BOILER Group, indicating that this loop is related functionally to both groups. The presence of an acknowledged alarm condition can also be indicated by the intensified, steady ON state of the loop tag number, e.g. L118.

The Area Alarm Summary also contains a specific set of variable function key labels. The "caret" labels (< and >) denote an Area selection function implemented by pressing the associated variable function key to obtain sequential selection of all Area Alarm Summaries of the plant in a recycling sequence. A different Area display is presented for each momentary depression of the key. (In the display shown in FIG. 4D, pressing the > key would bring up the FEED PREP Area and pressing the < key would bring up the LE UNIT Area.)

Figure 4E:
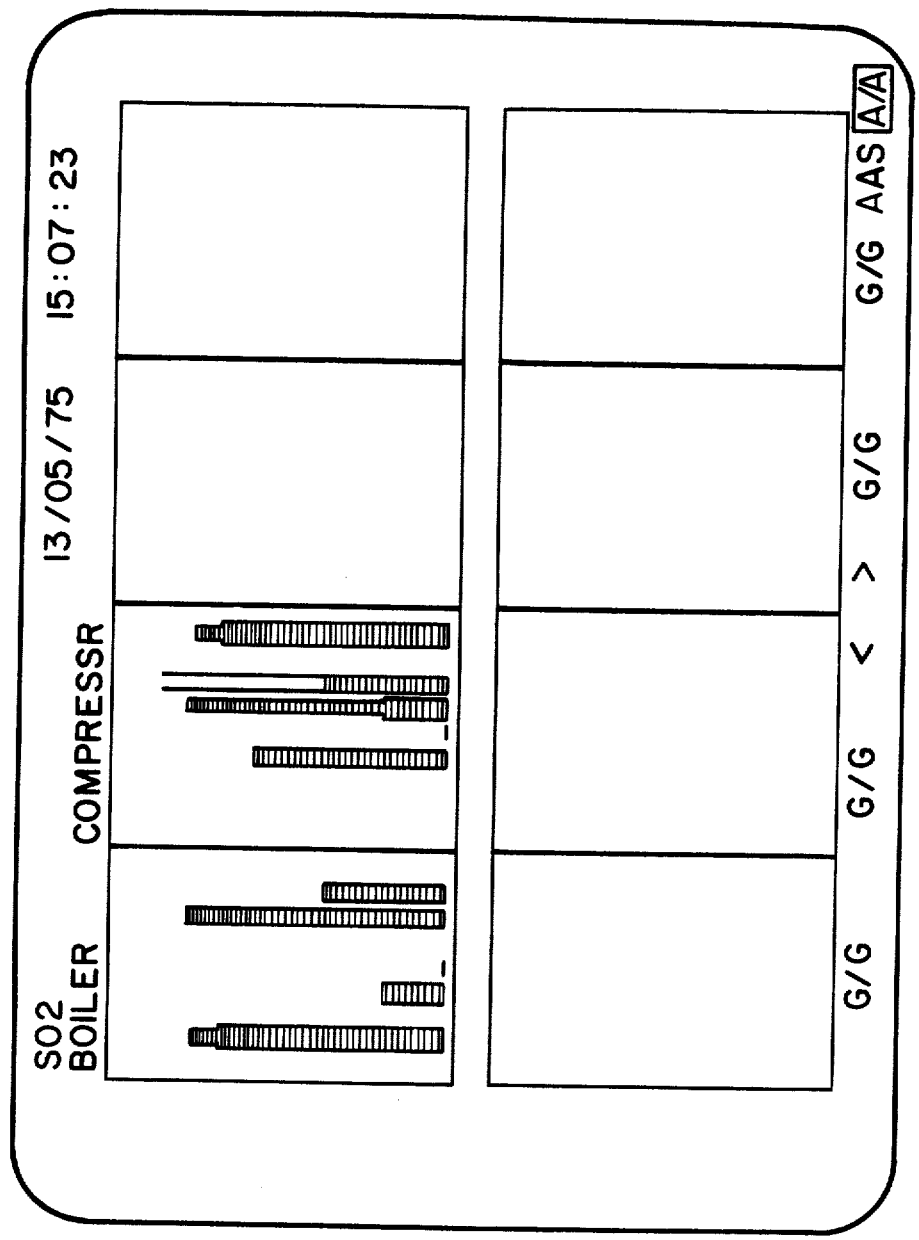

The AFF label stands for Area Full Value Faceplate; it calls up the Area Full Value Faceplate display (FIG. 4E). The key associated with the reverse video A/A label provides a convenient means of recalling the Plant Alarm Summary display To obtain a detailed view of the loop T225 parameters, the Group Full Value Faceplate for the BOILER Group is accessed. (Alternately, the COMPRESSOR Full Value Faceplate could be accessed as it, also contains loop T225.) The BOILER group Full Value Faceplate is accessed by pressing the upper left-hand dual-position variable function key, corresponding to the upper left-hand BOILER sector of the CRT display shown in the center of FIG. 4D.

GROUP FULL VALUE FACEPLATE DISPLAY

Figure 4F:
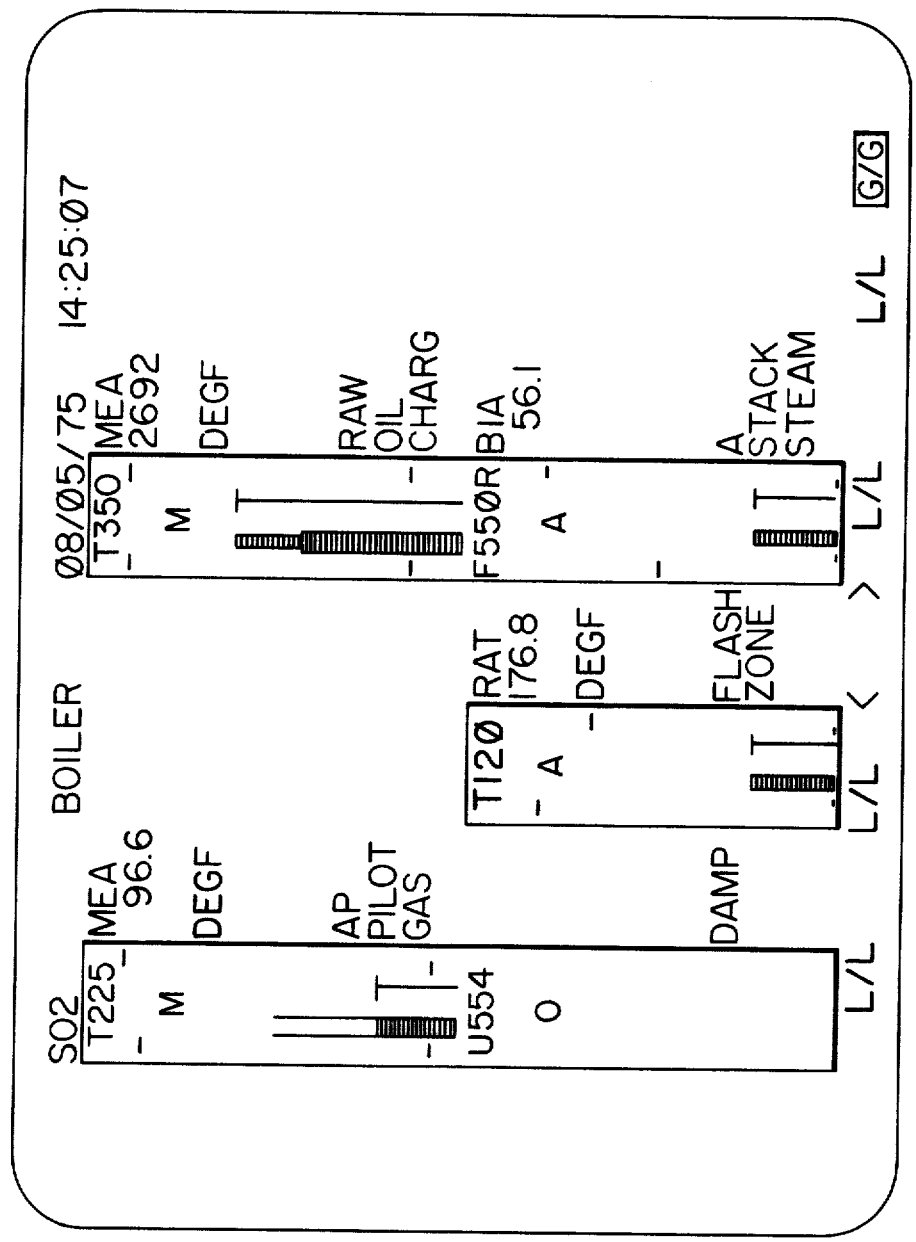

The Group Full Value Faceplate, showing detailed information on all loops in the BOILER Group, is shown in [the lower portion of] FIG. 4F. In the upper-left corner of the display the words S02 BOILER indicate that this is a display of the BOILER Group of the S02 Area. Note that several types of loops are represented in this particular Group: in the lower portion are a damper loop, a ratio loop, and a bias loop. The same general analog format is maintained for all loop types of consistency of display.

The variable function keyboard labeling has also changed from the previous display. The L/L labels indicate that a particular loop may now be selected for observation and/or manipulation. The paging keys (< and >) are used in the same manner as in the previous display, except in this case Groups rather than Areas are displayed in recycling sequence. The key associated with the reverse video G/G label provides a convenient means of recalling the Area Alarm Summary display.

In the analog portion of the T225 display a bar is used to graphically represent measurement and setpoint values. The outer edges of the bar represent the setpoint value, and the inner portion or "fill-in" represent the measurement value. The two small marks to the left of the bar are high and low absolute alarm limits. When the measurement value exceeds either of these limits (the fill-in of the bar rises above or falls below both marks) an absolute alarm condition exists. The horizontal line immediately to the right of the bar is an output indicator providing representation of the controller output value.

Figure 10:
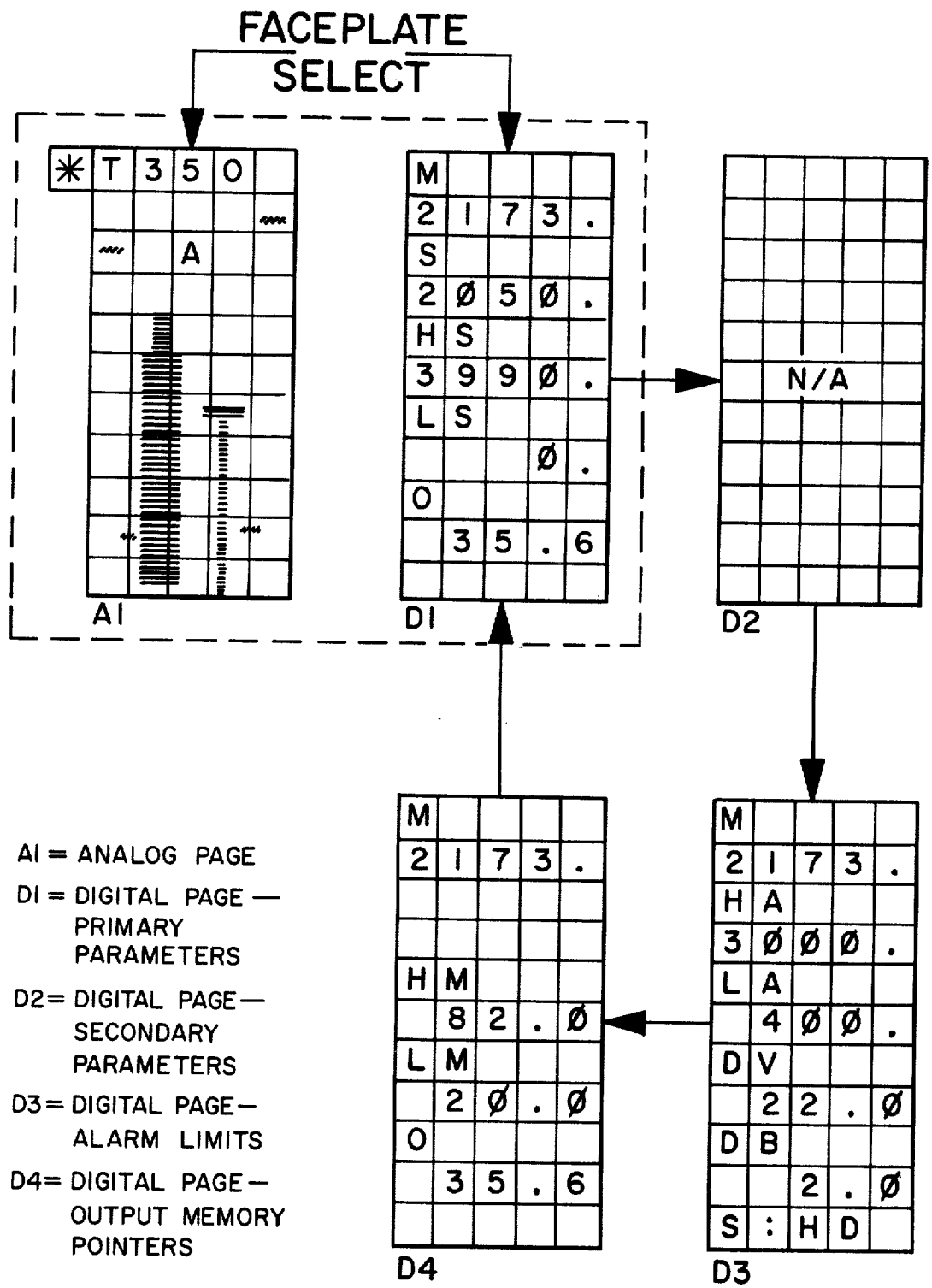
FIG. 10 shows an "Operator Set Loop" faceplate with different digital pages.

The two small marks to the right of the output indicator are termed "manual memory pointers" (see also FIG. 10). These pointers serve no control or alarm function, but are provided to serve as a visual memory aid to the operator, who may adjust the pointers to represent a particular desired operating range. The letter "M" in the analog portion stands for Manual, indicating the current controller operating mode. (The letter "A" for Automatic appears when the controller is switched to the automatic mode.)

The digital portion of the loop display provides a precise measurement value, an indication of the engineering units associated with that measurement value (DEGF), and the loop name. As discussed subsequently, additional digital information may be displayed for the selected loop, at the loop level. Selecting a loop is simply a matter of pressing the corresponding dual-position variable function key.

To summarize operations to this point, the variable function keyboard is used to progress from an overview of the entire plant (Plant Alarm Status Summary) to a detailed, functional display of the alarming loop. It took three steps:

1. From the Plant Alarm Summary, the alarming Area was selected.
2. From the Area Alarm Summary, the alarming Group was selected.
3. From the Group Full Value Faceplate Display, the alarming loop was selected.

This brings us to the loop level, where we are ready to manipulate the required control parameters to correct the alarm condition. The following subsection describes the loop level displays.

LOOP LEVEL DISPLAYS

Figure 4G:
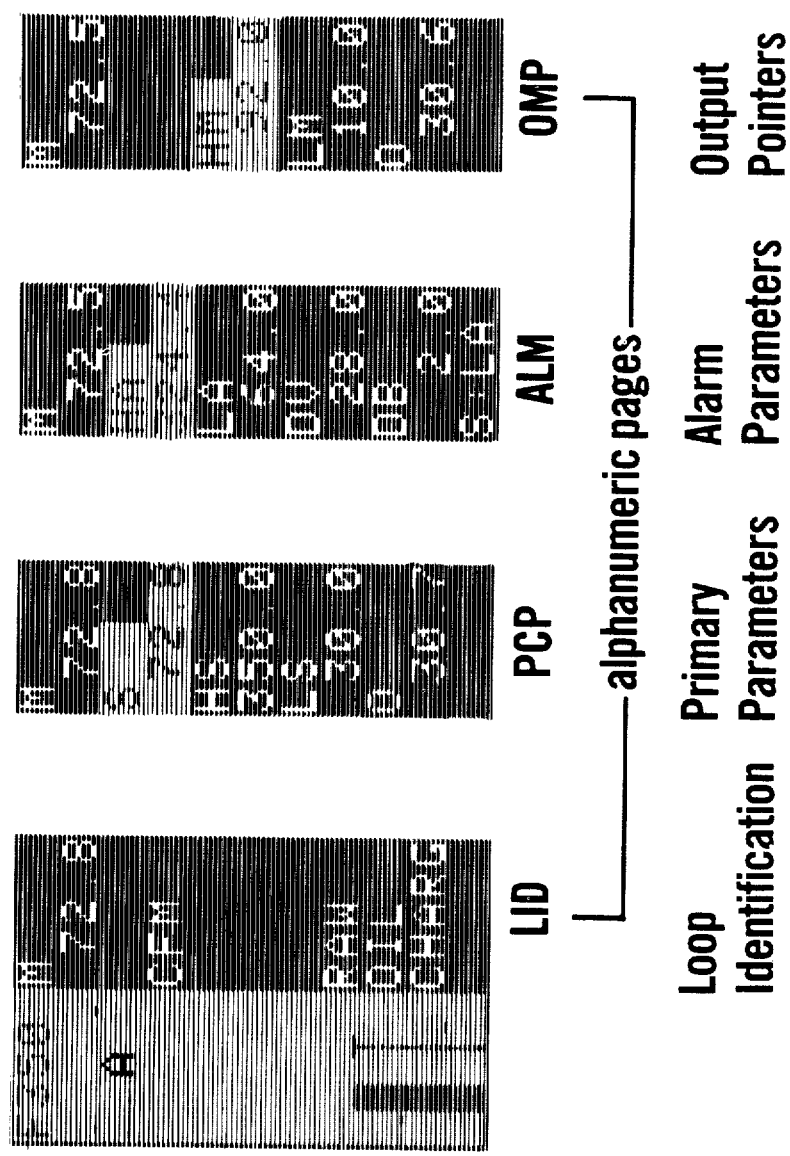

Loop level displays for a typical loop (not loop T225) are shown in FIG. 4G. If the loop is in alarm condition, that fact is indicated by an intensified, non-flashing tag number. The variable function keys now relate to the selected loop, rather than to the Group in general. Key labeling may include the following:

1. > (paging symbol) provides for the display of various digital pages. The digital pages are selected and presented in recycling sequence i.e., up to four pages are selected sequentially, one for each press of the > key.
2. OFF (Off Scan) allows the operator to remove the selected loop from the influence of the display, i.e. loop parameters will no longer be displayed and cannot, therefore, be manipulated from the console. This mode of operator/loop interface may be desirable, for example, during performance of loop repairs. When the loop is placed off scan, the word ON (for on scan) appears in this label position, indicating the action which can currently be taken by the operator.
3. AUT (Automatic) allows the operator to change the operating mode of the selected loop from manual to automatic. Once the loop mode is switched to automatic, the letters MAN (for manual) appear in this label position.
4. CLS (Close) allows the operator to fully close, with the press of the key, the final actuator associated with this control loop. (The output signal is instantly increased to full-scale value). Its counterpart, OPN, appearing several places to the right, provides for full opening of the final actuator.
5. +S− (Slow-Change Keys) provides a means of ramping the selected variable at a slow rate. The upper key of this dual-key set increases the value, and the lower key decreases it. The rate of change associated with this function provides for a full-scale variation in 25 seconds. A special "nudge" feature is included, which provides for a 0.1 percent change in the variable for each momentary depression of either key.
6. ASN (Assign) provides a means of selecting, for operator manipulation, a particular variable in the current digital page of the selected loop. The variables of the digital page are selected sequentially, in recycling sequence, and the selected variable appears in reverse video format on the CRT screen.
7. +F− (Fast-Change Keys) function similar to 5, above, but provide a faster rate of change: full-scale variation in 5 seconds. There is no "nudge" feature associated with the fast-change keys.
8. OPN (Open) counterpart of CLS (See 4, above).
9. L/L provides a convenient means of recalling the Group Full Value Faceplate Display.

The variable function key labels are peculiar to the current digital page, as identified by the section identifier 178 and the functioning of the control means 181 will be jointly controlled by which display is identified, and which key has been pressed, so that the central processor will develop a uniquely corresponding function. When the Alarm Limits Page is accessed (by pressing ">"), a new display is presented, the key labeling will be changed to reflect operator actions which may be performed in conjunction with this new (Alarm Limits) digital page.

The DIS label signifies "Alarm Disable" and provides for disabling of the alarm function associated with this loop. When the alarm function has been disabled, ENA (signifying "Alarm Enable") appears in place of DIS. The +S— and +F— keys are used to adjust the high and low absolute alarm limits (HA and LA), the measurement/setpoint alarm deviation span (DV), and the alarm deadband (DB). These parameters are selected for adjustment by pressing the Assign (ASN) key.

When the Output Memory Pointer Page is accessed (by pressing > again) a new display is presented. The +S— and +F— keys are now used to adjust the High and Low Memory Pointers (HM and LM).

If loop T225 were of the External Setpoint (ESL) type, a fourth digital page would be available, termed the Secondary Parameter Page. The ESL loop provides a choice of setpoint sources, External Set or Operator Set; ESP and OSP keys associated with Secondary Parameter Page provide the means of switching from one setpoint source to the other.

An operator has the option of selecting a loop directly, by specifying a loop tag number. This is accomplished as follows (see also FIG. 6):

1. The "TAG" fixed function key is pressed, calling up the Loop Select Display;
2. Using the variable function keys, a five-character tag number is entered. At each character position, the operator has the choice of either entering the next character or canceling the entire entry using the "CAN" key;
3. Upon entering the fifth character, the loop and its associated Group appear on the screen.

OPERATOR/LOOP INTERACTION

Operator/loop interaction involves the modification of loop parameters and operating modes. It is implemented through the loop level displays in conjunction with the variable function keys, through the control means 181 of the central processor 120, and the display section identifier 178. When a loop display is selected, only those functions associated with that particular loop type are made available to the operator. Also, only those functions that can logically be performed in that state of the loop are possible. For example, if a loop has been switched to OFF SCAN, none of the functions which involve changing modes or parameters for that loop are provided.

Figure 9:
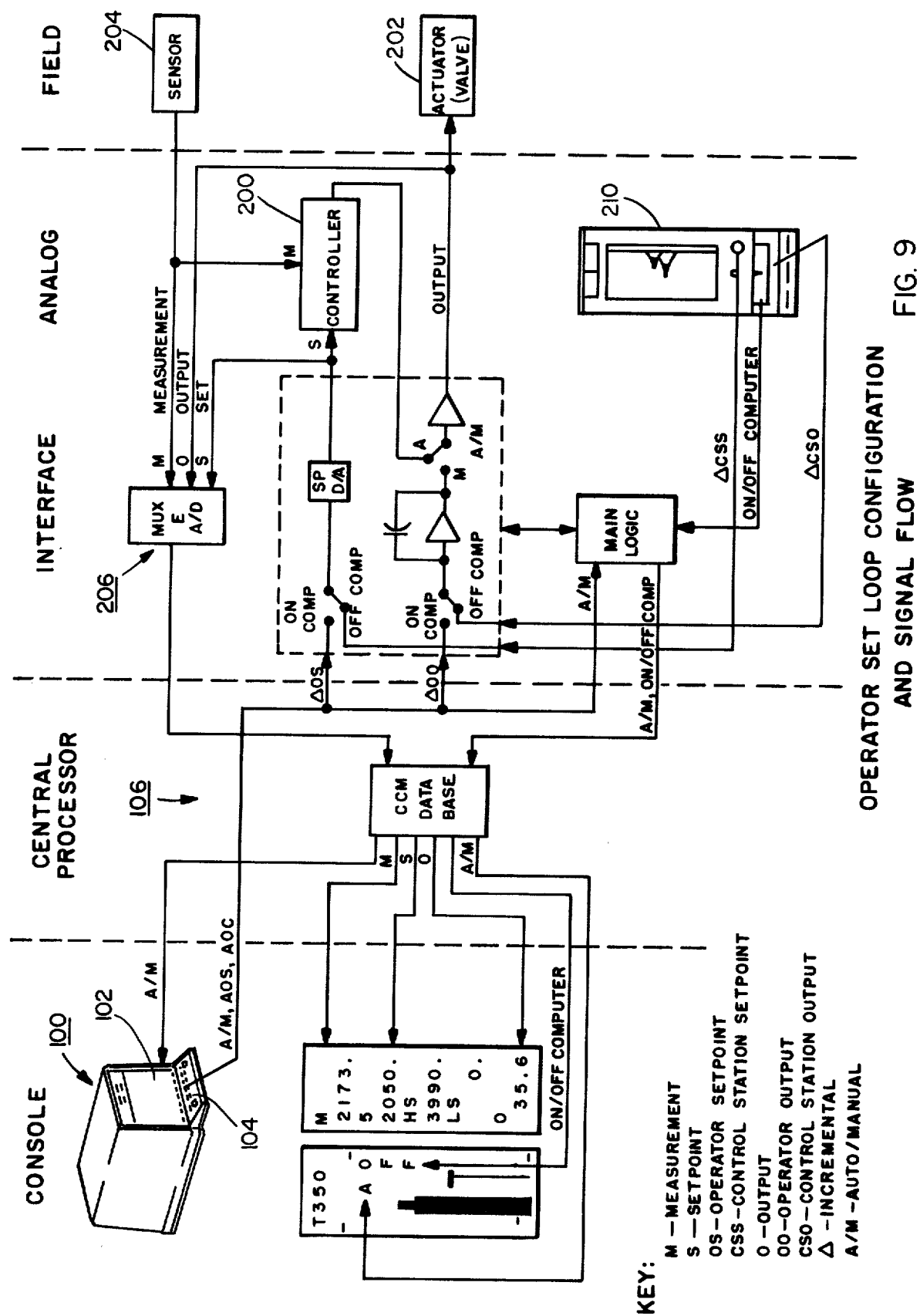
FIG. 9 is a diagrammatic representation of a typical process loop configuration, of the type referred to as an "Operator Set Loop"

To provide a specific illustration of the kinds of operator/loop interactions which are possible, examples are given below with respect to a specific type of loop referred to as an Operator Set Loop (OSL). FIG. 9 outlines the basic elements of such a loop, from which it can be seen that the loop includes a conventional analog controller 200 receiving set and measurement signals (S, M), and producing an output signal (0) for an actuator 202 associated with the process. The measurement signal is developed in known fashion by a sensor 204, e.g. a differential-pressure instrument, or the like.

Interface equipment, generally indicated at 206, is provided in accordance with the teachings of the Nabi patent referred to hereinabove. This interface equipment is coupled to the central processor 106 which receives data from the interface and functions, as discussed above, with the operator's keyboard 104, and display 102 to provide control signals for the controller 200. The interface equipment can be switched from "on computer" to "off computer", to permit operation of the controller by an optional control station 210. When the interface is on computer, it can receive operator set signals (OS) and operator output signals (OO) to effect adjustments to those parameters under control of the console keyboard 104. The controller also can be switched between automatic and manual (A/M), under control of the operator's keyboard, and the state of the controller in that regard will be transmitted back to the processor data base for display in the analog portion of the loop display, as an "A" or an "M".

FIG. 10 shows typical loop displays used in carrying out operator/loop interactions. The display includes an analog page, as previously described, and three digital pages for (a) primary parameters, (b) alarm limits, and (c) output memory pointers. A fourth digital page may be used where secondary parameters are involved.

The digital pages associated with a particular loop serve to catagorize the available operator functions. The Primary Parameter Page, for example, provides information relevant to the "primary" operator adjustable parametrs, namely the setpoint and output. The Alarm Limits Page provides alarm adjustment values, and the Output Memory Pointer Page provides output memory pointer adjustment values. The appropriate page must be displayed in order to adjust the associated parameters.

LOOP CONTROL MODE CHANGES

The output parameter in an OSL (operator set) loop (as well as certain other loops) can be manipulated automatically by the controller, or manually from the shared-display console. To transfer control of the output, the AUT and MAN keys are used. An AUT or MAN key label appears whenever the Primary Parameter Page is displayed for these loop types. The actual status of the loop is displayed as an "A" or "M" in the upper region of the graphic portion of the loop display; therefore, this indication is always available, regardless of the digital page displayed.

PRIMARY LOOP CONTROL

Primary loop control involves the adjustment of the primary loop parameters, e.g., setpoint and output for an Operator Set Loop. These parameters are adjusted using the Primary Parameter Page and the variable function keyboard ramp keys.

Figure 11:
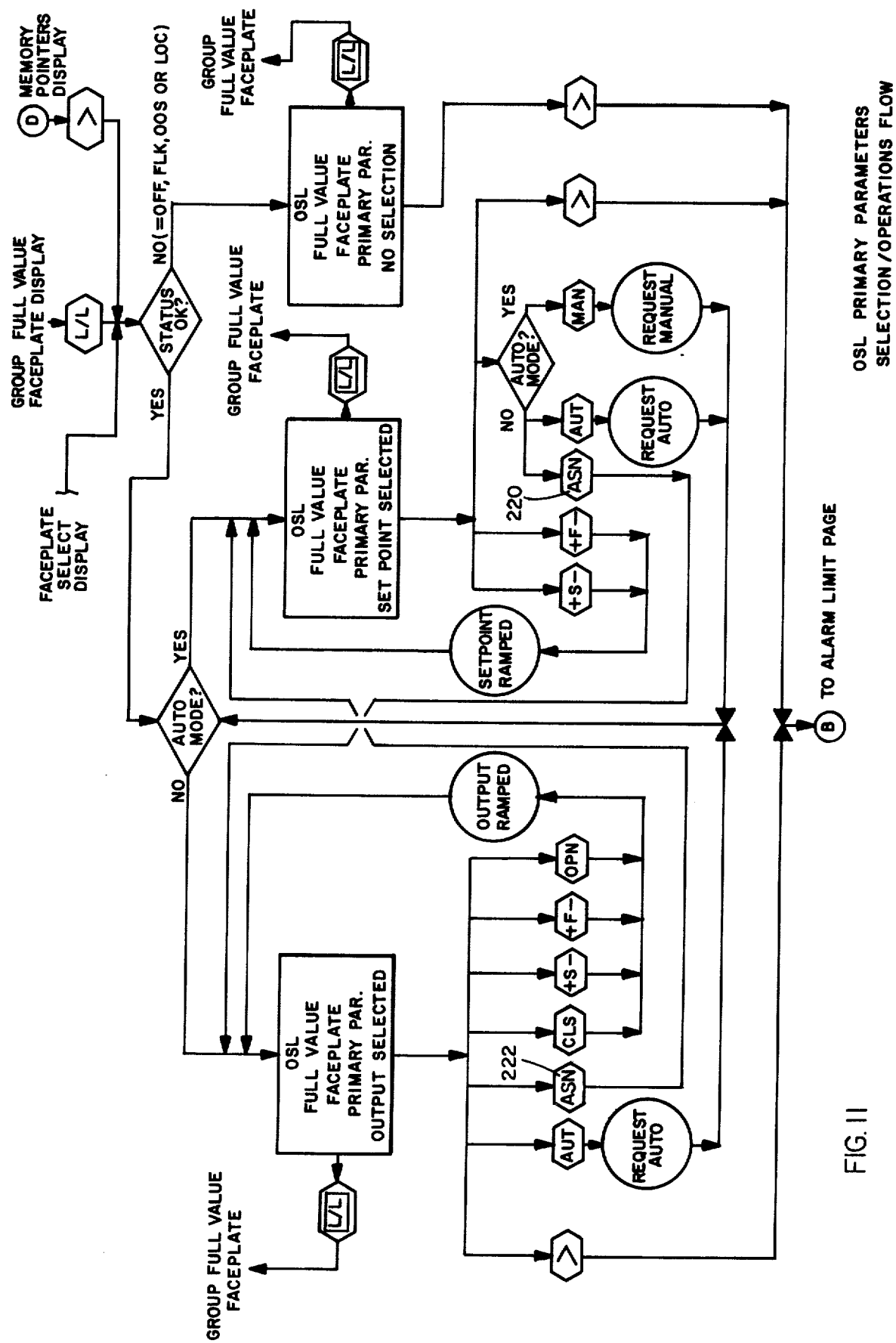
FIG. 11 is a diagram showing the selection and operations flow for an "Operator Set Loop" when displaying the digital page for the primary parameters.

FIG. 11 shows, in standard flow diagram format, the various actions which can be taken under specific conditions of an Operator Set Loop. When the controller is in automatic state, only the setpoint can be altered by the operator, through use of the ramp keys "S", or "F". When the controller is in manual state, either the setpoint or the output signal can be altered. In this case, the operator can select which is to be varied by actuation of the ASN key. For example, as shown in FIG. 11, actuation of the ASN key, is indicated at 220, transfers the control states from "set point selected" to "output selected". A further actuation of the ASN key, as indicated at 222, will transfer the status back to "set point selected", the controller remaining in manual mode.

The particular variable which can be altered will be shown on the display page with a distinctive characterization, e.g., with a lighter video background, relative to the other parameters displayed so that the operator will know at a glance which of the parameters is under control by the keyboard. Whenever the controller is in manual mode, actuation of the AUT key (as labelled on the CRT) will switch the controller to automatic. The AUT key label will simultaneously change to MAN, so that the next actuation of that key will switch the controller back to manual.

ALARM LIMITS ADJUSTMENTS

Figure 12:
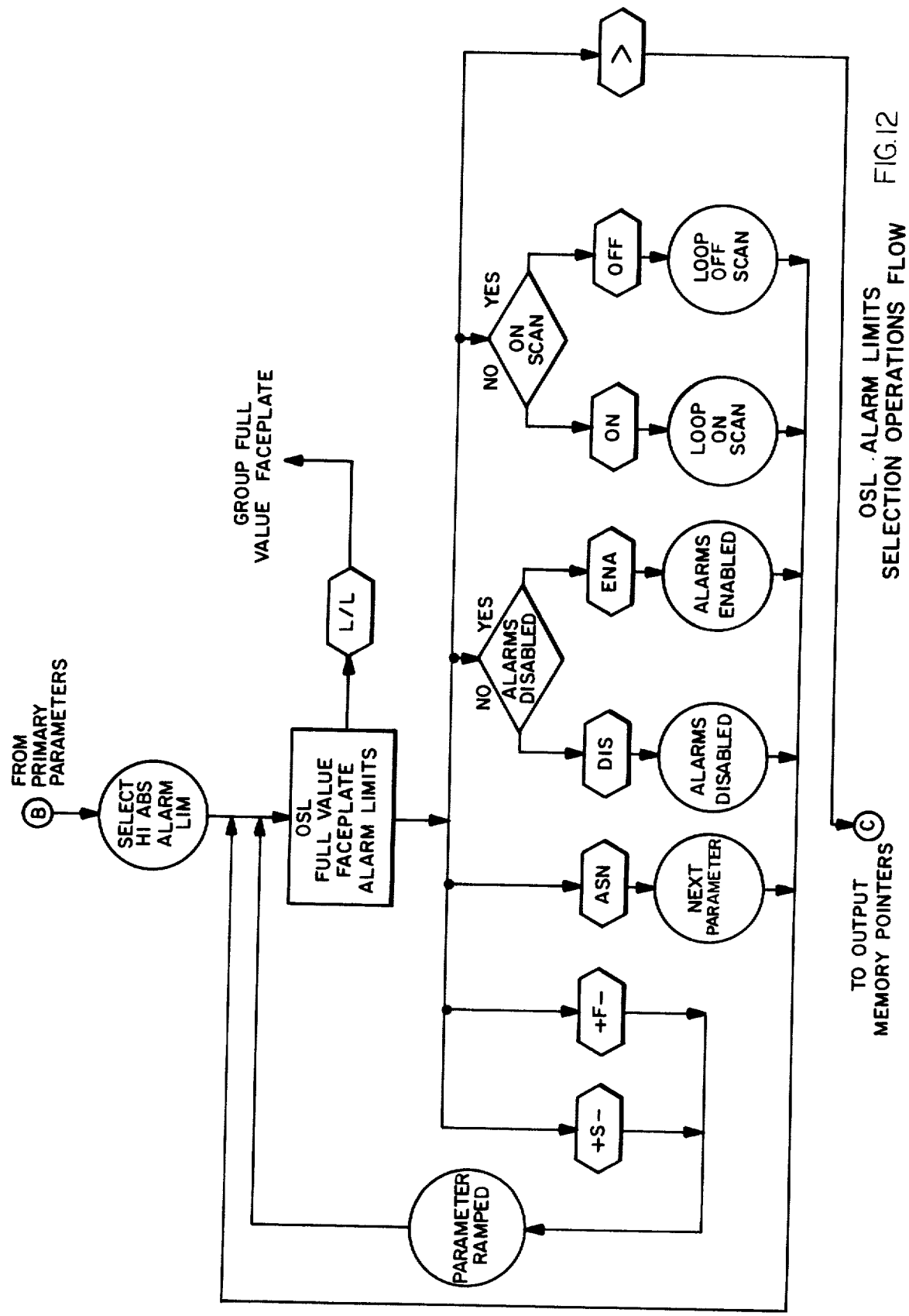
FIG. 12 is a diagram showing the selection and operations flow for an "Operator Set Loop" when displaying the digital page for the alarm limits.

The system alarm limit parameters for each loop (if applicable) are adjusted using the ramp keys along with the Alarm Limits display page. High absolute, low absolute, deviation, and deadband alarm limits are adjustable at any time independent of loop mode status. As described above, the ASN key is used to select one of the four variables to be ramped. An alarm enable/disable function is also provided to control alarming on a per loop basis. FIG. 12 has been included to illustrate, in standard flow diagram format, the functions which can be performed in conjunction with the Alarm Limits Page.

OUTPUT MEMORY POINT ADJUSTMENTS

Figure 13:
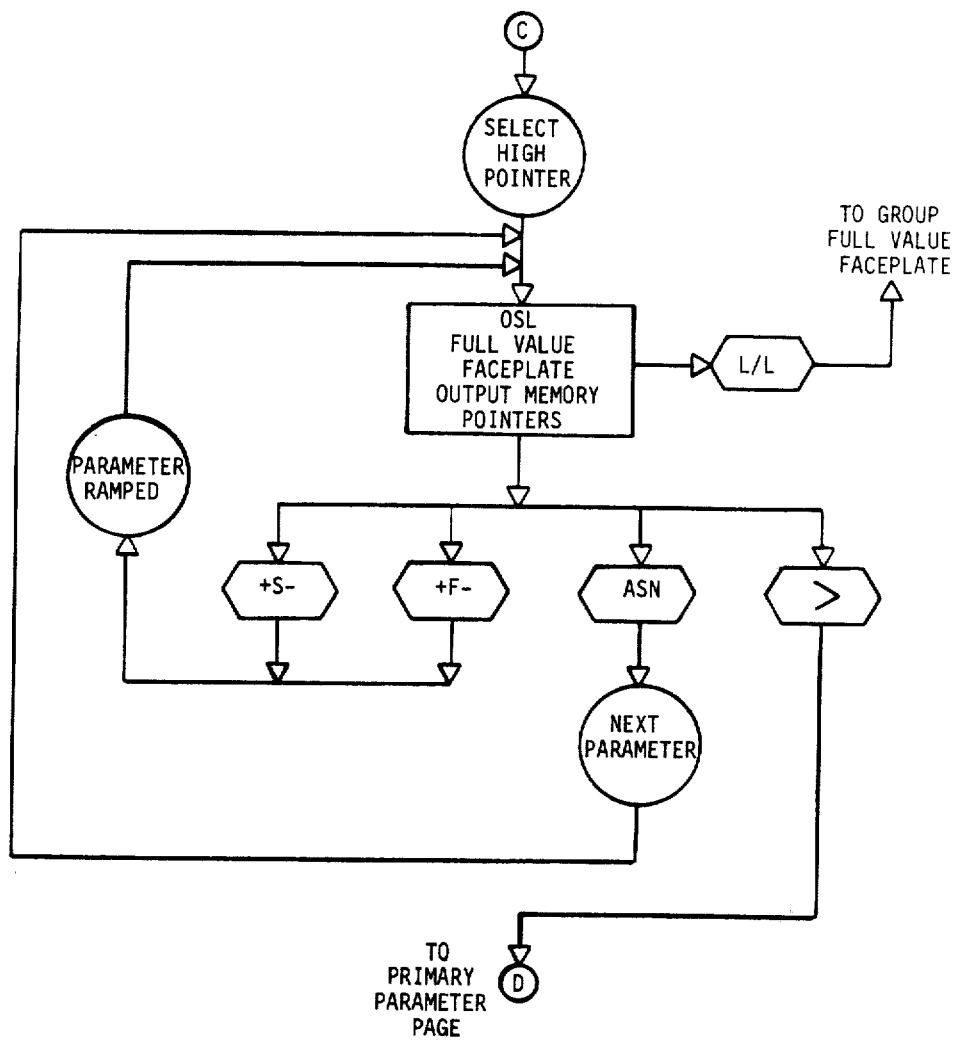
FIG. 13 is a diagram showing the selection and operations flow for an "Operator Set Loop" when displaying the digital page for the output memory pointers.
Figure 30:
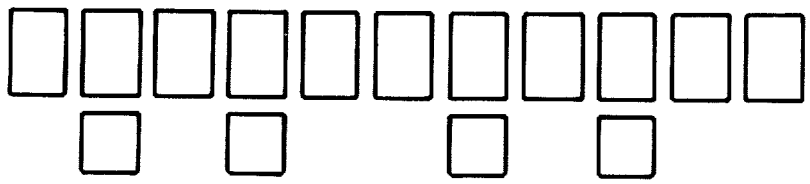

The output memory pointers are displayed on the Output Memory Pointer Page for those loops for which these markers are applicable. They are adjusted in a manner equivalent to that described for alarm limit adjustments. The keyboard allows for these parameters to be varied at any time, independent of loop status or mode, as outlined in FIG. 13. The ASN key is used to alternate selection between the high output pointer and the low output pointer.

FIG. 14 sets forth for convenient reference the CRT keyboard labels for the variable function keyboard, for lack of the different controller words or conditions as indicated in the right-hand column.

DATA TRENDING

A Shared-Display system in accordance with this invention may include the capability of trending (i.e., sampling, collecting, and recording) analog data. Analog measurement values held in the process data base can be trended using either real-time or historical trending modes.

In real-time trending, the data is sampled, conditioned and displayed to provide a continually updated chronology of data variances. In historical trending, up to 24 hours of data is sampled, conditioned, and stored in the disk memory for later retrieval and display. Up to 200 variables can be assigned to historical trending (continuous updating of up to 200 variables on the disk).

The process variable trends may be displayed either by CRT's or pen recorders. Using the CRT's, any six variables, whether real-time or historical, can be assigned for display, i.e., ready for instant display using the keyboard keys. Using the pen recorders, up to sixteen variables, real-time or historical, can be displayed concurrently.

CRT TRENDING

Trended data can be displayed on the CRT screen in either of two formats, quarter-screen or half-screen. Up to four variables can be assigned to the quarter-screen format, and up to two to the half-screen format.

Access to CRT trending is provided through a fixed function key labeled TND. Process variables are assigned to the display by the operator, who enters the loop tag number and data sampling rate through the variable function keyboard.

Real-time assignments remain in effect until changed by the operator, i.e., changing from trend to nontrend displays has no effect upon the real-time assignment.

Historical trend assignments are temporary, i.e., the variable temporarily occupies a portion of the screen normally reserved for an assigned real-time trend. (Switching to a nontrend display automatically restores the original, real-time assignment.)

PEN RECORDER TRENDING

Up to sixteen process variables can be trended on pen recorders. Real-time data can be trended at slow speed, and historically collected data residing on disk can be copied onto the pen recorder chart at high speed. Pen recorder trending is completely controlled by the operator through a special CRT display titled "Pen Assignments". Access to this display is provided through a fixed function key on the operator's console labeled PEN. Process variables are assigned to each pen by the user, who enters the loop tag number and data sampling rate through the variable function keyboard. Pen trending, once initiated, continues until stopped by the user or until the pen becomes unassigned. When a pen becomes unassigned, zero sample values are output to the pen to prevent drifting.

The data sampling rates relate directly to the trend record time bases (i.e., the elapsed time represented by the horizontal axis in each CRT trend display is a function of the operator selectable data sampling rate).

REAL-TIME VERSUS HISTORICAL TRENDING

Both trending modes, real-time and historical, can be implemented using either the CRT displays or the pen recorders. The principal difference between the two modes lies in the method presenting the data to these devices. In real-time trending the data is displayed from random-access memory (RAM). When displayed on the CRT, both graphic and digital information are continuously updated on the CRT screen. When displayed on the pen recorders, real-time data is traced on the charts in a conventional manner.

Historical data, in contrast, is stored in disk sectors, up to 24 hours of accumulated data per variable and is played back on the CRT screen or pen recorder chart. After initial playback from the disk, the graphic data is not updated on the CRT screen or pen recorder chart. However, associated digital information, displayed on the CRT screen, is dynamically updated. The two trending modes also differ in the maximum number of variables sampled, data sampling rate, and data conditioning characteristics.

CRT REAL-TIME TRENDING

There are two operator selectable variables associated with CRT real-time trending:
1. Screen format: up to four process variables can be trended using the quarter-screen format, and up to two variables can be trended using the half-screen format.
2. Data Sampling Rate.

Real-time data is displayed on the screen with the most current sample displayed as the right-most point on the trend record. Each real-time display is updated every sample frequency, and the display moves across the screen from right to left, with the oldest point being dropped off at the left and the newest point (sample) appearing on the right-most display position on each curve.

HISTORICAL TRENDING CHARACTERISTICS

A maximum of 200 process measurement variables can be assigned for historical data collection. Up to 240 samples for each variable are collected, after which time newly acquired samples replace the oldest samples on disk.

Two data sampling rates are available, 2-minute sampling and 6-minute sampling. Historical data acquisition is initiated by the user through a special display termed the Historical Trend Assignments (HTA) display. Once initiated, historical data acquisition and collection continues idenfinitely or until that variable is replaced by another from a new loop.

CRT HISTORICAL TRENDING

Historical data to the CRT trended is retrieved from disk in bulk form to allow a complete playback of a single variable within a few seconds. The data is read serially from the disk, stored momentarily in a special random access memory (RAM) buffer, and displayed on the CRT screen.

Historical data is displayed on the screen with the most current sample displayed as the right-most point on the trend record. Data is copied from the disk buffer to the screen in graphic format. Once copied, the trend record is not updated on the screen to reflect new samples being collected on disk. However, the digital measurement and setpoint values are continuously updated on the screen to reflect the current values of those variables. Assignment of a historical trend to a particular portion of the CRT screen is on a temporary basis. Changing from trend to nontrend displays automatically causes each historical screen assignment to be replaced by the permanent, real-time trend display.

CRT TREND ASSIGNMENTS

Real-time trend records are assigned to portions of the CRT screen on a semi-permanent basis; that is, the trend record becomes part of the quarter-screen or half-screen display until a new real-time trend record is assigned to that portion of the CRT screen. Historical trends records, in contrast, are assigned to portions of the CRT screen on a temporary basis; that is, recalling a display on the screen causes the original, real-time trend record to be restored to that portion of the display.

The procedure for assigning trend records, real-time or historical to the quarter-screen and half-screen displays is as follows:
- Step 1. A portion of the screen is selected by pressing the appropriate U/L variable function key. The selected portion of the screen becomes blank.
- Step 2. A five-character tag number is entered. (If tag number contains less than five characters, blank characters are added to constitute a full, five-character entry.) At this point an incorrect entry can be canceled using the "CAN" variable function key.
- Step 3. Complete tag number is entered by pressing the ENT key.
- Step 4. At this point the trending mode is selected implicitly, by selecting the desired data sampling rate (6 seconds or 30 seconds) for real-time trending, or the trend record time base (8 hours or 24 hours) for historical trending.

PROCESS DISPLAYS WITH ALARM NOTIFICATION

There are three types of process displays that include alarm notification:
1. Plant Alarm Summary display
2. Area Alarm Summary display
3. Group Full Value Faceplate display The occurrence of a new alarm affects each of these displays as follows:

On the Plant Alarm Summary display the Group name associated with the alarming loop starts to flash. If, at this time, the Area associated with the flashing Group name is selected, an Area Alarm Summary will be displayed.

On the Area Alarm Summary display the loop tag of the alarming loop starts to flash on occurrence of an alarm. The specific alarm condition is also displayed, adjacent to the loop tag. The action of selecting the Area Alarm Summary stops the flashing of the Group name on the Plant Alarm Summary. The Group name is, however, intensified indicating that there is at least one alarm condition in the Group, but that the operator has addressed the alarming Area. If, at this time, the Group associated with the flashing loop tag is selected, a Group Full Value Faceplate display appears.

On the Group Full Value Faceplate display, the loop tag associated with the alarming loop flashes. If the alarm is the noncritical type, the flashing may be stopped by pressing the Group Noncritical Acknowledge (GAK) fixed function key. If, at this time, the loop is selected, the loop tag stops flashing and becomes intensified. The action of selecting the alarming loop also stops the flashing of the loop tag on the Area Alarm Summary.

AREA ALARM LIGHTS

Up to eight Area Alarm Lights are located on the Console Control Panel above the CRT screen. These lights correspond to (up to) eight Areas displayed on the Plant Alarm Summary. Each light has a split-screen format, the upper half being red and the lower half orange. The red light flashes on occurrence of a new alarm condition associated with a particular plant Area. If, at this time, the Area Alarm Summary for this Area is selected for display, the red light stops flashing and remains lighted in a steady ON condition. When the loop which this alarm is associated with is selected, the orange light is lighted and remains in a steady ON condition. When the alarm condition no longer exists, both the red and orange lights are extinguished.

FIGS. 15–39 have been included to show examples of logical sequences of actions which an operator could take in making use of the shared-display system to handle a specific process problem. Each figure presents a specific CRT display with the operator's keyboard, and a display and keyboard explanation. The figures together provide a demonstration of the system functioning by carrying out a preprogrammed set of actions while showing the corresponding displays.

Beginning with a display entitled Plant Alarm Summary (PAS), a typical process loop (F350) is singled out and various courses of operator action are followed. Examples of actions that could be taken by an operator on each display are illustrated by shading the appropriate key or keys.

Depressing the appropriate (shaded) A/A key on the PAS display, for example, brings onto the screen the Area Alarm Summary (AAS, next sheet) for that area of the plant. The operator may select a second Area-level display which provides additional information about that area of the plant. This second display, entitled Area Full-value Faceplate (AFF), is called onto the screen by depressing the (shaded) AFF key (see next sheet).

The action resulting from pressing a shaded key is in most cases indicated on the immediately following drawing figure. In certain instances, the resulting action is indicated on a still further drawing figure, but the keyboard explanation on the drawing with the shaded key in question will identify the correct figure in that case. The overall effect of FIGS. 15–39 is to show clearly the considerable power and flexibility of a process control system based upon the present invention.

Although several embodiments of the invention have been described herein in detail, this is for the purpose of illustrating the principles of the invention, and should not necessarily be construed as limiting of the invention since it is apparent that those skilled in the art can make many modified arrangements of the invention without departing from the true scope thereof.

We claim:

1. In an industrial process control system for use with complex processes having a large number of conditions the values of which are to be measured and the measurements directed to associated means for developing corresponding process control signals for elements such as valves and the like, each combination of means for measuring a condition and for developing a corresponding control signal defining a process control loop; said loops being organized in groups pertaining to respective process tasks; and said groups being clustered as distinct areas of the overall plant;

display apparatus comprising:
an operator's console including a display device and a data-entry keyboard;
a display memory for said display device containing digital data for continuously controlling the display;
a digital storage memory comprising a plurality of storage sections each with a set of digital display data defining a corresponding complete display for said display device and arranged to be selectively transferred to said display memory to control the display;
a first set of said digital display data serving to present in separate display sectors of said display device summary information concerning respective process areas;
said digital storage memory having further sets of digital display data including sets representing detailed information concerning a corresponding area summarized in a respective one of said sectors of the display produced by the digital data from said first set of said digital data;
said sets of digital display data each also including display data for presenting symbols on said device in predetermined locations to identify the functions of preselected variable-function keys of said keyboard when the complete set of digital display data is presented on said device; and
display transfer means jointly controlled by said pre-selected keys and by the storage in said display memory of any one of said sets of stored digital display data;
said display transfer means being operable by said pre-selected keys, when one of said sets of stored digital display data has been placed in said display memory, to transfer to said display memory a corresponding one of said further sets of stored digital display data in accordance with the function identified by said symbols of the set of display data presented on the display device by said one set of display data.

2. Apparatus as in claim 1, wherein each of said pre-selected keys is operable, when said first set of stored display data is in said display memory, to transfer to said display memory a corresponding one of said further sets of stored display data representing detailed information about a respective process area.

3. Apparatus as in claim 1, wherein one of said pre-selected keys serves a paging function such that when one of a correlated group of said further sets of display data is stored in said display memory, successive operations of said one pre-selected key will transfer, in predetermined sequential order, each of the other sets of said group of sets of data, including return to said one set of data, in a circular fashion.

4. Apparatus as in claim 1, wherein said first set of digital display data comprises data presenting a summary of the alarm status of said process areas.

5. Apparatus as in claim 4, wherein an alarm condition is indicated by a special characterization of the indicia identifying the process area in which an alarm condition has occurred.

6. In an industrial process control system for use with highly complex processes having a large number of conditions the values of which are to be measured and the measurements used for developing corresponding process control signals for elements such as valves and the like;

display apparatus comprising:
an operator's console including a display device and a data-entry keyboard;
a display memory for said display device containing digital data for continuously controlling the display;
a digital storage memory comprising a plurality of storage sections each with a set of digital display data defining a corresponding complete display for said device and arranged to be selectively transferred to said display memory to control the display;
said sets of display data being arranged in multiple levels of information comprising at least first, second and third levels;
said first level comprising a first set of display data representing summary information concerning the overall process control system;
said second level comprising a plurality of second sets of display data each representing a more detailed exposition of a corresponding portion of the summary process information in said first level;
said third level comprising a plurality of third sets of display data each representing a still more detailed exposition of a corresponding portion of the process information represented by one of said second sets of display data at said second level;

said keyboard including a group of variable-function keys which perform functions determined by which of said sets of display data is stored in said display memory; said sets of display data further including symbol display data presenting indicia symbols on said device to identify the functions which will be performed by said variable-function keys if operated while the corresponding display is on the device; and means under the control of said variable function keys, when any one of said sets of display data of one of said levels is in said display memory, to selectively transfer to said display memory sets of said display data from other of said levels adjacent said one level, as indicated by the symbols presented on the display device by said one set of display data.

7. In an industrial process control system for use with complex processes having a number of conditions the values of which are measured and the measurements used for developing corresponding process control signals for elements such as valves and the like, each combination of means for measuring a condition and for developing a corresponding control signal defining a process control loop; the control system including a plurality of controllers each operable to produce a corresponding control signal for an assigned operating element; there being at least one digitally-operated slave unit associated with a selected group of said controllers for providing thereto analog set-point signals, and for receiving therefrom analog status signals such as condition measurement values; and a central processing unit connected to said digital slave unit by a cable providing for serial-pulse digital communication therebetween in both directions;

apparatus comprising:

an operator's console at said central processing unit including a display device and a data-entry keyboard;

a digital display memory for said display device containing digital data for continuously controlling the display;

a digital storage memory comprising a plurality of storage sections each with a set of digital data defining a corresponding complete display for said device and arranged to be selectively transferred to said digital display memory to control the display;

a first set of said stored digital data serving to present in separate display regions of said device summary information concerning the control status of the process;

said digital storage memory having further sets of digital data each representing detailed information concerning a plurality of said loops;

each of said further sets of digital data incorporating data for presenting alphanumeric characters to provide precise numerical information concerning the control status of the loop including the value of the set point or output of the controller for the loop;

display transfer means selectively controlled by said keyboard to transfer to said display memory any of said sets of stored display data;

said central processing unit including signal-generating means operable by said keyboard when said display device is displaying the detailed information concerning the control status of a particular loop; said signal-generating means serving to produce and to transmit over said serial-pulse cable to the slave unit for the controller associated with said particular loop, set point or output charge signals for said associated controller;

said particular slave unit being operable to transmit back to said central processing unit signals reflecting the chamber in set-point or output; and means operable by said central processing unit for altering the stored data of the set of digital data incorporating the detailed information concerning the control status of said particular loop so as to reflect the changed set-point or output data on the display presentation.

8. Apparatus as in claim 7, wherein said signal-generating means comprises means to change said set-point in small incremental steps, to provide the effect of a relatively slow ramp-change of set-point value.

9. Apparatus as in claim 8, including means to effect a relatively rapid ramp-change of said set-point value.

10. Apparatus as in claim 7, wherein said transmitted signals alter the output of a controller in manual state, and alter the set-point of a controller in automatic state.

11. In an industrial process control system for use with complex processes having a number of conditions the values of which are measured and the measurements used for developing corresponding process control signals for elements such as valves and the like, such combination of means for measuring a condition and for developing a corresponding control signal defining a process control loop; the control system including a plurality of process controllers each including means operable to produce a corresponding control signal for an assigned operating element, and each being switchable between automatic and manual control status; there being at least one digitally-operated slave unit associated with a selected group of said controllers and the corresponding process elements for providing thereto analog operating signals including set-point signals and output signals for manual control; said slave unit also being arranged for receiving from said controllers and/or associated condition sensors analog status signals such as condition measurement values; and a central processing unit connected to said digital slave unit by a cable providing for serial-pulse digital communication therebetween in both directions;

apparatus comprising:

an operator's console at said central processing unit including a display device and a data-entry keyboard;

a digital display memory for said display device containing digital data for continuously controlling the display;

a digital storage memory comprising a plurality of storage sections each with a set of digital data defining a corresponding complete display for said device and arranged to be selectively transferred to said digital display memory to control the display;

said sets of digital data including a plurality of sets incorporating loop data for developing on said display indicia indicating whether the loop is on automatic or manual control and for presenting alphanumeric characters providing precise numerical information concerning the control status of the loop including the value of the set-point of the controller for the loop and the output signal to the associated process element;

display transfer means selectively controlled by said keyboard to transfer to said display memory any of said sets of stored display data;

said central processing unit including signal-generating means operable by said keyboard, when said display device is displaying any one of said sets of loop data, to produce and to transmit signals over said serial-pulse cable to the slave unit for the controller associated with the one particular loop;

said signal-generating means serving to develop upon selective operation of said keyboard: (a) set-point change signals for said associated controller, for the automatic operation thereof, or (b) output signal changes for the associated process element, for manual operation thereof, or (c) command signals for switching the controller between automatic and manual operation;

display data control means operable by said central processing unit for altering the set of loop data stored in said display memory so as to reflect on the display presentation: (a) changed set-point data, (b) changed output signal data, and (c) change in automatic/manual status.

12. Apparatus as in claim 11, wherein said central processing unit includes means for controlling said display device such that when said loop is on automatic control, the set-point values are distinguished from the rest of the presentation, and when the loop is on manual control, the output values are distinguished from the rest of the presentation, whereby the operator can quickly focus on the relevant data when involved in making a change in set-point or output.

13. Apparatus as in claim 11, wherein said slave unit includes means to transmit to said central processing unit update signals representing: (a) set-point values; (b) output-signal data, and (c) automatic/manual status;

said display data control means being responsive to said update signals for showing the actual set-point data, output signal data, and automatic/manual status.

14. In an industrial process control system for use with complex processes having a large number of conditions the values of which are to be measured and the measurements used for developing corresponding process control signals for elements such as valves and the like;

apparatus comprising:

an operator's console including a display device and a data-entry keyboard;

a display control for said display device adapted to receive digital data for controlling the display;

a digital storage memory comprising a plurality of storage sections each with a set of digital display data defining a corresponding display for said device and arranged to be selectively transferred to said display control to establish the display presented by said device;

a central processing unit supplied with information signals regarding the status of the process and including means for maintaining said sets of digital display data up-to-date for presentation on said device;

said central processing unit being controllable by said keyboard and operable thereby to selectively transfer to said display control any of said sets of digital display data;

said keyboard including a first plurality of variable-function keys located near said display device so the operator can view those keys and the display;

each of said sets of digital display data including data for presenting on said display symbols which are correlated with at least certain of said first plurality of keys, and which provide information indicating the function to be performed by such correlated key when the corresponding set of digital data controls said display; and means forming part of said central processing unit, and controllable by any one of said certain keys identified by a display currently presented by the display device, for performing the function represented by the respective symbol correlated with such one key.

15. Apparatus as in claim 14, wherein said symbols presented on said display by certain of said sets of display data are correlated to only a selected number of said first plurality of keys less than the total number thereof;

said central processing unit being arranged to effect no function upon the actuation of any of the remaining of said first plurality of keys not identified by said symbols currently presented on said display device.

16. Apparatus as in claim 14, wherein said keys comprise a group of keys which individually are positionally related to respective regions of the display;

said central processing unit being operable, upon actuation of any of said group of keys, to transfer to said display memory a new set of digital display data representing additional information pertaining to the information originally presented in the region of said display positionally related to the actuated key.

17. Apparatus as in claim 16, wherein said group of keys consists of four sets of dual keys spaced along a principal line, with the two keys of each dual set being located adjacent one another on corresponding lines transverse to said principal line, whereby the eight keys of the group correspond positionally to eight regions of said display.

18. In an industrial process control system for use with complex processes having a large number of conditions and means for measuring the values of said conditions and the measurements used for developing corresponding process control signals directed to elements such as valves and the like, each combination of means for measuring a condition and for developing a corresponding control signal defining a process control loop, said loops arranged in groups pertaining to respective overall plant areas;

apparatus for monitoring an alarm status occurring within any of said control loops, said alarm status arising when any of said measured values exceed preestablished limits, said apparatus comprising:

an operator's console including a display device and a data-entry keyboard;

a display memory for said display device containing digital data for continuously controlling the display;

a digital storage memory comprising a plurality of storage sections each having a set of digital display data defining a corresponding complete display for said device and arranged to be selectively transferred to said display memory to control the display;

a first set of said digital display data serving to present on said display device summary information concerning the control status of a plurality of said groups;

said storage memory having further sets of digital data each representing detailed information concerning a plurality of said loops;

said stored digital data including data for developing on said display indicia indicating whether an alarm status exists for any of said loops;

display transfer means selectively controlled by said keyboard to transfer to said display memory any of said sets of stored display data including alarm status data associated therewith;

said keyboard being operable, when any of said sets of digital display data is in said display memory, to acknowledge said alarm status and thereby to effect changes in the indicia of at least certain of said displays;

said sets of digital display data being arranged in a hierarchy of information wherein said loop data contains the most detailed exposition of process information;

said acknowledging of said alarm status serving to change indications on said display of said alarm status only at the hierarchical level of information being presented and all those sets of digital display data exposing less detailed process information, preserving changed indications at lower levels of hierarchy for later retrieval upon returning to the lower level from higher levels in either the same area or group or different area or group without losing the location of lower level indications in higher level groups and areas or its status, acknowledged or unacknowledged, at the lower level.

19. Apparatus as in claim 18, including indicator light means adjacent said display and receiving said process loop data, said light means being positionally correlated with summary information when presented with respect to separate plant areas regardless of which of said sets of digital display data is in said display memory;

said light means having two sections per light, one such section responding to any new unacknowledged loop alarm in said area by intermittently lighting in red, and the other indicating the existence of any acknowledged loop alarm for which alarm conditions remain, thereby resulting in constant indication of process alarm conditions and acknowledgement status for the entire process under the direction of the console, regardless of the level of display hierarchy on the display device at any time.

20. Apparatus as in claim 19, wherein said storage memory includes digital data for categorizing between critical and non-critical alarm status, said status being arbitrarily defined for any loop;

said non-critical alarms being capable of being fully acknowledged at said group data hierarchical level;

said critical alarms being fully acknowledged only at the loop hierarchical data level.

21. In an industrial process control system for use with highly complex processes having a large number of conditions the values of which are to be measured and the measurements used for developing corresponding process control signals for elements such as valves and the like, each combination of means for measuring a condition and for developing a corresponding control signal defining a process control loop; said loops being organized in groups pertaining to respective process tasks; and said groups being arranged as clusters representing respective preassigned areas of the overall plant;

display apparatus comprising:

an operator's console including a display device and a data-entry keyboard;

a display memory for said display device containing digital data for continuously controlling the display;

a digital storage memory comprising a plurality of storage sections each with a set of digital display data defining a corresponding complete display for said device and arranged to be selectively transferred to said display memory to control the display;

said sets of display data containing multiple levels of plant information comprising at least first, second and third levels;

a first set of said display data providing said first level of information and serving when transferred to said memory to present on said display device a number of separate information segments pertaining to respective preassigned areas of the plant under control;

each of said information segments including a plurality of separate presentations each representing a corresponding identified process group of the plant area covered by the respective information segment;

means effective while said first set of display data is in said memory to designate visually on said display device any of said information segments when a preestablished characteristic of one of the process groups represented by such information segment has reached a preselected status;

said second level of information comprising a plurality of second sets of display data each representing a more detailed exposition of a corresponding one of the plant area information segments presented in said first level of information and presenting information concerning all of the process groups represented in the corresponding information segment;

means operable by the console operator when said first set of display data is in said memory for transferring to said memory any of said second sets of display data;

said transfer means including means functioning in coordination with the location of said display device of any visually designated information segment to transfer to said memory the particular one of said second sets of display data corresponding to such visually designated information segment;

means effective while any of said second sets of display data is in said memory to designate visually on said display device said one process group for which said preestablished characteristic has reached said preselected status;

said third level of information comprising a plurality of third sets of display data each representing a still more detailed exposition of a respective process group identified in said second sets of display data;

means operable by the console operator when any of said second sets of display data is in said memory for transferring to said memory any of said third sets of display data;

said transfer means including means functioning in coordination with the location on said display device of said visual identification of any particular process group, while any one of said second sets of display data is in said memory, to transfer to said memory the particular one of said third sets of display data representing the visually designated process group;

whereby the process operator is enabled to follow the same technique in processing from said first to said second information level, as in progressing from said second to said third information level, as he seeks to gain more detailed knowledge about said preestablished characteristic.

22. A system as in claim 21, wherein said preestablished characteristic is the alarm status of any of said process groups.

23. A system as in claim 22, wherein said designating means operates by causing a graphic display portion of the corresponding information segment to blink, thereby to attract the operator's attention.

24. A system as in claim 21, wherein said transfer means includes a preselected set of manually-operable keys physically arranged in a layout disposition positionally coordinated with respective regions of said display device;

each of said information segments presented in said first set of display data being positioned in a corresponding one of said regions;

each of said preselected keys being operable upon actuation to transfer to said display device the particular one of said second sets of display data corresponding to the information segment displayed in the region which is positionally coordinated with the actuated key.

25. In an industrial process control system for use with complex processes having a large number of conditions the values of which are to be measured and the measurements directed to associated means for developing corresponding process control signals for elements such as valves and the like, each combination of means for measuring a condition and for developing a corresponding control signal defining a process control loop; said loops being organized in groups pertaining to respective process tasks; and said groups being clustered as distinct areas of the overall plant;

display apparatus comprising:

an operator's console including a display device and a data-entry keyboard;

a display memory for said display device containing digital data for continuously controlling the display;

a digital storage memory comprising a plurality of storage sections each with a set of digital display data defining a corresponding complete display for said display device and arranged to be selectively transferred to said display memory to control the display;

a first set of said digital display data serving to present in separate display sectors of said display device summary information concerning respective process areas;

said summary information in each such sector comprising a listing of multi-character group identifiers each designating a corresponding one of said process groups forming the respective process area;

said digital storage memory having second sets of digital display data each representing detailed information concerning a corresponding process area summarized in a respective one of said sectors of the display produced by the digital data from said first set of said digital data;

display transfer means controlled by certain keys of said keyboard corresponding respectively to said display sectors;

each of said certain keys being operable, when said first set of digital display data is in said display memory, to transfer to said display memory the one of said second sets digital data providing the detailed information concerning the process area corresponding to the operated key; and alarm indicator means for visually designating any one of said process areas represented by the display of said first set of digital display data and serving, whenever a process loop is in alarm condition, to designate the particular process area including such loop;

the operation of the one of said certain keys corresponding to such designated process area serving to present on said display device the detailed information covering the particular process area containing the process loop indicated as being in alarm.

26. Apparatus as claimed in claim 25, wherein said sets of display data each includes display data for presenting symbols on said display device in predetermined locations to identify the functions of preselected keys of said keyboard, including said certain keys, when the corresponding set of digital display data is presented on said device.

27. Apparatus as claimed in claim 25, wherein said group identifiers presented by said first set of display data are words describing a characteristic aspect of the respective group.

28. Apparatus as claimed in claim 25, wherein said second sets of display data serve to present a listing of the individual loops within the particular process area represented by each such second set of display data.

29. Apparatus as claimed in claim 25, wherein said alarm indication is developed by altering a characteristic of the portion of the display corresponding to the process area having a loop in alarm condition.

30. Apparatus as claimed in claim 29, wherein said alarm indication is developed by altering the intensity of a portion of the display presenting the group identifiers of the process area having a loop in alarm condition.

31. Apparatus as claimed in claim 29, wherein said alarm indication is developed by altering the representation of the group identifier of the group including the loop in alarm.

32. In an industrial process control system for use with highly complex processes having a large number of conditions the values of which are to be measured and the measurements used for developing corresponding process control signals for elements such as valves and the like, each combination of means for measuring a condition and for developing a corresponding control signal defining a process control loop; said loops being organized in groups pertaining to respective process tasks; and said groups being arranged as clusters representing respective preassigned areas of the overall plant;

display apparatus comprising:

an operator's console including a display device and a data-entry keyboard;

a display memory for said display device containing digital data for continuously controlling the display;

a digital storage memory comprising a plurality of storage sections each with a set of digital display data defining a corresponding complete display for said device and arranged to be selectively transferred to said display memory to control the display;

said sets of display data containing multiple levels of plant information comprising at least first, second and third levels;

a first set of said display data providing said first level of information and serving when transferred to said memory to present on said display device a number of separate information segments pertaining to respective preassigned areas of the plant under control;

alarm indicator means effective while said first set of display data is in said memory to visually designate any of said information segments to indicate that a process loop forming part of the corresponding process area is in an alarm condition;

said second level of information comprising a plurality of second sets of display data each representing a more detailed exposition of a corresponding one of the plant area information segments presented in said first level of information;

said third level of information comprising a plurality of third sets of display data each representing a still more detailed exposition of a respective process group identified in said second sets of display data;

means operable by the console operator when said first set of display data is in said memory for transferring to said memory any of said second sets of display data;

said second sets of display data presenting information in distinct regions of the display for the respective process groups of the particular process area, to provide for visual designation of any process group having a process loop in alarm condition; and means operable by the console operator when any of said second sets of display data is in said memory for transferring to said memory any of said third sets of display data;

the process operator being enabled by said visual designation of the process area and process group having a loop in alarm condition, while said first and second sets of display data are presented, respectively to progress quickly and accurately from said first to said second information level, and from said second to said third information level, as he seeks to gain more detailed knowledge about the alarm condition.

33. Apparatus as claimed in claim 32, wherein an alarm is indicated on the display device by altering the appearance of a portion of the display related to the loop in alarm condition.

34. Apparatus as claimed in claim 32, wherein each of said information segments comprises a listing of words identifying the process groups included in the respective process area;

an alarm being indicated by altering the intensity of the identifying word of the process group having the control loop in alarm condition.

35. Apparatus as claimed in claim 34, wherein said second sets of display data present, for each process group of the corresponding process area, a listing of loop identifiers;

an alarm being indicated by altering the intensity of the identifier of the loop in alarm.

36. In an industrial process control system for use with complex processes having a large number of conditions the values of which are to be measured and the measurements directed to associated means for developing corresponding process control signals for elements such as valves and the like, each combination of means for measuring a condition and for developing a corresponding control signal defining a process control loop; said loops being organized in groups pertaining to respective process tasks; and said groups being clustered as distinct areas of the overall plant;

display apparatus comprising:

an operator's console including a display device and a data-entry keyboard;

a display memory for said display device containing digital data for continuously controlling the display;

a digital storage memory comprising a plurality of storage sections each with a set of digital display data defining a corresponding complete display for said display device and arranged to be selectively transferred to said display memory to control the display;

a first set of said digital display data serving to present in separate display sectors of said display device summary information concerning respective process areas;

said summary information in each such sector comprising a listing of multi-character group identifiers free of any display of loop information, each group identifier presenting symbols limited to the function of designating a corresponding one of said process groups forming the respective process area;

said digital storage memory having second sets of digital display data each representing detailed information pertaining to the loops in the process areas summarized in said sectors of the display produced by the digital data from said first set of said digital data;

display transfer means operable by the console operator when said first set of display data is in said display memory, for transferring to said display memory any of said second sets of display data; and alarm indicator means for visually designating any one of said process areas represented by said first set of digital display data and serving, whenever a process loop is in alarm condition, to designate the particular process area including such loop, said alarm indicator means presenting an alarm indication positionally correlated with the display location of the process area containing a loop in alarm.

37. Apparatus as claimed in claim 36, wherein each of said second sets of display data is operable to identify on said display device all of the process loops of the process groups making up the corresponding process area;

whereby any process loop in alarm condition can be designated individually for the console operator.

38. An industrial process control system having a large number of process tasks distributed in respective areas of a process plant, with each of said process tasks comprising a number of interrelated process loops arranged in groups according to respective process operations, said system including a digital display system for allowing an operator to examine the alarm status of each area, group or loop while continuously maintaining alarm integrity on all process loops, comprising:

an operator's console including a display device and a request-entry keyboard;

format generation means for presenting on said display device a hierarchical presentation of said process tasks by a succession of plant, area and group level displays each in response to a specific keyboard request, each of said level displays being segmented such that respective portions of said display device identify particular operational sections forming the process level being displayed;

said plant level display serving to present to said operator summary information on each of said process areas such that each segment of the display presents to said operator a listing of all groups forming a respective process area, each of said groups being further identified by a particular multi-character designator;

said area level display serving to present summary information of a selected one of said process areas in said segments of identification of the groups comprising said selected area with each of said display segments containing information pertaining to all loops forming a respective process group of said selected area;

said group level display serving to present summary information of a selected one of said area groups, said group level display identifying the loops comprising said selected group with each display segment containing detailed status information pertaining to a particular loop of the selected group;

means for compiling status information on each of said process loops independent of the particular display being presented;

segment selection keys each spatially positioned relative to a respective one of said display segments, each of said selection keys serving when actuated to present on said display a more detailed representation of the selected segment as defined by the next succeeding level in the display hierarchy;

means for comparing the status of each of said loops to a respective pre-established condition and upon sensing a loop at variance with its respective condition for presenting on said display device an alarm condition designator;

said alarm condition designator being presented in the display segment which corresponds to the loop in alarm regardless of the display level being presented and independent of changes in the position of said segment with changes in display level thereby allowing the operator to efficiently track an alarm indication from a higher order level display through more detailed display of the loop in alarm by visually correlating the segment of interest and its respective segment selection keys.

39. In an industrial process control system for use with complex plants of the type having a number of conditions the values of which are to be measured and the measurements used for developing corresponding process control signals for elements such as valves and the like to maintain the respective conditions at a desired set point, each combination of means for measuring a condition and for developing a corresponding control signal defining a process control loop; apparatus comprising:

an operator's console including a display device and a data-entry keyboard;

a display control for said display device adapted to receive digital data for controlling the display;

a digital storage memory comprising a plurality of storage sections each with a set of digital display data defining a corresponding complete display for said device and arranged to be selectively transferred to said display control to establish the display presented on said device;

a first plurality of said sets of digital data each containing data representing detailed information concerning the process loops and including data operable when transferred to said display control to develop graphic loop presentations wherein a relatively wide vertical bar shows by its height the value of the measurement for the corresponding loop, and wherein two vertical lines of identical height and contiguous respectively with the sides of said bar indicate by their height the set point of the corresponding loop, whereby when the measurement is below set point, the two vertical lines are readily distinguishable by the open space therebetween, and when the measurement is above set point, the vertical measurement bar is readily distinguishable by its appearance of thinness relative to a supporting thicker base at a level representing the set point value.

40. Apparatus as in claim 39, wherein each of said sets of digital loop data incorporates information respecting a plurality of distinct loops which are presented in respective sectors of said display.

41. Apparatus as in claim 39, wherein said graphic presentation comprises, adjacent said vertical bar, two small marks indicating high and low absolute alarm limits.

42. Apparatus as in claim 39, wherein said graphic presentation comprises, adjacent said vertical bar, a horizontal line indicating the value of an output signal from a controller.

43. Apparatus as in claim 42, wherein said graphic presentation comprises, adjacent said horizontal line two small marks serving as manual memory pointers, to provide the operator with an adjustable representation of a desired operating range.

44. Apparatus as in claim 11, including means for controlling said signal-generating means in accordance with said automatic/manual status so that said signal-generating means can send to said slave unit signals altering the set-point data only when the loop is in manual control.

45. Apparatus as in claim 14, wherein said means forming part of said central processing unit includes means responsive to actuation of at least one of said certain keys, when a predetermined set of said digital display data has been transferred to said display control, for transferring a new set of said display data to said display control.

46. Apparatus as in claim 14, wherein said means forming part of said central processing unit includes means responsive to actuation of at least one of said certain keys, when a predetermined set of said digital display data has been transferred to said display control, for altering the magnitude of a control system value displayed on said display device.

47. Apparatus as in claim 46, wherein said value is the set-point of a controller.

48. Apparatus as in claim 46, wherein said value is the output of a controller.

49. In an industrial process control system for use with complex plants of the type having a number of conditions the values of which are to be measured and the measurements used for developing corresponding process control signals for elements such as valves and the like to maintain the respective conditions at a desired set point, each combination of means for measuring a condition and for developing a corresponding control signal defining a process control loop, and wherein two loop values such as measurement and set point levels are to be displayed as an aid to an operator in controlling the process;

apparatus comprising:

an operator's console including a display device and a data-entry keyboard;

a display control for said display device adapted to receive digital data for controlling the display;

a digital storage memory comprising a plurality of storage sections each with a set of digital display data defining a corresponding complete display for said device and arranged to be selectively transferred to said display control to establish the display presented on said device;

a first plurality of said sets of digital data each containing data representing detailed information concerning the process loops and including data operable when transferred to said display control to develop graphic loop presentations including a relatively wide bar showing by its length one of said loop values, and two thin bars of identical length contiguous respectively with the sides of said wide bar, indicating by their length the other of said loop values, whereby when one of said values is below the other, the two thin bars extend beyond the wide bar and are readily distinguishable by the open space therebetween, and when the reverse relationship exists between said loop values the wide bar is readily distinguishable by its appearance of being slightly thinner than a supporting thicker base consisting of the two thin bars together with the contiguous portion of the wide bar between said two thin bars.

50. In an industrial process control system for use with complex processes having a large number of conditions the values of which are to be measured and the measurements directed to associated means for developing corresponding process control signals for elements such as valves and the like, each combination of means for measuring a condition and for developing a corresponding control signal defining a process control loop; said loops being organized in groups pertaining to respective process tasks; and said groups being clustered as distinct areas of the overall plant;

display apparatus comprising:

an operator's console including a display device and a data-entry keyboard;

a display memory for said display device containing digital data for continuously controlling the display;

a digital storage memory comprising a plurality of storage sections each with a set of digital display data defining a corresponding complete display for said display device and arranged to be selectively transferred to said display memory to control the display;

a first set of said digital display data serving to present in separate display sectors of said display device summary information concerning respective process areas;

said summary information in each such sector comprising a listing of multi-character group identifiers each designating a corresponding one of said process groups forming the respective process area;

said digital storage memory having second sets of digital display data each representing detailed information pertaining to the loops in the process areas summarized in said sectors of the display produced by the digital data from said first set of said digital data;

display transfer means operable by the console operator when said first set of display data is in said display memory, for transferring to said display memory any of said second sets of display data; and alarm indicator means for visually designating any one of said process areas represented by said first set of digital display data and serving, whenever a process loop is in alarm condition, to designate the particular process area including such loop;

said alarm indicator means comprising means to alter the visible character of the listing of group identifiers representing the process area containing the loop in alarm.

51. Apparatus as claimed in claim 50, wherein said alarm indicator means comprises means to alter the visible character of the particular group identifier representing the process group containing the loop in alarm.

52. Apparatus as claimed in claim 51, wherein said indicator means causes said particular group identifier to appear to blink intermittently.

* * * * *